(12) United States Patent
Ross et al.

(10) Patent No.: US 11,062,409 B2
(45) Date of Patent: Jul. 13, 2021

(54) SYSTEMS AND METHODS FOR DETERMINING PROPORTIONALITY IN E-DISCOVERY

(71) Applicant: Prism Innovative Resources, Inc., Chicago, IL (US)

(72) Inventors: Amanda J. Ross, Chicago, IL (US); Barbara J. Basile, Chicago, IL (US)

(73) Assignee: INSIGHT OPTIX LLC, Knoxville, TN (US)

(*) Notice: Subject to any disclaimer, the term of this patent is extended or adjusted under 35 U.S.C. 154(b) by 0 days.

(21) Appl. No.: 16/528,395

(22) Filed: Jul. 31, 2019

(65) Prior Publication Data
US 2020/0042530 A1      Feb. 6, 2020

Related U.S. Application Data

(60) Provisional application No. 62/713,274, filed on Aug. 1, 2018.

(51) Int. Cl.
*G06Q 50/18* (2012.01)
*G06F 16/25* (2019.01)

(52) U.S. Cl.
CPC ........... *G06Q 50/18* (2013.01); *G06F 16/252* (2019.01)

(58) Field of Classification Search
CPC .................................................. G06Q 50/18
See application file for complete search history.

(56) References Cited

U.S. PATENT DOCUMENTS

| | | | |
|---|---|---|---|
| 8,112,406 B2 | 2/2012 | Paknad et al. | |
| 8,396,838 B2 | 3/2013 | Brockway et al. | |
| 8,484,069 B2 | 7/2013 | Kisin et al. | |
| 8,635,207 B2 | 1/2014 | Marlin | |
| 8,832,126 B2 | 9/2014 | Kumar et al. | |
| 9,483,550 B1 | 11/2016 | Sonie | |
| 2010/0250456 A1 | 9/2010 | Toomey et al. | |
| 2011/0040600 A1* | 2/2011 | Paknad | G06Q 50/18 705/7.42 |
| 2019/0149535 A1 | 5/2019 | Greetham | |

FOREIGN PATENT DOCUMENTS

EP        2234048 A2      9/2010

OTHER PUBLICATIONS

Matthew Verga, "Creating a Custodian Interview Script—Conducting Effective Custodian Interviews, Part 2", May 23, 2017, https://www.xactdatadiscovery.com/articles/create-custodian-interview-script/.*

* cited by examiner

*Primary Examiner* — Asher D Kells
(74) *Attorney, Agent, or Firm* — Howard & Howard Attorneys PLLC

(57) ABSTRACT

A system comprises a database stored on a server and a processing device in communication with a user device accessible to a user. The processing device includes: a hosting module configured to generate and display a web-based application on a user device; a communications module configured to enable the user to access and interact with the web-based application on the user device; a matter administration module configured to maintain a plurality of matter data associated with a matter stored in the database; a custodian administration module configured to maintain a plurality of custodian data stored in the database; an evidence administration module to maintain a plurality of evidence data stored in the database; an interview building module to allow the user to prepare at least one custom interview based on the plurality of matter data.

24 Claims, 79 Drawing Sheets

FIG. 4C

Home — 132

Select custodian to view details — 131 — Add New Custodian 🔍 — 133

| Custodian List | |
|---|---|
| Doe 1, John Company 1 | |
| Doe 1, Jane Company 1 | |
| Doe 2, Jane Company 1 | |
| Doe 2, John Company 1 | |
| Doe 3, John Company 1 | |
| Doe 3, Jane Company 1 | |
| Doe 4, Jane Company 1 | |
| Doe 4, John Company 1 | |
| Doe 5, John Company 1 | |
| Doe 5, Jane Company 1 | |
| Doe 6, Jane Company 1 | |
| Doe 7, Jane Company 1 | |

134 →

First Name: John
Middle Name: 
Last Name: Doe 1

Business Street Address: 322 Address Ave
City: Chicago
State: IL
Zip: 2245
Country: United States Business Phone #1: (312) 555-4636
Business Phone Ext: 
Mobile Phone: (###) ###-####

Email Address: John.Doe@company1.com

Company: Company 1
Department: Marketing
Job Title: Sales Assistant
Office Location: Chicago Custodian Image — 135

138 →
- Survey Count: 6
- Completed Survey Count: 5
- Incomplete Survey Count: 1
- Evidence Collected Count: 0
- Evidence Added Count: 1
- Survey Analysis Count: 1
- Survey Interview Count: 1

Assigned Matters — 136

| Case Number | Matter Name | Data Source Location Group — Data Source | Survey Status | Analysis Status | Interview Status | 137 |
|---|---|---|---|---|---|---|
| 2018-1 | Company 1 vs Company 2 | United States - Data Source ⌄ | 2 | 0 | 3 | |
| 2019-3 | Company 3 vs Company 4 | Michigan ⌄ | 2 | 0 | 0 | |
| 2019-4 | Company 5 vs Company 6 | US Headquarters ⌄ | 2 | 0 | 0 | |
| 2019-5 | Company 7 vs Individual 1 | Headquarters ⌄ | 0 | 0 | 0 | |
| 2019-7 | Question Test Matter | | 2 | 2 | 0 | |

FIG. 4E

| | Matter Name | Survey Name | Custodians on Matter | Completed Surveys | Custodians Released | Custodians Held | New Matter ⊕ |
|---|---|---|---|---|---|---|---|
| 📝 | Company 1 | Company 1 | 14 | 12 | 1 | 11 | |
| 📝 | Company 2 vs. Company 3 | Company 2 | 3 | 3 | 0 | 2 | |
| 📝 | Mainstay matter | Mainstay Products | 2 | 1 | 0 | 1 | |
| 📝 | ACS 7v7 Schedule | ACS - 7v7 | 6 | 6 | 1 | 5 | |

CUSTODIAN INFORMATION

Jane Doe 1
JANE.DOE1@COMPANY1.COM

Company          Job Title          Entity
Company 1        Patent Paralegal

Department       Office Location    Tier
Legal            Los Angeles

Address Book Information   Phone #    Ext
500 W. Address St
Los Angeles, CA 90210      Mobile Phone #

Doe 1, Jane
Doe 5, Jane
Doe 6, Jane 236
238

Figure 15B:
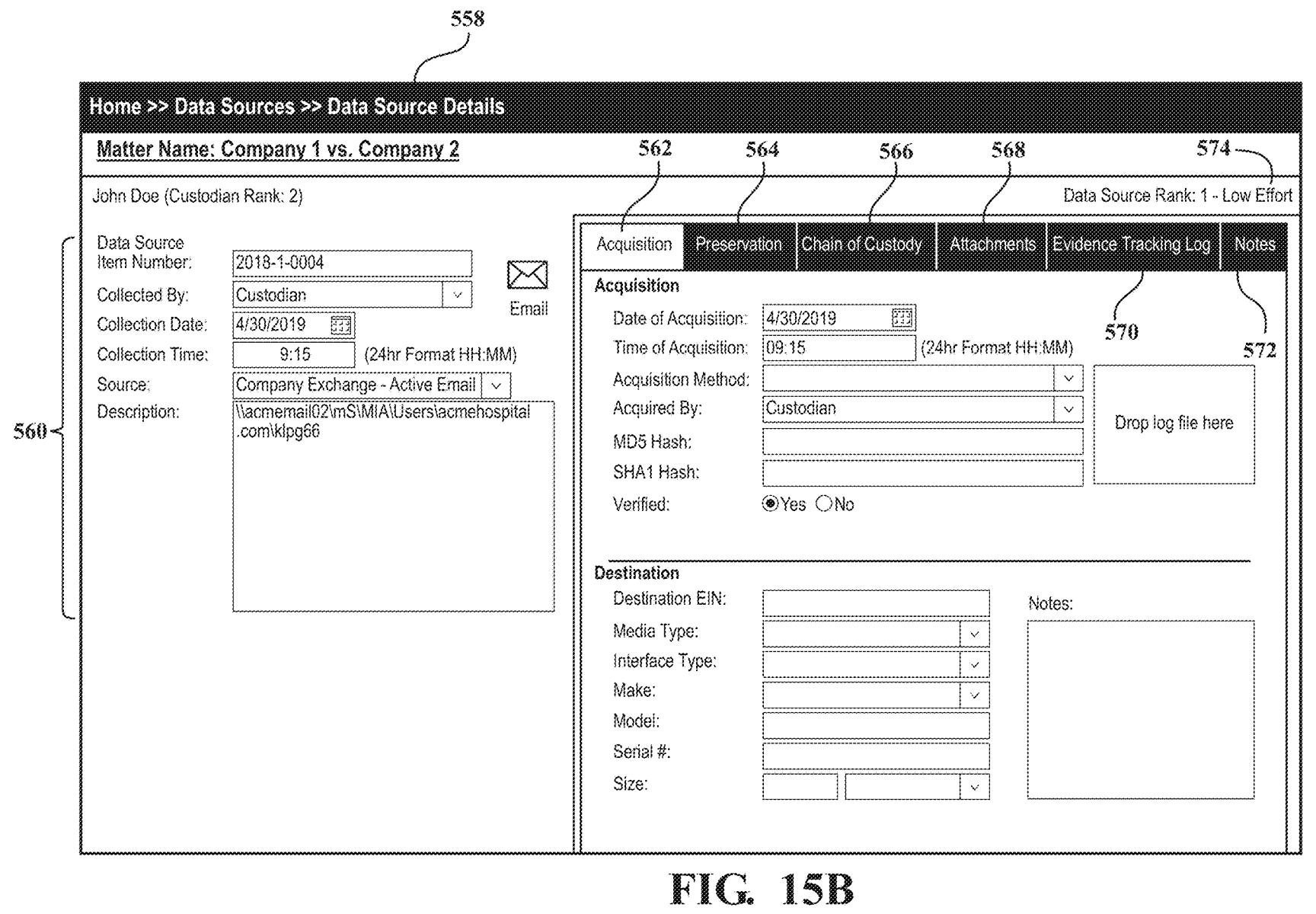

Home >> Data Sources >> Data Source Details — 558

Matter Name: Company 1 vs. Company 2 — Data Source Rank: 1 - Low Effort — 574

John Doe (Custodian Rank: 2)

560 {
- Data Source Item Number: 2018-1-0004
- Collected By: Custodian
- Collection Date: 4/30/2019
- Collection Time: 9:15 (24hr Format HH:MM)
- Source: Company Exchange - Active Email ✉ Email
- Description: \\acmemail02\mS\M\A\Users\acmehospital .com\klpg66

Tabs: Acquisition — 562 | Preservation — 564 | Chain of Custody — 566 | Attachments — 568 | Evidence Tracking Log — 570 | Notes — 572

Acquisition
- Date of Acquisition: 4/30/2019
- Time of Acquisition: 09:15 (24hr Format HH:MM)
- Acquisition Method:
- Acquired By: Custodian
- MD5 Hash:
- SHA1 Hash:
- Verified: ●Yes ○No

Destination
- Destination EIN:
- Media Type:
- Interface Type:
- Make:
- Model:
- Serial #:
- Size:

Notes:

Drop log file here

Assign Data Source Status and Negotiation Scenarios

| Dashboard | Custodian Status | Data Source Status | Scenario Approval | Approved List |
|---|---|---|---|---|

| Custodian Name | Custodian Rank | Department | Job Title | City | State | Country | Custodian Status |
|---|---|---|---|---|---|---|---|
| Search... | Search... | Search... | Search... | Search... | Search... | Search... | Search... |
| Doe 1, Jane | 4-Priority | Legal | Patent Paralegal | Los Angeles | CA | United States | Active |
| Doe 2, Jane | 1-Low | Sales | Territory Manager | Los Angeles | CA | United States | Active |
| Doe 1, John | 3-High | General Counsel | Patent Attorney | Chicago | IL | United States | Inactive |
| Doe 2, John | 2-Medium | Corporate | QA Technician | Miami | FL | United States | To Be Reviewed |
| Doe 3, Jane | 4-Priority | Research and Development | Scientist | Chicago | IL | United States | Active |
| Doe 4, Jane | 4-Priority | Research and Development | Clinical Research Director | Miami | FL | United States | Active |
| Doe 5, Jane | 3-High | Research | Data Analytics | Chicago | IL | United States | Active |

FIG. 17A

Assign Data Source Status and Negotiation Scenarios

| Custodian Name | Custodian Rank | Department | Job Title | Office Location | Custodian Status | Data Source Type | Data Source Rank | Data Source Status |
|---|---|---|---|---|---|---|---|---|
| Search... | Search... | Search... | Search... | Search... | Search... | Search... | Search... | Search... |
| Doe 1, Jane | | | | | | | | |
| Doe 1, Jane | 4-Priority | Legal | Patent Paralegal | Los Angeles | Active | Network Share | 2-Medium Effort | Collect |
| Doe 2, Jane | | | | | | | | |
| Doe 2, Jane | 1-Low | Sales | Territory Manager | Los Angeles | Active | Network Share | 2-Medium Effort | |
| Doe 2, Jane | 1-Low | Sales | Territory Manager | Los Angeles | Inactive | Removable Media | 4-Burdensome Effort | |
| Doe 1, John | | | | | | | | |
| Doe 1, John | 3-High | General Counsel | Patent Attorney | Chicago | Active | Email | 1-Low Effort | |
| Doe 1, John | 3-High | General Counsel | Patent Attorney | Chicago | Active | Computer | 3-High Effort | Sample |
| Doe 2, John | | | | | | | | |
| Doe 2, John | 2-Medium | Corporate | QA Technician | | Inactive | Network Share | 2-Medium Effort | |
| Doe 2, John | 2-Medium | Corporate | QA Technician | | Inactive | Email | 1-Low Effort | |

FIG. 17B

Approve Data Sources For Collection

| Dashboard | Custodian Status | Data Source Status | Scenario Approval | Approved List |

Expand All

| Custodian Name | Custodian Rank | Department | Data Source Type | Data Source Rank | Data Source Action | Low | Medium | High | Approved |
|---|---|---|---|---|---|---|---|---|---|
| ☐ Defendant - Initial | | | | | | | | | |
| Doe 1, John | 4-Priority | Active | Network Share | 2-Medium Effort | Collect | $10,500 | $17,500 | $35,500 | ☐ |
| Doe 1, Jane | 1-Low | Inactive | Removable Media | 4-Burdensome Effort | | $3,000 | $5,000 | $10,000 | ☐ |
| Doe 2, Jane | 2-Medium | To Be Reviewed | Email | 1-Low Effort | Collect | $7,500 | $12,500 | $25,000 | ☐ |
| Doe 2, John | 3-High | Active | Email | 1-Low Effort | | $7,500 | $12,500 | $25,000 | ☑ |
| Doe 3, John | 3-High | Active | Email | 1-Low Effort | Collect | $7,500 | $12,500 | $25,000 | ☐ |
| Doe 3, Jane | 2-Medium | Inactive | Email | 1-Low Effort | | $7,500 | $12,500 | $25,000 | ☑ |
| Doe 1, Jane | 1-Low | Inactive | Network Share | 2-Medium Effort | | $10,500 | $17,500 | $35,000 | ☐ |
| Doe 4, Jane | 4-Priority | Active | Email | 1-Low Effort | Collect | $7,500 | $12,500 | $25,000 | ☐ |
| Doe 1, John | 4-Priority | Active | Email | 1-Low Effort | Collect | $7,500 | $12,500 | $25,000 | ☐ |
| Doe 4, John | 2-Medium | Inactive | Email | 1-Low Effort | | $7,500 | $12,500 | $25,000 | ☐ |
| Doe 5, Jane | 4-Priority | Active | Email | 1-Low Effort | Collect | $7,500 | $12,500 | $25,000 | ☐ |

FIG. 17F

Review Approved Data Sources

| Custodian Name | Custodian Rank | Custodian Status | Data Source Type | Data Source Rank | Evidence Status | Low | Med | High |
|---|---|---|---|---|---|---|---|---|
| Search... | Search... | Search... | Search... | Search... | Search... | Search... | Search... | Search... |
| Defendant - Initial<br>Doe 1, John | 3-High | Active | Email | 1-Low Effort | Collect | $7,500 | $12,500 | $25,000 |
| Defendant - Initial<br>Doe 1, Jane | 2-Medium | To Be Reviewed | Email | 1-Low Effort | Collect | $7,500 | $12,500 | $25,000 |

Group by Scenario

Matter Details

Company 1 vs. Company 2
Case Number: 2018-1
Abbreviation: SP v MP
Date Added: 2/12/2018         value is used in the charting
Plaintiff: Company 1
Defendant: Company 2
Matter Details: Company 1 recently bought a patent infringement suit related to their patented compound named "Endocrine-dyslip"

Counsel assigned to matter

| | Plaintiff | |
|---|---|---|
| John Doe | Defendant | |
| Jane Doe | Defendant\Plaintiff | |
| Attorney Name | | |

Matter Configuration
Survey Associated with Matter
Company 1

- Select Survey
- Survey Disclaimer & Timeframe
- Assessment Ranking
- Evidence Burden and Cost Ranking
- Custodian Phase and Status Definitions
- Data Source Status Definitions
- Report Scheduler Survey Status
Analysis Status
Review Status Assign a difficulty level for each data source type. This rank is used in the creation of the Proportional Discovery Assessment.

Create New Data Source Location Area

Data Source Location Areas
- United States - Data Source ⊗
- United States - Satellite Office ⊗

Data Source Ranks
1 - Low Effort
2 - Medium Effort
3 - High Effort
4 - Burdensome Effort United States - Data Source

| | | Collection cost estimations | | |
|---|---|---|---|---|
| Data Source difficulty values | | Low | Medium | High |
| Computer | 3 | $15,000 | $25,000 | $50,000 |
| Email | 1 | $7,500 | $12,500 | $25,000 |
| Mobile Device | 4 | $7,500 | $12,500 | $25,000 |
| Removable Media | 4 | $3,000 | $5,000 | $10,000 |
| Network Share | 2 | $10,500 | $17,500 | $35,000 |
| Hard Drive | 2 | $7,500 | $12,500 | $25,000 |
| Paper Document | 3 | $1,500 | $2,500 | $5,000 |

Close

FIG. 22A

| Custodian List | | Quick Search | Enter Search Value ⊗ | Hold Issued | Hold Accepted | Survey Status | Assessment Interview | Pre-interview Analysis | Interview Status | Collection Items | Relevancy Ranking | Proportionality Ranking |
|---|---|---|---|---|---|---|---|---|---|---|---|---|
| Doe 1, John | | | | | | | | | | | | |
| | Company 3 vs. Company 4 | | | ⊙ | ⊙ | ☺ | ✎ | ▦ | ⚐ | ⇦ | ④ | ▦ |
| Doe 2, John | | | | | | | | | | | | |
| | Company 1 vs. Company 2 | | | ⊙ | ⊙ | ☺ | ✎ | ▦ | ⚐ | ⇦ | ① | ▦ |
| Doe 3, John | | | | | | | | | | | | |
| | Company 1 vs. Company 2 | | | ⊙ | ⊙ | ☺ | ✎ | ▦ | ⚐ | ⇦ | ③ | ▦ |
| Doe 4, John | | | | | | | | | | | | |
| | Company 1 vs. Company 2 | | | ⊙ | ⊗ | ☺ | ✎ | ▦ | ⚐ | ⇦ | ② | |
| Doe 5, John | | | | | | | | | | | | |
| | Company 3 vs. Company 4 | | | ⊙ | ⊙ | ☺ | ✎ | ▦ | ⚐ | ⇦ | ① | ▦ |
| Doe 6, John | | | | | | | | | | | | |
| | Company 5 vs. Company 6 | | | ⊙ | ⊙ | ☺ | ✎ | ▦ | ⚐ | ⇦ | ② | ▦ |
| | Company 1 vs. Company 2 | | | ⊗ | ⊗ | ☺ | ✎ | ▦ | ⚐ | ⇦ | ① | |
| Doe 7, John | | | | | | | | | | | | |
| | Company 1 vs. Company 2 | | | ⊙ | ⊙ | ☺ | ✎ | ▦ | ⚐ | ⇦ | ② | ▦ |
| Doe 8, John | | | | | | | | | | | | |
| ⇦ Back | | | | | | | | | | | | |

Report Email Schedules

| Recipient Name | Recipient Email Address | Report Name | Send How Often? | Last Email |
|---|---|---|---|---|
| John Doe | jdoe@prismili.com | Proportional Preservation Ranking Assessment | Bi-weekly | 4/4/2018 10:27:54 PM |

808

Close

| | tTimeStampCreated | tTimeStampModified | RecordID | tCreatedUserName | tModifiedUserName | tCaseNumber | tCaseDescription | tCaseName | nActive | tActiveCase | DateAdded |
|---|---|---|---|---|---|---|---|---|---|---|---|
| A | 2/12/2018 5:49:14AM | 7/17/2018 5:32:38PM | 21220185491495970 | edlasiowski@gmail. | City of Grand Rapids | 2018-1 | Superior | Superior | 1 | Active | 2/12/2018 |
| B | 2/14/2018 4:52:30AM | 7/17/2018 5:32:36PM | 21420184523026671 | edlasiowski@gmail. | City of Grand Rapids | 2016-2 | Copyright | ACS vs. NSE | 1 | Active | 2/5/2018 |
| C | 2/14/2018 5:32:44AM | 7/17/2018 5:32:36PM | 21420185324499186 | edlasiowski@gmail. | City of Grand Rapids | 2018-3 | Mainstay believes | Mainstay matter | 1 | Active | 2/7/2018 |
| D | 2/24/2016 8:05:46AM | 7/17/2018 5:32:36PM | 22420188054620958 | edlasiowski@gmail. | City of Grand Rapids | | ACS has brought suit | ACS 7v7 Schedule | 1 | Active | 2/24/2018 |

901 902 903 904 905 906 907 908 909 910 911

900B

| | Plaintiff | Defendant | Stats_Cust... | MatterDetails | Stats_Cust... | Stats_Cu... | Stats_Cu... | Stats_Cu... | Stats_Cu... | Stats_Cu... | Stats_Cu... | Stats_Cu... | Stats_Cu... | Stats_Cu... |
|---|---|---|---|---|---|---|---|---|---|---|---|---|---|---|
| A | Superior | Company1 | 14 | | 85.71% | 12 | 2 | 2 | 2 | 12 | 85.71% | 1 | 11 | 2 | 0 |
| B | Acs Sports | Company2 | 3 | | 100.00% | 3 | 0 | 0 | 0 | 3 | 66.67% | 0 | 2 | 1 | 0 |
| C | MS LLC | Individual1 | 2 | | 50.00% | 1 | 1 | 1 | 1 | 1 | 50.00% | 0 | 1 | 1 | 0 |
| D | ACS | Company 3 | 6 | | 100.00% | 6 | 0 | 0 | 0 | 6 | 100.00% | 1 | 5 | 0 | 0 |

| iTimeStampCreated | iTimeStampModified | tSerial | tCreatedUserName | tModifiedUserName | iRelatedCasePrim... | iCustodianNumber | nCustodianLastName | nCustodianFirstName |
|---|---|---|---|---|---|---|---|---|
| 2/9/2018 11:34:15AM | 7/17/2018 7:46:08PM | 29201811341577673165... | edlasiowski@gmail. | edlasiowski@gmail. | City of Grand Rapids | 6 | Owen | Donald |
| 2/9/2018 11:36:59AM | 7/17/2018 7:46:08PM | 29201811365947365040... | edlasiowski@gmail. | edlasiowski@gmail. | City of Grand Rapids | 7 | Werfel | Felix |
| 2/9/2018 11:41:43AM | 7/17/2018 7:46:08PM | 29201811414314311368... | edlasiowski@gmail. | edlasiowski@gmail. | City of Grand Rapids | 1 | Carvalho | Sophia |
| 2/9/2018 11:51:28AM | 7/17/2018 7:46:08PM | 29201811512861161585... | edlasiowski@gmail. | edlasiowski@gmail. | City of Grand Rapids | 2 | Kluge | Daniel |
| 2/9/2018 12:03:46AM | 7/17/2018 7:46:08PM | 29201812034673964625... | edlasiowski@gmail. | edlasiowski@gmail. | City of Grand Rapids | 3 | Blakely | Chelsea |

- 931, 932, 933, 934, 935, 936, 938, 939, 940

930B

| cEvidence... | nActive | Company | Job Title | BusinessStreet | BusinessCity | BusinessState | BusinessP... | BusinessCountryR... | BusinessPhone | BusinessP... | MobilePhone | Email |
|---|---|---|---|---|---|---|---|---|---|---|---|---|
| | 1 | Superior | Scientist | 797 Post Ave. | Clearwater | MN | 56354 | | | | | dowen@us.superior. |
| | 1 | Superior | Principal Scientist | 333848 Pinnickinnick | Newark | NJ | 7102 | | | | | fwerfel@us.superior. |
| | 1 | Superior | Program Manager | Rua Salvador, 1355 | Sao Paulo | SP | 01257-110 | | | | | scarvalho@ltda. |
| | 1 | Superior | Patent Coordinator | Augsburger Starbe | Herne | North Rhine- | 44652 | | | | | dkluge@de.superior. |
| | 1 | Superior | Patent Atty | 2238 Frank Ave. | Springfield | MA | 11005 | | | | | cblakely@us. |

- 941, 942, 943, 944, 945, 946, 947, 948, 949, 950, 951, 952, 953

930C

| OfficeLocation | Department | nConstant | SurveyCount | Completed... | Incomplete... | EvidenceC... | EvidenceA... | SurveyAnal... | SurveyInter... | LocationGroup |
|---|---|---|---|---|---|---|---|---|---|---|
| St. Cloud, MN | Research & | 1 | 1 | 1 | 0 | 0 | 1 | | 1 | United States - Data |
| New York, NY | Research & | 1 | 1 | 1 | 0 | 0 | 2 | | 1 | United States - Data |
| Sao Paulo, Brazil | Research & | 1 | 1 | 1 | 0 | 0 | 1 | | 1 | United States - Data |
| Arnsberg, Germany | Research & | 1 | 1 | 1 | 0 | 0 | 1 | | 1 | United States - Data |
| Springfield, MA | General Counsel | 1 | 1 | 1 | 0 | 1 | 2 | | 1 | United States - Data |

- 954, 955, 956, 957, 958, 959, 960, 961, 962, 963, 964

970A

| RecordID | ReleaseAnalysisText | RelatedSurveyID | ProportionalityType | Rank1Low | Rank1High | Rank2Low | Rank2High | Rank3Low | Rank3High | Rank4Low | Rank4High | TotalPossible |
|---|---|---|---|---|---|---|---|---|---|---|---|---|
| 2122018156481992 | Company1 | 2122018549149597009 | Manual | 1 | 1 | 2 | 2 | 3 | 3 | 4 | 4 | 12 |

970B

| RecordID | RelatedReleaseAnalysisID | ReleaseAnalysisType | ReleaseAnalysisLabel | RA_QuestionNumber | ProportionalityYesValue | ProportionalityNoValue | ProportionalityYesValueOverride | ProportionalityNoValueOverride | ReleaseAnalysisExplainRequired | MaxRAScore |
|---|---|---|---|---|---|---|---|---|---|---|
| 2122018156480943 | 2122018156481992854856 | Selection | Were you involved in any of... | 1 | 4 | 0 | | | | 4 |
| 2122018157219365 | 2122018156481992854856 | Selection | Were you involved in any of... | 2 | 1 | 0 | | | | 1 |
| 2122018157529190 | 2122018156481992854856 | Selection | Can you confirm if any of the... | 3 | 1 | 0 | | | | 1 |
| 2122018158224966 | 2122018156481992854856 | Selection | Were you involved in any... | 4 | 1 | 0 | | | | 1 |
| 2122018158500139 | 2122018156481992854856 | Text | To the best of your... | 5 | | | | | | 2 |

970C

| TimeStampCreated | TimeStampModified | RecordID | CreationName | ModifiedName | RelatedQuestionID | ReleaseAnalysisText | ReleaseAnalysisL... | ReleaseStatus |
|---|---|---|---|---|---|---|---|---|
| 2/12/2018 1:56:48AM | 3/20/2018 10:56:08AM | 2122018156480433 | edlasiowski@gmail. | edlasiowski@gmail. | 2122018549149597009 | | Were you involved in | |
| 2/12/2018 1:57:21AM | 3/20/2018 10:55:13AM | 2122018157219365 | edlasiowski@gmail. | edlasiowski@gmail. | 2122018549149597009 | | Were you involved in | |
| 2/12/2018 1:57:52AM | 3/20/2018 10:55:13AM | 2122018157529190 | edlasiowski@gmail. | edlasiowski@gmail. | 2122018549149597009 | | Can you confirm if any | |
| 2/12/2018 1:58:22AM | 3/20/2018 10:55:13AM | 2122018158224966 | edlasiowski@gmail. | edlasiowski@gmail. | 2122018549149597009 | | Were you involved in | |

FIG. 27C

| | PrimaryKey | CreationTimestamp | CreatedBy | ModificationTimestamp | ModifiedBy | Name | MatterID |
|---|---|---|---|---|---|---|---|
| N | 0281217D-2715 | 7/14/2018 11:16:57PM | admin | 7/14/2018 11:25:23PM | admin | Foreign Country - Data Source | 2122201854914959707009 |
| O | 392CC285-318E- | 7/14/2018 11:21:44PM | admin | 7/14/2018 11:28:20PM | admin | United States - Data Source | 2122201854914959707009 |
| P | 70E63CFA-32B9 | 7/14/2018 11:28:21PM | admin | 7/14/2018 11:28:45PM | admin | Foreign Country - Data Source | 2142201845230266713091 |
| Q | 596D7CA3-2CE1- | 7/14/2018 11:29:15PM | admin | 7/14/2018 11:29:58PM | admin | United States - Data Source | 2142201845230266713091 |
| R | 6F8E5F77-5382 | 7/14/2018 11:30:08PM | admin | 7/14/2018 11:30:22PM | admin | Foreign Country - Data Source | 2242201880546289581618 |
| S | 2D52F8A1-5FDE- | 7/15/2018 11:21:24PM | admin | 7/15/2018 11:21:24PM | admin | African - Data Source | 2122201854914959707009 |
| T | 207A5D41-9F78- | 7/16/2018 2:59:45PM | admin | 7/16/2018 2:59:45PM | admin | Asian - Data Source | 2122201854914959707009 |

FIG. 27D

| | tiTimeStampCreated | tiTimeStampModified | tSerial | nConstant | EvidenceType | Collection... | FK_CaseDataPrimaryKey | LocationGroup | LowCostE... | MediumCo... | HighCostE... | EvidenceTypePri... |
|---|---|---|---|---|---|---|---|---|---|---|---|---|
| u | 2/12/2018 12:55:01PM | 2/12/2018 12:55:01PM | 2122181255182148 | 1 | Computer | 3 | 2122201854914959707069 | Asian - Data Source | 220 | 300 | 410 | 028121702715 |
| v | 2/12/2018 12:56:48PM | 2/12/2018 12:56:48PM | 2122181256486854228 | 1 | Email | 1 | 2122201854914959707069 | Foreign Country - | 400 | 500 | 1100 | 028121702715 |
| w | 2/12/2018 12:56:54PM | 2/12/2018 12:56:54PM | 2122181256545452383 | 1 | Network Share | 2 | 2122201854914959707069 | Foreign Country - | 300 | 325 | 1100 | 028121702715 |
| x | 2/12/2018 12:57:08PM | 2/12/2018 12:57:08PM | 2122181257808445956 | 1 | Department Share | 3 | 2122201854914959707069 | Foreign Country - | | | | 028121702715 |
| y | 2/12/2018 12:57:33PM | 2/12/2018 12:57:33PM | 2122181257335325701 | 1 | Mobile Device | 1 | 2122201854914959707069 | Foreign Country - | 200 | 300 | 400 | 026121702715 |

| | tTimeStampCreated | tTimeStampModified | tSerial | tCreatedUserName | tModifiedUserName | tEvidenceItemNum... | tCollectedBy | tCollectionDate | tCollectionMethod |
|---|---|---|---|---|---|---|---|---|---|
| AA | 2/13/2018 11:38:03AM | 6/26/2018 9:17:28AM | 21320181380327542254B | admin | admin | 16-001 | | | |
| BB | 3/20/2018 11:22:22AM | 6/6/2018 10:09:18AM | 32020181122228939B567 | ediasiowski@gmail. | admin | 6-004 | | | |
| CC | 3/20/2018 11:38:10AM | 7/16/2018 10:51:59AM | 32020181138107041566815 | ediasiowski@gmail. | City of Grand Rapids | 3-065 | Brandon Fannon | 7/3/2018 | |
| DD | 3/20/2018 11:38:10AM | 7/2/2018 9:35:50AM | 32020181138107041568615 | ediasiowski@gmail. | admin | 3-006 | | | |
| EE | 3/20/2018 11:38:10AM | 6/4/2018 10:29:10AM | 32020181138102560988831 | ediasiowski@gmail. | admin | 3-017 | | | |
| FF | 3/20/2018 11:41:47AM | 3/21/2018 3:40:12AM | 32020181141472974164G | ediasiowski@gmail. | admin | 1-008 | | | |
| GG | 3/20/2018 11:50:56AM | 7/2/2018 9:35:51AM | 32020181150567415430G13 | ediasiowski@gmail. | admin | 2-069 | | | |

| | tDeviceModel | tDeviceSerialNumber | tEvidenceType | tDestinationMake | tDestinationModel | tDestinationSerial... | tDestinationType | tEncrypted | tEncryptionType | tHardDriveMake |
|---|---|---|---|---|---|---|---|---|---|---|
| AA | | | Paper Document | | | | | | | |
| BB | Yes | | Computer | | | | | | | |
| CC | Acer | | Computer | | | | | | | |
| DD | | | Network Share | | | | | | | |
| EE | | | Removable Media | | | | | | | |
| FF | Yes | | Computer | | | | | | | |
| GG | Yes | | Computer | | | | | | | |

| | tHardDriveModel | tHardDriveSize | tDeviceSize | tRelCaseSerialID | tSharePath | tShareType | tSource | OperatingSystem | tSDCard | tRelatedCustodianPriKey |
|---|---|---|---|---|---|---|---|---|---|---|
| AA | | | | 21122018549149597070G9 | | | | | | 29220181212144593602766Z |
| BB | | | | 21122018549149597070G9 | | | | | | 29220181113415779731652 |
| CC | | | | 21122018549149597070G9 | | | | | | 29220181203467396462BS |
| DD | | | | 21122018549149597070G9 | | User Share | | | | 29220181203467396462S5 |
| EE | | | | 21122018549149597070G9 | | | | | | 29220181203467396462SS |
| FF | | | | 21122018549149597070G9 | | | | | | 29220181144143113699969 |
| GG | | | | 21122018549149597070G9 | | | | | | 29220181151286116153BS3 |

| | tCollection... | nActive | nComplete | cEvidenceSort | tDeviceType | CollectionRanking | InterviewPK | CustodianRanking |
|---|---|---|---|---|---|---|---|---|
| AA | | | 0 | | Laptop | 4 | 32020181121025985S | 4 |
| BB | | 1 | 0 | | Tablet | 2 | 32020181128089796 | 2 |
| CC | 18:00 | 1 | 0 | | Desktop | 2 | 32020181129188011 | 4 |
| DD | | 1 | 0 | | | 1 | 3202018112939236Z0 | 4 |
| EE | | 1 | 0 | | | 3 | 32020181140225263 | 4 |
| FF | | 1 | 0 | | Laptop | 2 | 3202018114311369 | 3 |
| GG | | 1 | 0 | | Laptop | 2 | 32020181147415307 | 4 |

| Table Name | Ref # | Description |
|---|---|---|
| Matter Table | EO_001 | Matter metadata |
| - CaseData | EO_001_01 | Matter Admin Information |
| - AttorneyList | EO_001_02 | Tracks Defendant/Plaintiff attorneys |
| Custodian | EO_002 | Custodian metadata |
| CustodianData | EO_002_01 | Holds custodian data used in PDA |
| - CustodiantoMatter | EO_002_02 | Links the Custodian to the Matter(s) |
| - CustodianBinValues | EO_002_03 | Hold costs estimation info for data sources in PDA |
| - CustodianBin | EO_002_04 | Hold costs estimation info for approved/unapproved data sources in PDA |
| Evidence | EO_003 | Data Sources metadata |
| - EvidenceTypeConfiguration | EO_003_03 | Holds the data source rank and costs associated with data source type |
| - Chain of Custody | EO_003_04 | Holds the chain of custody for the data sources moving in and out of the system |
| - Hard Drives | EO_003_05 | Holds data specific to the hard drive data source |
| - PreservationLocation | EO_003_06 | Example of recordkeeping for devices through EDRM |
| - DestinationMedia | EO_003_07 | Device information: model, type, serial - location the data was stored when the image was created |
| - EDRM | EO_003_08 | Holds the values for the collection tracking data |
| Release Analysis | EO_004 | Holds link to Matter |
| - Release Analysis Part | EO_004_01 | Question parts and configuration for the custodian assessment |
| - RA_ConfiguationSettings | EO_004_02 | Holds configuration settings for custodian assessment question response |
| - RA_FieldSettings | EO_004_03 | Hold the configuration settings for the hold/release of each assessment question |
| Question | EO_005 | Survey setup and response |
| - Question Part | EO_005_01 | Survey setup and response |
| Analysis | EO_006 | Analysis Setup and response |
| - Analysis Part | EO_006_01 | Analysis Setup and response |
| Interview | EO_007 | Interview setup and response |
| - Interview Configuration Settings | EO_007_01 | Interview setup and response |
| - Interview Part | EO_007_02 | Interview setup and response |
| ReportScheduler | EO_009 | Defines scheduled report parameters |

FIG. 28

| Table Name | Table Ref # | Field Name | Field Ref # | Description | Module/UI Reference |
|---|---|---|---|---|---|
| Matter | EO_001 | RecordID | EO_001_0001 | Unique identifier | Dashboard; PDA; Data Sources; |
| Matter | EO_001 | tCaseNumber | EO_001_0002 | Internal Case number assigned to each matter | Matter Admin |
| Matter | EO_001 | tCaseDescription | EO_001_0003 | Short description of the matter | Matter Admin |
| Matter | EO_001 | tCaseName | EO_001_0004 | Unique Case name assigned to each matter | Matter Admin |
| Matter | EO_001 | nActive | EO_001_0005 | dB related field, not used by user | Matter Admin |
| Matter | EO_001 | tActiveCase | EO_001_0006 | dB related field, not used by user | Matter Admin |
| Matter | EO_001 | Date Added | EO_001_0007 | Date the matter was added to the system | Matter Admin |
| Matter | EO_001 | Plaintiff | EO_001_0008 | Attorney representing the plaintiff | Matter Admin |
| Matter | EO_001 | Defendant | EO_001_0009 | Attorney representing the defendant | Matter Admin |
| Matter | EO_001 | Stat_Custodian | EO_001_0010 | Total # of Custodians - calculated from Custodian Table | Dashboard |
| Matter | EO_001 | MatterDetails | EO_001_0011 | Description of Matter (case) | Matter Admin |
| Matter | EO_001 | Stats_CustodianSurveyCompletePercent | EO_001_0012 | Holds calculated value related to survey completion | Matter Admin; Dashboard; Lists |
| Matter | EO_001 | Stats_CustodianSurveyCompleted | EO_001_0013 | Holds value related to survey completion | Matter Admin; Dashboard; Lists |
| Matter | EO_001 | Stats_CustodianSurveyHeld | EO_001_0014 | Holds value related to survey completion | Matter Admin; Dashboard; Lists |
| Matter | EO_001 | Stats_CustodianSurveyRemaining | EO_001_0015 | Holds value related to survey completion | Matter Admin; Dashboard; Lists |
| Matter | EO_001 | Stats_CustodianAnalysisNotAvailable | EO_001_0016 | Holds value related to analysis completion | Matter Admin; Dashboard; Lists |
| Matter | EO_001 | Stats_CustodianAnalysisNotDone | EO_001_0017 | Holds value related to analysis completion | Matter Admin; Dashboard; Lists |
| Matter | EO_001 | Stats_CustodianAnalysisComplete | EO_001_0018 | Holds value related to analysis completion | Matter Admin; Dashboard; Lists |
| Matter | EO_001 | Stats_CustodianInterviewCompletePercent | EO_001_0019 | Holds calculated value related to Interview completion | Matter Admin; Dashboard; Lists |
| Matter | EO_001 | Stats_CustodianInterviewReleased | EO_001_0020 | Holds value related to interview completion | Matter Admin; Dashboard; Lists |
| Matter | EO_001 | Stats_CustodianInterviewHeld | EO_001_0021 | Holds value related to interview completion | Matter Admin; Dashboard; Lists |
| Matter | EO_001 | Stats_CustodianInterviewRemaining | EO_001_0022 | Holds value related to interview completion | Matter Admin; Dashboard; Lists |
| Matter | EO_001 | Stats_CustodianPreInterviewReleased | EO_001_0023 | Holds value related to preinterview completion | Matter Admin; Dashboard; Lists |
| Matter | EO_001 | Stats_CustodianPreInterviewHeld | EO_001_0024 | Holds value related to preinterview completion | Matter Admin; Dashboard; Lists |

FIG. 29

| Table Name | Table Ref # | Field Name | Field Ref # | Description | Module/UI Reference |
|---|---|---|---|---|---|
| CaseData | EO_001_01 | RecordID | EO_001_01_0001 | Unique identifier | Matter Admin |
| CaseData | EO_001_01 | tCaseNumber | EO_001_01_0002 | Internal Case number assigned to each matter | Matter Admin |
| CaseData | EO_001_01 | tCaseDescription | EO_001_01_0003 | Short description of the matter | Matter Admin |
| CaseData | EO_001_01 | tCaseName | EO_001_01_0004 | Unique Case name assigned to each matter | Matter Admin |
| CaseData | EO_001_01 | cConstant | EO_001_01_0005 | constant value of 1 used for database relationships | Matter Admin |
| CaseData | EO_001_01 | cCustodianCount | EO_001_01_0006 | # Custodians in matter | Matter Admin |
| CaseData | EO_001_01 | cEvidenceCount | EO_001_01_0007 | # Data Sources in matter | Matter Admin |
| CaseData | EO_001_01 | cDate | EO_001_01_0008 | calculated field to show the entered date in correct format | Matter Admin |
| CaseData | EO_001_01 | nActive | EO_001_01_0009 | dB related field, not used by user | Matter Admin |
| CaseData | EO_001_01 | tActiveCase | EO_001_01_0010 | dB related field, not used by user | Matter Admin |
| CaseData | EO_001_01 | DateAdded | EO_001_01_0011 | Date the matter was added to the system | Matter Admin |
| CaseData | EO_001_01 | Plaintiff | EO_001_01_0012 | Plaintiff representative | Matter Admin |
| CaseData | EO_001_01 | Defendant | EO_001_01_0013 | Defendant representative | Matter Admin |
| CaseData | EO_001_01 | Stats_CustodiansOnMatter | EO_001_01_0014 | Custodian metrics | Matter Admin; Dashboard; Lists |
| CaseData | EO_001_01 | Stats_CustodianInterviewCompletePercent | EO_001_01_0015 | Custodian metrics | Matter Admin; Dashboard; Lists |
| CaseData | EO_001_01 | Stats_CustodianInterviewReleased | EO_001_01_0016 | Custodian metrics | Matter Admin; Dashboard; Lists |
| CaseData | EO_001_01 | Stats_CustodianInterviewHeld | EO_001_01_0017 | Custodian metrics | Matter Admin; Dashboard; Lists |
| CaseData | EO_001_01 | Stats_CustodianInterviewRemaining | EO_001_01_0018 | Custodian metrics | Matter Admin; Dashboard; Lists |
| CaseData | EO_001_01 | MatterDetails | EO_001_01_0019 | Description of the matter | Matter Admin; Dashboard; Lists |
| CaseData | EO_001_01 | Stats_CustodianSurveyCompletePercent | EO_001_01_0020 | Custodian Evaluation metrics | Matter Admin; Dashboard; Lists |
| CaseData | EO_001_01 | Stats_CustodianSurveyCompleted | EO_001_01_0021 | Custodian Evaluation metrics | Matter Admin; Dashboard; Lists |
| CaseData | EO_001_01 | Stats_CustodianSurveyHeld | EO_001_01_0022 | Custodian Evaluation metrics | Matter Admin; Dashboard; Lists |
| CaseData | EO_001_01 | Stats_CustodianSurveyRemaining | EO_001_01_0023 | Custodian Evaluation metrics | Matter Admin; Dashboard; Lists |
| CaseData | EO_001_01 | Stats_CustodianAnalysisNotAvailable | EO_001_01_0024 | Custodian Evaluation metrics | Matter Admin; Dashboard; Lists |
| CaseData | EO_001_01 | Stats_CustodianAnalysisNotDone | EO_001_01_0025 | Custodian Evaluation metrics | Matter Admin; Dashboard; Lists |
| CaseData | EO_001_01 | Stats_CustodianAnalysisCompleted | EO_001_01_0026 | Custodian Evaluation metrics | Matter Admin; Dashboard; Lists |
| CaseData | EO_001_01 | Stats_CustodianPreInterviewReleased | EO_001_01_0027 | Custodian Evaluation metrics | Matter Admin; Dashboard; Lists |
| CaseData | EO_001_01 | Stats_CustodianPreInterviewHeld | EO_001_01_0028 | Custodian Evaluation metrics | Matter Admin; Dashboard; Lists |
| CaseData | EO_001_01 | BuilderOrMatterPositionValue | EO_001_01_0029 | constant value of 1 used for database relationships | internal |
| CaseData | EO_001_01 | globalContainer | EO_001_01_0030 | system field used for temporary holding of image | internal |
| CaseData | EO_001_01 | Stats_ProportionRank0 | EO_001_01_0031 | PDA Metrics | Matter Admin; Dashboard; Lists |
| CaseData | EO_001_01 | Stats_ProportionRank1 | EO_001_01_0032 | PDA Metrics | Matter Admin; Dashboard; Lists |
| CaseData | EO_001_01 | Stats_ProportionRank2 | EO_001_01_0033 | PDA Metrics | Matter Admin; Dashboard; Lists |
| CaseData | EO_001_01 | Stats_ProportionRank3 | EO_001_01_0034 | PDA Metrics | Matter Admin; Dashboard; Lists |
| CaseData | EO_001_01 | Stats_ProportionRank4 | EO_001_01_0035 | PDA Metrics | Matter Admin; Dashboard; Lists |
| CaseData | EO_001_01 | Stats_CustodianAnalysisCompletedPercent | EO_001_01_0036 | Custodian Evaluation metrics | Matter Admin; Dashboard; Lists |
| CaseData | EO_001_01 | RequiresHoldExplanation | EO_001_01_0037 | Hold/Release metrics | Matter Admin/Lists/PDA |
| CaseData | EO_001_01 | RequiresReleaseExplanation | EO_001_01_0038 | Hold/Release metrics | Matter Admin/Lists/PDA |
| CaseData | EO_001_01 | OptionalHoldExplanation | EO_001_01_0039 | Hold/Release metrics | Matter Admin/Lists/PDA |
| CaseData | EO_001_01 | OptionalReleaseExplanation | EO_001_01_0040 | Hold/Release metrics | Matter Admin/Lists/PDA |
| CaseData | EO_001_01 | MatterAbbreviation | EO_001_01_0041 | Abbreviation | Matter Admin/Lists/PDA |

FIG. 30

| Table Name | Table Ref # | Field Name | Field Ref # | Description | Module/UI Reference |
|---|---|---|---|---|---|
| AttorneyList | EO_001_02 | RecordID | EO_001_02_0001 | Unique identifier | Matter Admin |
| AttorneyList | EO_001_02 | tUserAdded | EO_001_02_0002 | Who added information | Matter Admin |
| AttorneyList | EO_001_02 | tUserModified | EO_001_02_0003 | Who modified information | Matter Admin |
| AttorneyList | EO_001_02 | AttorneyName | EO_001_02_0004 | Name of Attorney | Matter Admin |
| AttorneyList | EO_001_02 | AttorneySide | EO_001_02_0005 | Plaintiff/Defendant choice | Matter Admin |
| AttorneyList | EO_001_02 | MatterRelatedID | EO_001_02_0006 | Matter ID | Matter Admin |

FIG. 31

| Table Name | Table Ref # | Field Name | Field Ref# | Description | Module/UI Reference |
|---|---|---|---|---|---|
| Custodian | EO_002 | tSerial | EO_002_0001 | Unique ID associated with custodian | Custodian Admin |
| Custodian | EO_002 | nCustodianNumber | EO_002_0002 | Sequential # assigned to custodian | Custodian Admin |
| Custodian | EO_002 | tCustodianLastName | EO_002_0003 | Custodian Last Name | Custodian Admin; Custodian Business Card; Custodian Evaluation; PDA; |
| Custodian | EO_002 | tCustodianFirstName | EO_002_0004 | Custodian First Name | Custodian Admin; Custodian Business Card; Custodian Evaluation; PDA; |
| Custodian | EO_002 | cEvidenceCount | EO_002_0005 | # Data Sources associated with custodian | Custodian Admin; Custodian Business Card; Custodian Evaluation; PDA; |
| Custodian | EO_002 | Company | EO_002_0006 | Employer company of custodian | Custodian Admin; Custodian Business Card |
| Custodian | EO_002 | JobTitle | EO_002_0007 | Job title | Custodian Admin; Custodian Business Card |
| Custodian | EO_002 | BusinessStreet | EO_002_0008 | Street Address of company | Custodian Admin; Custodian Business Card |
| Custodian | EO_002 | BusinessCity | EO_002_0009 | City | Custodian Admin; Custodian Business Card; PDA; |
| Custodian | EO_002 | BusinessState | EO_002_0010 | State | Custodian Admin; Custodian Business Card; PDA; |
| Custodian | EO_002 | BusinessPostalCode | EO_002_0011 | Postal Code | Custodian Admin; Custodian Business Card |
| Custodian | EO_002 | BusinessCountryRegion | EO_002_0012 | Country | Custodian Admin; Custodian Business Card; PDA; |
| Custodian | EO_002 | BusinessPhone | EO_002_0013 | Phone | Custodian Admin; Custodian Business Card |
| Custodian | EO_002 | BusinessPhone2 | EO_002_0014 | Phone 2 | Custodian Admin; Custodian Business Card |
| Custodian | EO_002 | MobilePhone | EO_002_0015 | Mobile phone | Custodian Admin; Custodian Business Card |
| Custodian | EO_002 | Email | EO_002_0016 | email address | Custodian Admin; Custodian Business Card |
| Custodian | EO_002 | OfficeLocation | EO_002_0017 | Office location | Custodian Admin; Custodian Business Card; PDA; |
| Custodian | EO_002 | Department | EO_002_0018 | Department | Custodian Admin; Custodian Business Card; PDA; |
| Custodian | EO_002 | nConstant | EO_002_0019 | Used for relationship building - always a value of 1. | Custodian Admin |
| Custodian | EO_002 | SurveyCount | EO_002_0020 | # surveys associated with custodian | Custodian Administration |
| Custodian | EO_002 | CompletedSurveyCount | EO_002_0021 | # surveys completed by custodian | Custodian Administration |
| Custodian | EO_002 | IncompleteSurveyCount | EO_002_0022 | # survey not yet completed by custodian | Custodian Administration |
| Custodian | EO_002 | EvidenceCollectedCount | EO_002_0023 | # Data Sources associated with custodian that have been collected | Custodian Administration |
| Custodian | EO_002 | EvidenceAddedCount | EO_002_0024 | # Data Sources associated with custodian entered into system | Custodian Administration; Custodian Evaluation |
| Custodian | EO_002 | SurveyAnalysisCount | EO_002_0025 | # Analysis associated with custodian | Custodian Administration |
| Custodian | EO_002 | SurveyInterviewCount | EO_002_0026 | # interviews associated with custodian | Custodian Administration |
| Custodian | EO_002 | LocationGroup | EO_002_0027 | Location group of custodian | Custodian Administration; PDA |
| Custodian | EO_002 | cRankSort | EO_002_0028 | Internal system field used for sorting | internal |
| Custodian | EO_002 | cVisibleNameDecider | EO_002_0029 | Internal system field | internal |
| Custodian | EO_002 | Country | EO_002_0030 | Country | Custodian Admin |
| Custodian | EO_002 | NTiD | EO_002_0031 | Active directory name in company | Custodian Admin |
| Custodian | EO_002 | Tier | EO_002_0032 | Custodian grouping | Custodian Admin |
| Custodian | EO_002 | EmployeeID | EO_002_0033 | Employee ID supplied by company (if available) | Custodian Admin |

FIG. 32

| Table Name | Table Ref # | Field Name | Field Ref # | Description | Module/UI Reference |
|---|---|---|---|---|---|
| Custodian Data | EO_002_01 | tSerial | EO_002_01_0001 | Primary Key for the custodian record | Custodian Admin; Custodian Business Card; Custodian Evaluation; PDA; |
| Custodian Data | EO_002_01 | nCustodianNumber | EO_002_01_0004 | Unique custodian # assigned by system | Custodian Admin; Custodian Business Card; Custodian Evaluation; PDA; |
| Custodian Data | EO_002_01 | tCustodianLastName | EO_002_01_0005 | Last name | Custodian Admin; Custodian Business Card; Custodian Evaluation; PDA; |
| Custodian Data | EO_002_01 | tCustodianFirstName | EO_002_01_0006 | First name | Custodian Admin; Custodian Business Card; Custodian Evaluation; PDA; |
| Custodian Data | EO_002_01 | cEvidenceCount | EO_002_01_0007 | Number of Data sources | Custodian Admin; Custodian Business Card; Custodian Evaluation; PDA; |
| Custodian Data | EO_002_01 | Company | EO_002_01_0008 | Company | Custodian Admin; Custodian Business Card; Custodian Evaluation; PDA; |
| Custodian Data | EO_002_01 | JobTitle | EO_002_01_0009 | JobTitle | Custodian Admin; Custodian Business Card; Custodian Evaluation; PDA; |
| Custodian Data | EO_002_01 | BusinessStreet | EO_002_01_0010 | BusinessStreet | Custodian Admin; Custodian Business Card; Custodian Evaluation; PDA; |
| Custodian Data | EO_002_01 | Business City | EO_002_01_0011 | Business City | Custodian Admin; Custodian Business Card; Custodian Evaluation; PDA; |
| Custodian Data | EO_002_01 | Business State | EO_002_01_0012 | Business State | Custodian Admin; Custodian Business Card; Custodian Evaluation; PDA; |
| Custodian Data | EO_002_01 | BusinessCountryRegion | EO_002_01_0013 | BusinessCountryRegion | Custodian Admin; Custodian Business Card; Custodian Evaluation; PDA; |
| Custodian Data | EO_002_01 | BusinessPhone | EO_002_01_0014 | BusinessPhone | Custodian Admin; Custodian Business Card; Custodian Evaluation; PDA; |
| Custodian Data | EO_002_01 | BusinessPhone2 | EO_002_01_0015 | BusinessPhone2 | Custodian Admin; Custodian Business Card; Custodian Evaluation; PDA; |
| Custodian Data | EO_002_01 | MobilePhone | EO_002_01_0016 | MobilePhone | Custodian Admin; Custodian Business Card; Custodian Evaluation; PDA; |
| Custodian Data | EO_002_01 | Email | EO_002_01_0017 | Email | Custodian Admin; Custodian Business Card; Custodian Evaluation; PDA; |
| Custodian Data | EO_002_01 | OfficeLocation | EO_002_01_0018 | OfficeLocation | Custodian Admin; Custodian Business Card; Custodian Evaluation; PDA; |
| Custodian Data | EO_002_01 | Department | EO_002_01_0019 | Department | Custodian Admin; Custodian Business Card; Custodian Evaluation; PDA; |
| Custodian Data | EO_002_01 | nConstant | EO_002_01_0020 | Used for relationship building - always a value of 1. | internal |
| Custodian Data | EO_002_01 | nActive | EO_002_01_0021 | Indicates if a custodian is active or not | Custodian Admin, PDA |
| Custodian Data | EO_002_01 | dFullAddress | EO_002_01_0023 | Aggregated custodian address | Custodian Admin; Custodian Business Card; Custodian Evaluation; |
| Custodian Data | EO_002_01 | Password | EO_002_01_0024 | Password for system access | System admin |
| Custodian Data | EO_002_01 | CustodianUserName | EO_002_01_0025 | UID for system access | System Admin |
| Custodian Data | EO_002_01 | SurveyCount | EO_002_01_0026 | Number of Surveys associated with custodian | Custodian Admin, Dashboards |
| Custodian Data | EO_002_01 | CompletedSurveyCount | EO_002_01_0027 | Number of Surveys completed | Custodian Admin, Dashboards |
| Custodian Data | EO_002_01 | IncompleteSurveyCount | EO_002_01_0028 | Number of Surveys not completed | Custodian Admin, Dashboards |
| Custodian Data | EO_002_01 | EvidenceCollectedCount | EO_002_01_0029 | Data Sources collected | Custodian Admin, Dashboards, Custodian Evaluation, PDA |
| Custodian Data | EO_002_01 | EvidenceAddedCount | EO_002_01_0030 | Data Sources that have been added for a custodian but not necessarily collected | Custodian Admin, Custodian Evaluation |
| Custodian Data | EO_002_01 | SurveyAnalysisCount | EO_002_01_0031 | Number of surveys that have an analysis completed | Custodian Admin, Custodian Evaluation |
| Custodian Data | EO_002_01 | SurveyInterviewCount | EO_002_01_0032 | Number of interviews associated with custodian | Custodian Admin, Custodian Evaluation |
| Custodian Data | EO_002_01 | cFullName_Legal | EO_002_01_0033 | Custodian LN, FN | Custodian Ribbon |
| Custodian Data | EO_002_01 | Country | EO_002_01_0034 | Country | Custodian Admin |
| Custodian Data | EO_002_01 | LocationGroup | EO_002_01_0035 | Location group of custodian | Custodian Admin, PDA |
| Custodian Data | EO_002_01 | cRankSort | EO_002_01_0036 | Internal system field used for sorting | internal |
| Custodian Data | EO_002_01 | cVisibleNameDecider | EO_002_01_0037 | Internal system field | internal |
| Custodian Data | EO_002_01 | c_NameCheck | EO_002_01_0038 | Internal system field | internal |
| Custodian Data | EO_002_01 | c_DepartmentCheck | EO_002_01_0039 | Internal system field | internal |
| Custodian Data | EO_002_01 | c_JobTitle_Check | EO_002_01_0040 | Internal system field | internal |
| Custodian Data | EO_002_01 | c_OfficeLocationCheck | EO_002_01_0041 | Internal system field | internal |
| Custodian Data | EO_002_01 | DT_HoldIssued | EO_002_01_0042 | Captures whether Hold has been issued | Custodian Evaluation, PDA |
| Custodian Data | EO_002_01 | DT_HoldAccepted | EO_002_01_0043 | Captures whether Hold has been accepted | Custodian Evaluation, PDA |
| Custodian Data | EO_002_01 | NTID | EO_002_01_0044 | Active directory name in company | Custodian Admin |
| Custodian Data | EO_002_01 | Tier | EO_002_01_0045 | Custodian grouping | Custodian Admin |
| Custodian Data | EO_002_01 | tCustodianMiddleName | EO_002_01_0046 | Custodian middle name | Custodian Admin |
| Custodian Data | EO_002_01 | EmployeeID | EO_002_01_0047 | Employee ID supplied by company (if available) | Custodian Admin |
| Custodian Data | EO_002_01 | cCity_State_Country | EO_002_01_0048 | Aggregated City, State, Country | Custodian Admin, Custodian Business Card |

FIG. 33

| Table Name | Table Ref # | Field Name | Field Ref # | Description | Module/UI Reference |
|---|---|---|---|---|---|
| CustodiantoMatter | EO_002_02 | RecordID | EO_002_02_0001 | Unique identifier for this link table | Internal |
| CustodiantoMatter | EO_002_02 | CustodianID | EO_002_02_0002 | Primary Record iD Custodian identifier used for db relationships | Internal |
| CustodiantoMatter | EO_002_02 | MatterID | EO_002_02_0003 | Unique matter identifier | Internal |
| CustodiantoMatter | EO_002_02 | HoldIssued | EO_002_02_0004 | Status tracking field | Custodian Evaluation |
| CustodiantoMatter | EO_002_02 | HoldAccepted | EO_002_02_0005 | Status tracking field | Custodian Evaluation |
| CustodiantoMatter | EO_002_02 | SurveyStatus | EO_002_02_0006 | Status tracking field | Custodian Evaluation |
| CustodiantoMatter | EO_002_02 | AnalysisStatus | EO_002_02_0007 | Status tracking field | Custodian Evaluation |
| CustodiantoMatter | EO_002_02 | InterviewStatus | EO_002_02_0008 | Status tracking field | Custodian Evaluation |
| CustodiantoMatter | EO_002_02 | ProportionalityStatus | EO_002_02_0009 | Status tracking field | Custodian Evaluation, PDA |
| CustodiantoMatter | EO_002_02 | CollectionStatus | EO_002_02_0010 | Status tracking field | Custodian Evaluation |
| CustodiantoMatter | EO_002_02 | PreInterviewStatus | EO_002_02_0011 | Status tracking field | Custodian Admin, Custodian Evaluation |
| CustodiantoMatter | EO_002_02 | DT_SurveyStarted | EO_002_02_0012 | Status tracking field | Custodian Admin, Custodian Evaluation |
| CustodiantoMatter | EO_002_02 | DT_SurveyCompleted | EO_002_02_0013 | Status tracking field | Custodian Admin, Custodian Evaluation |
| CustodiantoMatter | EO_002_02 | DT_AnalysisStarted | EO_002_02_0014 | Status tracking field | Custodian Admin, Custodian Evaluation |
| CustodiantoMatter | EO_002_02 | DT_AnalysisCompleted | EO_002_02_0015 | Status tracking field | Custodian Admin, Custodian Evaluation |
| CustodiantoMatter | EO_002_02 | DT_InterviewStatus | EO_002_02_0016 | Status tracking field | Custodian Admin, Custodian Evaluation |
| CustodiantoMatter | EO_002_02 | DT_Interview Completed | EO_002_02_0017 | Status tracking field | Custodian Admin, Custodian Evaluation |
| CustodiantoMatter | EO_002_02 | DT_PreIntStarted | EO_002_02_0018 | Status tracking field | Custodian Admin, Custodian Evaluation |
| CustodiantoMatter | EO_002_02 | DT_PreIntCompleted | EO_002_02_0019 | Status tracking field | Custodian Admin, Custodian Evaluation |
| CustodiantoMatter | EO_002_02 | cSurveyStatus | EO_002_02_0020 | Status tracking field | Custodian Admin, Custodian Evaluation |
| CustodiantoMatter | EO_002_02 | constant | EO_002_02_0021 | Unique field used in relationships | internal |
| CustodiantoMatter | EO_002_02 | cDateAdded | EO_002_02_0022 | Date record was created | internal |
| CustodiantoMatter | EO_002_02 | CustodianRanking | EO_002_02_0023 | Custodian Rank assigned based on Assessment | PDA |
| CustodiantoMatter | EO_002_02 | cAnalyst | EO_002_02_0024 | Status tracking field | Custodian Evaluation |
| CustodiantoMatter | EO_002_02 | cInterview | EO_002_02_0025 | Status tracking field | Custodian Evaluation |
| CustodiantoMatter | EO_002_02 | cEvidenceCount | EO_002_02_0026 | Status tracking field | Custodian Evaluation |
| CustodiantoMatter | EO_002_02 | ReleaseAnalysisStatus | EO_002_02_0027 | Status tracking field | Custodian Evaluation |
| CustodiantoMatter | EO_002_02 | CustodianProportionalitySummary | EO_002_02_0028 | Counts number of records matching a status value | PDA |
| CustodiantoMatter | EO_002_02 | ProportionalityStatusLabel | EO_002_02_0029 | Convert custodian relevancy numbers 1 thru 4 to low, med, high, priority | PDA |
| CustodiantoMatter | EO_002_02 | Phase | EO_002_02_0030 | Status tracking field | PDA |
| CustodiantoMatter | EO_002_02 | tAction | EO_002_02_0031 | Custodian status | PDA |
| CustodiantoMatter | EO_002_02 | specialKey | EO_002_02_0032 | Unique field used in relationships | internal |
| CustodiantoMatter | EO_002_02 | tDataSourceLocationGroup | EO_002_02_0033 | Custodian location | PDA |
| CustodiantoMatter | EO_002_02 | c_RankCheck | EO_002_02_0034 | Status tracking field | internal |
| CustodiantoMatter | EO_002_02 | c_PhaseCheck | EO_002_02_0035 | Status tracking field | internal |
| CustodiantoMatter | EO_002_02 | c_ActionCheck | EO_002_02_0036 | Status tracking field | internal |
| CustodiantoMatter | EO_002_02 | c_CustodianLegalName | EO_002_02_0037 | Custodian combined LN, FN | Custodian Admin, Custodian Evaluation |
| CustodiantoMatter | EO_002_02 | DT_HoldIssued | EO_002_02_0038 | Status tracking field | Custodian Evaluation |
| CustodiantoMatter | EO_002_02 | DT_HoldAccepted | EO_002_02_0039 | Status tracking field | Custodian Evaluation |
| CustodiantoMatter | EO_002_02 | custodianName | EO_002_02_0043 | Custodian combined LN, FN | Custodian Admin, Custodian Evaluation |

FIG. 34

| Table Name | Table Ref # | Field Name | Field Ref# | Description | Module/UI Reference |
|---|---|---|---|---|---|
| CustodianBinValues | EO_002_03 | PrimaryKey | EO_002_03_0001 | Primary key for record | Internal |
| CustodianBinValues | EO_002_03 | RelatedBinID | EO_002_03_0002 | Foreign key for the parent scenario record | Internal |
| CustodianBinValues | EO_002_03 | DataSourceID | EO_002_03_0003 | Primary key for the added data source | Internal |
| CustodianBinValues | EO_002_03 | EstimationofLowValue | EO_002_03_0004 | Estimated low cost for data source | PDA |
| CustodianBinValues | EO_002_03 | EstimationofMediumValue | EO_002_03_0005 | Estimate medium cost for data source | PDA, Dashboards |
| CustodianBinValues | EO_002_03 | EstimationofHighValue | EO_002_03_0006 | Estimated high cost for data source | PDA |

FIG. 35

| Table Name | Table Ref # | Field Name | Field Ref# | Description | Module/UI Reference |
|---|---|---|---|---|---|
| CustodianBin | EO_002_04 | PrimaryKey | EO_002_04_0001 | Primary key of the record | internal |
| CustodianBin | EO_002_04 | BinName | EO_002_04_0002 | Scenario Name | PDA |
| CustodianBin | EO_002_04 | SelectedLowValue | EO_002_04_0003 | Estimated low cost of selected data source | PDA |
| CustodianBin | EO_002_04 | SelectedMediumValue | EO_002_04_0004 | Estimated medium cost of selected data source | PDA |
| CustodianBin | EO_002_04 | SelectedHighValue | EO_002_04_0005 | Estimated high cost of selected data source | PDA |
| CustodianBin | EO_002_04 | Authorized | EO_002_04_0006 | Holds a 1 when the scenario is approved | PDA |
| CustodianBin | EO_002_04 | AuthorizedBy | EO_002_04_0007 | Indicates person approving whole scenario of data sources | PDA |
| CustodianBin | EO_002_04 | AuthorizedTimeStamp | EO_002_04_0008 | Date/Time of scenario approval | PDA |
| CustodianBin | EO_002_04 | RelatedMatterID | EO_002_04_0009 | Matter ID of any related matters | PDA |
| CustodianBin | EO_002_04 | BinCreatedBy | EO_002_04_0010 | Person creating the scenario - internal | PDA |
| CustodianBin | EO_002_04 | DataSourceCount | EO_002_04_0011 | Count of datasources added to the scenario | PDA |
| CustodianBin | EO_002_04 | PercentageAdded | EO_002_04_0012 | Percentage of datasources in scenario in relationship to all data sources | PDA |
| CustodianBin | EO_002_04 | cBarFill | EO_002_04_0013 | Internal system field | PDA |
| CustodianBin | EO_002_04 | ApprovedLowValue | EO_002_04_0014 | Estimated low cost of approved data source | PDA |
| CustodianBin | EO_002_04 | ApprovedMediumValue | EO_002_04_0015 | Estimated medium cost of approved data source | PDA, Dashboard |
| CustodianBin | EO_002_04 | ApprovedHighValue | EO_002_04_0016 | Estimated high cost of approved data source | PDA |
| CustodianBin | EO_002_04 | RemaningLowValue | EO_002_04_0017 | Estimated low cost of unapproved data source | PDA |
| CustodianBin | EO_002_04 | RemainingMediumValue | EO_002_04_0018 | Estimated medium cost of unapproved data source | PDA, Dashboard |
| CustodianBin | EO_002_04 | RemainingHighValue | EO_002_04_0019 | Estimated high cost of unapproved data source | PDA |
| CustodianBin | EO_002_04 | cPercentageCustodian | EO_002_04_0020 | Percentage of custodians in scenario in relationship to all custodians | PDA |
| CustodianBin | EO_002_04 | cApprovedDataSources | EO_002_04_0021 | Percentage showing the number of data sources in scenario approved in relationship to all data sources | PDA |

FIG. 36

| Table Name | Table Ref # | Field Name | Field Ref # | Description | Module/UI Reference |
|---|---|---|---|---|---|
| Evidence | EO_003 | tSerial | EO_003_0001 | Primary Key for Data Source record | Data Sources |
| Evidence | EO_003 | tEvidenceItemNumber | EO_003_0002 | Unique value assigned to each device. | Data Sources |
| Evidence | EO_003 | tCollectedBy | EO_003_0003 | Name of individual who collected data source. | Data Sources |
| Evidence | EO_003 | tiCollectionDate | EO_003_0004 | Date data source was collected. | Data Sources |
| Evidence | EO_003 | tCollectionMethod | EO_003_0005 | How the data source was collected. | Data Sources |
| Evidence | EO_003 | tDeviceMake | EO_003_0006 | Information about device. | Data Sources;Survey/Interview;PDA>Data Sources |
| Evidence | EO_003 | tDeviceModel | EO_003_0007 | Information about device. | Data Sources;Survey/Interview;PDA>Data Sources |
| Evidence | EO_003 | tDeviceSerialNumber | EO_003_0008 | Information about device. | Data Sources;Survey/Interview;PDA>Data Sources |
| Evidence | EO_003 | tDestinationMake | EO_003_0009 | Information about device. | Data Sources;Survey/Interview;PDA>Data Sources |
| Evidence | EO_003 | tDestinationModel | EO_003_0010 | Information about device. | Data Sources;Survey/Interview;PDA>Data Sources |
| Evidence | EO_003 | tDestinationSerialNumber | EO_003_0011 | Information about device. | Data Sources;Survey/Interview;PDA>Data Sources |
| Evidence | EO_003 | tDestinationType | EO_003_0012 | Information about device. | Data Sources;Survey/Interview;PDA>Data Sources |
| Evidence | EO_003 | tEncrypted | EO_003_0013 | Information about device. | Data Sources;Survey/Interview;PDA>Data Sources |
| Evidence | EO_003 | tEncryptionType | EO_003_0014 | Information about device. | Data Sources;Survey/Interview;PDA>Data Sources |
| Evidence | EO_003 | tDeviceSize | EO_003_0015 | Information about device. | Data Sources;Survey/Interview;PDA>Data Sources |
| Evidence | EO_003 | tRelCaseSerialID | EO_003_0016 | Matter ID for cases where this data source is assigned | Matter Admin; Dashboards; PDA |
| Evidence | EO_003 | tSharePathShareType | EO_003_0017 | Information about device. | Data Sources;Survey/Interview;PDA>Data Sources |
| Evidence | EO_003 | tSource | EO_003_0018 | Information about device. | Data Sources;Survey/Interview;PDA>Data Sources |
| Evidence | EO_003 | OperatingSystem | EO_003_0019 | Information about device. | Data Sources;Survey/Interview;PDA>Data Sources |
| Evidence | EO_003 | tCustodianKey | EO_003_0020 | Custodian ID for custodian who owns this data source. | Data Sources;Survey/Interview;PDA>Data Sources |
| Evidence | EO_003 | nEvidenceNumber | EO_003_0021 | Information about device. | Data Sources;Survey/Interview;PDA>Data Sources |
| Evidence | EO_003 | tDeviceType | EO_003_0022 | Information about device. | Data Sources;Survey/Interview;PDA>Data Sources |
| Evidence | EO_003 | tRelatedCustodianPriKey | EO_003_0023 | Custodian ID for custodian who owns this data source. | Data Sources;Survey/Interview;PDA>Data Sources |
| Evidence | EO_003 | tCollectionTime | EO_003_0024 | Time the data source was collected. | Data Sources |
| Evidence | EO_003 | tPhoneCarrier | EO_003_0025 | Information about device. | Data Sources;Survey/Interview;PDA>Data Sources |
| Evidence | EO_003 | tOSVersion | EO_003_0026 | Information about device. | Data Sources;Survey/Interview;PDA>Data Sources |
| Evidence | EO_003 | tMEID | EO_003_0027 | Information about device. | Data Sources;Survey/Interview;PDA>Data Sources |
| Evidence | EO_003 | TWiFiMAC | EO_003_0028 | Information about device. | Data Sources;Survey/Interview;PDA>Data Sources |
| Evidence | EO_003 | tPhoneNumber | EO_003_0029 | Information about device. | Data Sources;Survey/Interview;PDA>Data Sources |
| Evidence | EO_003 | tDeviceEnclosureSN | EO_003_0030 | Information about device. | Data Sources;Survey/Interview;PDA>Data Sources |
| Evidence | EO_003 | tEvidenceDescription | EO_003_0031 | Unique field used in relationships | Admin |
| Evidence | EO_003 | nActive | EO_003_0032 | Information about removable media device | Data Sources;Survey/Interview;PDA>Data Sources |
| Evidence | EO_003 | tFormFactor | EO_003_0033 | Information about mobile device | Data Sources;Survey/Interview;PDA>Data Sources |
| Evidence | EO_003 | tCCID | EO_003_0034 | Information about device. | Data Sources;Survey/Interview;PDA>Data Sources |
| Evidence | EO_003 | tSIM | EO_003_0035 | Information about device. | Data Sources;Survey/Interview;PDA>Data Sources |
| Evidence | EO_003 | tCPUName | EO_003_0036 | Information about device. | Data Sources;Survey/Interview;PDA>Data Sources |
| Evidence | EO_003 | nComplete | EO_003_0037 | Identifies whether collection is complete for data source. | Data Sources; PDA>Data Sources; PDA>Scenarios |
| Evidence | EO_003 | cComputer | EO_003_0038 | Information about device. | Data Sources;Survey/Interview;PDA>Data Sources |
| Evidence | EO_003 | cHardDrive | EO_003_0039 | Information about device. | Data Sources;Survey/Interview;PDA>Data Sources |
| Evidence | EO_003 | tOriginalData | EO_003_0040 | Information about device. | Data Sources;Survey/Interview;PDA>Data Sources |
| Evidence | EO_003 | tDeviceSizeType | EO_003_0041 | Information about device. | Data Sources;Survey/Interview;PDA>Data Sources |
| Evidence | EO_003 | tiMei | EO_003_0042 | Information about mobile device. | Data Sources;Survey/Interview;PDA>Data Sources |
| Evidence | EO_003 | InterviewPX | EO_003_0043 | Primary Key of the Interview where the data source was identified. | Matter Admin; Survey/Interview; Lists |
| Evidence | EO_003 | CollectionRanking | EO_003_0044 | Assigned Data Source Rank for data source. | Data Sources; Dashboard; Lists |
| Evidence | EO_003 | CustodianRanking | EO_003_0045 | Custodian Rank assigned based on Assessment | Data Sources; Dashboard; Lists |
| Evidence | EO_003 | ProportionalitySummary | EO_003_0046 | Internal field used to tally number of records with a data source ranking. | Admin |

FIG. 37

| Table Name | Table Ref # | Field Name | Field Ref# | Description | Module/UI Reference |
|---|---|---|---|---|---|
| EvidenceTypeConfiguration | EO_003_01 | tSerial | EO_003_01_0001 | Primary Key for the Evidence Type record | internal |
| EvidenceTypeConfiguration | EO_003_01 | nConstant | EO_003_01_0002 | Unique value assigned to each device. | internal |
| EvidenceTypeConfiguration | EO_003_01 | EvidenceType | EO_003_01_0003 | Type of data source being added | internal |
| EvidenceTypeConfiguration | EO_003_01 | CollectionRanking | EO_003_01_0004 | numerical value for the rank of the data source | internal |
| EvidenceTypeConfiguration | EO_003_01 | FK_CaseDataPrimaryKey | EO_003_01_0005 | Foreign key of the case where the data source is added to | internal |
| EvidenceTypeConfiguration | EO_003_01 | LocationGroup | EO_003_01_0006 | Location group of custodian | Matter Admin, PDA |
| EvidenceTypeConfiguration | EO_003_01 | LowCostEstimation | EO_003_01_0007 | Est. cost of collection | PDA |
| EvidenceTypeConfiguration | EO_003_01 | MediumCostEstimation | EO_003_01_0008 | Est. cost of collection | PDA |
| EvidenceTypeConfiguration | EO_003_01 | HighCostEstimation | EO_003_01_0009 | Est. cost of collection | PDA |
| EvidenceTypeConfiguration | EO_003_01 | EvidenceTypePrimaryKey | EO_003_01_0010 | relationship type ID used for relationships | internal |

FIG. 38

| Table Name | Table Ref # | Field Name | Field Ref# | Description | Module/UI Reference |
|---|---|---|---|---|---|
| Hard Drive | EO_003_02 | tSerial | EO_003_02_0001 | Primary key for the Hard Drive record | internal |
| Hard Drive | EO_003_02 | tEvidenceRelatedKey | EO_003_02_0002 | Unique value assigned to each device. | internal |
| Hard Drive | EO_003_02 | tHardDriveMake | EO_003_02_0003 | Make of hard drive | Data Sources |
| Hard Drive | EO_003_02 | tHardDriveModel | EO_003_02_0004 | Model # of hard drive | Data Sources |
| Hard Drive | EO_003_02 | tHardDriveSize | EO_003_02_0005 | Size of hard drive | Data Sources |
| Hard Drive | EO_003_02 | tHardDriveSizeType | EO_003_02_0006 | Type of hard drive | Data Sources |
| Hard Drive | EO_003_02 | tEvidenceType_HD | EO_003_02_0007 | Data Source UI facing device name | PDA; Data Sources; |
| Hard Drive | EO_003_02 | ::tDriveNumber | EO_003_02_0008 | Drive number in the system | Data Sources |

FIG. 39

| Table Name | Table Ref # | Field Name | Field Ref# | Description | Module/UI Reference |
|---|---|---|---|---|---|
| Chain of Custody | EO_003_03 | tSerial | EO_003_03_0001 | Primary key for the Chain of Custody record | Data Sources |
| Chain of Custody | EO_003_03 | dDateofEvent | EO_003_03_0002 | Date of procedure | Data Sources |
| Chain of Custody | EO_003_03 | tCOCDirection | EO_003_03_0003 | Determines if the data source is going in or out of custody | Data Sources |
| Chain of Custody | EO_003_03 | tReleasingName | EO_003_03_0004 | Name of person releasing data source to 3rd party | Data Sources |
| Chain of Custody | EO_003_03 | tReleasingOrganization | EO_003_03_0005 | Organization of person releasing data source to 3rd party | Data Sources |
| Chain of Custody | EO_003_03 | tChainofCustodyPath | EO_003_03_0006 | Not used any more | Data Sources |
| Chain of Custody | EO_003_03 | tEvidenceRelatedKey | EO_003_03_0007 | Primary key of the data source for the chain of custody record | Data Sources |
| Chain of Custody | EO_003_03 | tiTimeofEvent | EO_003_03_0008 | Time of procedure | Data Sources |
| Chain of Custody | EO_003_03 | tFirstEvent | EO_003_03_0009 | db indicator that this was the first chain of custody record for UI purposes | Data Sources |
| Chain of Custody | EO_003_03 | nComplete | EO_003_03_0010 | Indicates the chain of custody instance is complete and locks interface | Data Sources |
| Chain of Custody | EO_003_03 | tUserEnteredBy | EO_003_03_0011 | Logged in user that creates the chain of custody record - back end process | Data Sources |

FIG. 40

| Table Name | Table Ref # | Field Name | Field Ref# | Description | Module/UI Reference |
|---|---|---|---|---|---|
| DestinationMedia | EO_003_04 | tSerial | EO_003_04_0001 | Primary key of the destination media record | internal |
| DestinationMedia | EO_003_04 | tDeviceID | EO_003_04_0002 | Named ID of the media where backup image is stored | Data Sources |
| DestinationMedia | EO_003_04 | tDeviceMake | EO_003_04_0003 | Make of the backup device | Data Sources |
| DestinationMedia | EO_003_04 | tDeviceModel | EO_003_04_0004 | Model of the backup devie | Data Sources |
| DestinationMedia | EO_003_04 | tDeviceSN | EO_003_04_0005 | Serial number of the backup device | Data Sources |
| DestinationMedia | EO_003_04 | tDeviceSize | EO_003_04_0006 | Device size of the backup device | Data Sources |
| DestinationMedia | EO_003_04 | tDeviceType | EO_003_04_0007 | Type of media used for the backup device | Data Sources |
| DestinationMedia | EO_003_04 | tRelatedEvidenceKey | EO_003_04_0008 | Primary key of the data source | internal |
| DestinationMedia | EO_003_04 | tNotes | EO_003_04_0009 | Notes related to the destination media transaction | Data Sources |
| DestinationMedia | EO_003_04 | tDeviceSizeType | EO_003_04_0010 | Device size of the backup device | Data Sources |
| DestinationMedia | EO_003_04 | tInterfaceType | EO_003_04_0011 | Interface type used for the media | Data Sources |
| DestinationMedia | EO_003_04 | nActive | EO_003_04_0012 | dB flag to indicate if record is active | Data Sources |
| DestinationMedia | EO_003_04 | tUNCPath | EO_003_04_0013 | UNC path of the backup media if store on network | Data Sources |

FIG. 41

| Table Name | Table Ref # | Field Name | Field Ref# | Description | Module/UI Reference |
|---|---|---|---|---|---|
| EDRM | EO_003_05 | tSerial | EO_003_05_0001 | Primary key for the EDRM record | internal |
| EDRM | EO_003_05 | tEvidenceRelKey | EO_003_05_0002 | Primary key of the data source for the chain of custody record | internal |
| EDRM | EO_003_05 | Activity | EO_003_05_0003 | Indicate the type of record (I.E: Collection, Decription, Processed...) | Data Sources |
| EDRM | EO_003_05 | Status | EO_003_05_0004 | The status of the activity | Data Sources |
| EDRM | EO_003_05 | DateRequested | EO_003_05_0005 | Date the activity was requested | Data Sources |
| EDRM | EO_003_05 | RequestedBy | EO_003_05_0006 | Who the request was initiated by | Data Sources |
| EDRM | EO_003_05 | DateCompleted | EO_003_05_0007 | Date the activity was completed | Data Sources |
| EDRM | EO_003_05 | CompletedBy | EO_003_05_0008 | Who the activity was completed by | Data Sources |
| EDRM | EO_003_05 | RecordCount | EO_003_05_0009 | Used for processed activity | Data Sources |
| EDRM | EO_003_05 | DataSize | EO_003_05_0010 | Used for processed activity | Data Sources |
| EDRM | EO_003_05 | VolumeName | EO_003_05_0012 | Used for production activity | Data Sources |
| EDRM | EO_003_05 | Notes | EO_003_05_0013 | Notes for each activity record added here | Data Sources |

FIG. 42

| Table Name | Table Ref # | Field Name | Field Ref# | Description | Module/UI Reference |
|---|---|---|---|---|---|
| Release Analysis | EO_004 | RecordID | EO_004_0001 | Unique record ID for this Assessment | Assessment |
| Release Analysis | EO_004 | ReleaseAnalysisText | EO_004_0002 | An description/overview of the Assessment | Assessment |
| Release Analysis | EO_004 | RelatedSurveyID | EO_004_0003 | Internal link to associated survey | Assessment |
| Release Analysis | EO_004 | ProportionalityType | EO_004_0004 | Scoring option selected | Assessment |
| Release Analysis | EO_004 | Rank1Low | EO_004_0005 | Question score | Assessment |
| Release Analysis | EO_004 | Rank1High | EO_004_0006 | Question score | Assessment |
| Release Analysis | EO_004 | Rank2Low | EO_004_0007 | Question score | Assessment |
| Release Analysis | EO_004 | Rank2High | EO_004_0008 | Question score | Assessment |
| Release Analysis | EO_004 | Rank3Low | EO_004_0009 | Question score | Assessment |
| Release Analysis | EO_004 | Rank3High | EO_004_0010 | Question score | Assessment |
| Release Analysis | EO_004 | Rank4Low | EO_004_0011 | Question score | Assessment |
| Release Analysis | EO_004 | Rank4High | EO_004_0012 | Question score | Assessment |
| Release Analysis | EO_004 | TotalPossible | EO_004_0013 | Total possible score | Assessment |

FIG. 43

| Table Name | Table Ref # | Field Name | Field Ref# | Description | Module/UI Reference |
|---|---|---|---|---|---|
| ReleaseAnalysisPart | EO_004_01 | RecordID | EO_004_01_0001 | Unique record ID for this Assessment | Assessment |
| ReleaseAnalysisPart | EO_004_01 | ReleaseAnalysisID | EO_004_01_0002 | Internal ID | Assessment |
| ReleaseAnalysisPart | EO_004_01 | ReleaseAnalysisType | EO_004_01_0003 | Type of question | Assessment |
| ReleaseAnalysisPart | EO_004_01 | ReleaseAnalysisLabel | EO_004_01_0004 | Text of question | Assessment |
| ReleaseAnalysisPart | EO_004_01 | RA_QuestionNumber | EO_004_01_0005 | Question number | Assessment |
| ReleaseAnalysisPart | EO_004_01 | ProportionalityYesValue | EO_004_01_0006 | Score for Yes answer | Assessment |
| ReleaseAnalysisPart | EO_004_01 | ProportionalityNoValue | EO_004_01_0007 | Score for No Answer | Assessment |
| ReleaseAnalysisPart | EO_004_01 | ProportionalityYesValueOverride | EO_004_01_0008 | Master value override | Assessment |
| ReleaseAnalysisPart | EO_004_01 | ProportionalityNoValueOverride | EO_004_01_0009 | Master value override | Assessment |
| ReleaseAnalysisPart | EO_004_01 | ReleaseAnalysisExplainRequired | EO_004_01_0010 | Explanation field | Assessment |
| ReleaseAnalysisPart | EO_004_01 | MaxRAScore | EO_004_01_0011 | Custodian Rank | Assessment; Custodian Evaluation; PDA |

FIG. 44

| Table Name | Table Ref # | Field Name | Field Ref # | Description | Module/UI Reference |
|---|---|---|---|---|---|
| RA ConfigurationSettings | EO_004_02 | RecordID | EO_004_02_0001 | Unique record ID for this Assessment | Assessment; Custodian Evaluation; PDA |
| RA ConfigurationSettings | EO_004_02 | RelatedInterviewPartID | EO_004_02_0002 | Holds configuration settings for Assessment questions | Assessment; Custodian Evaluation; PDA |
| RA ConfigurationSettings | EO_004_02 | RequiredField | EO_004_02_0003 | Holds configuration settings for Assessment questions | Assessment; Custodian Evaluation; PDA |
| RA ConfigurationSettings | EO_004_02 | RequiredWithOtherField | EO_004_02_0004 | Holds configuration settings for Assessment questions | Assessment; Custodian Evaluation; PDA |
| RA ConfigurationSettings | EO_004_02 | RequiredObjectName | EO_004_02_ | Holds configuration settings for Assessment questions | Assessment; Custodian Evaluation; PDA |
| RA ConfigurationSettings | EO_004_02 | RequiredObject Value | EO_004_02_0005 | Holds configuration settings for Assessment questions | Assessment; Custodian Evaluation; PDA |
| RA ConfigurationSettings | EO_004_02 | FieldVisibility | EO_004_02_0006 | Holds configuration settings for Assessment questions | Assessment; Custodian Evaluation; PDA |
| RA ConfigurationSettings | EO_004_02 | FieldVisibilityOnOtherField | EO_004_02_0007 | Holds configuration settings for Assessment questions | Assessment; Custodian Evaluation; PDA |
| RA ConfigurationSettings | EO_004_02 | FieldVisibilityObjectName | EO_004_02_0008 | Holds configuration settings for Assessment questions | Assessment; Custodian Evaluation; PDA |
| RA ConfigurationSettings | EO_004_02 | FieldVisibilityObjectValue | EO_004_02_0009 | Holds configuration settings for Assessment questions | Assessment; Custodian Evaluation; PDA |
| RA ConfigurationSettings | EO_004_02 | CollectionRequired | EO_004_02_0010 | Holds configuration settings for Assessment questions | Assessment; Custodian Evaluation; PDA |
| RA ConfigurationSettings | EO_004_02 | CollectionEvidence | EO_004_02_0011 | Holds configuration settings for Assessment questions | Assessment; Custodian Evaluation; PDA |
| RA ConfigurationSettings | EO_004_02 | CollectionEvidenceField | EO_004_02_0012 | Holds configuration settings for Assessment questions | Assessment; Custodian Evaluation; PDA |

FIG. 45

| Table Name | Table Ref # | Field Name | Field Ref# | Description | Module/UI Reference |
|---|---|---|---|---|---|
| RAFieldSettings | EO_004_03 | RecordID | EO_004_03_0001 | Unique record ID for this Assessment | Assessment; Custodian Evaluation; PDA |
| RAFieldSettings | EO_004_03 | RelatedInterviewPartID | EO_004_03_0002 | Holds configuration settings for the hold/release decisions | Assessment; Custodian Evaluation; PDA |
| RAFieldSettings | EO_004_03 | Configuration|Type | EO_004_03_0003 | Holds configuration settings for the hold/release decisions | Assessment; Custodian Evaluation; PDA |
| RAFieldSettings | EO_004_03 | FieldObjectName | EO_004_03_0004 | Holds configuration settings for the hold/release decisions | Assessment; Custodian Evaluation; PDA |
| RAFieldSettings | EO_004_03 | OperatorFieldRelatedID | EO_004_03_ | Holds configuration settings for the hold/release decisions | Assessment; Custodian Evaluation; PDA |
| RAFieldSettings | EO_004_03 | SelectionType | EO_004_03_0005 | Holds configuration settings for the hold/release decisions | Assessment; Custodian Evaluation; PDA |

FIG. 46

| Table Name | Table Ref # | Field Name | Field Ref# | Description | Module/UI Reference |
|---|---|---|---|---|---|
| Question | EO_005 | RecordID | EO_005_0001 | Unique record for this question | internal |
| Question | EO_005 | QuestionText | EO_005_0002 | Holds text of the question | Survey/Analysis/Interview |
| Question | EO_005 | RelatedSurveyID | EO_005_0003 | ID of the Survey Question is found in | Survey/Analysis/Interview |
| Question | EO_005 | QuestionType | EO_005_0004 | Type of Question | Survey/Analysis/Interview |
| Question | EO_005 | QuestionNumber | EO_005_0005 | Question number | Survey/Analysis/Interview |
| Question | EO_005 | id | EO_005_0006 | internal fields | Survey/Analysis/Interview |
| Question | EO_005 | sort | EO_005_0007 | internal fields | Survey/Analysis/Interview |
| Question | EO_005 | handle | EO_005_0008 | internal fields | Survey/Analysis/Interview |
| Question | EO_005 | PreInterviewQuestion | EO_005_0009 | Y/N if question is preinterview | Survey/Analysis/Interview |
| Question | EO_005 | QuestionSubNumber | EO_005_0010 | Back end process field not visible in system | Survey/Analysis/Interview |
| Question | EO_005 | ReleaseAnalysisVisible | EO_005_0011 | Link to Assessment visible with Question | Survey/Analysis/Interview |
| Question | EO_005 | QuestionName | EO_005_0012 | Name of the Question | Survey/Analysis/Interview |

FIG. 47

| Table Name | Table Ref # | Field Name | Field Ref# | Description | Module/UI Reference |
|---|---|---|---|---|---|
| QuestionPart | EO_005_01 | RecordiD | EO_005_01_0001 | Unique record for this question | internal |
| QuestionPart | EO_005_01 | QuestionResponse | EO_005_01_0002 | Question Repsonse | Survey/Analysis/Interview |
| QuestionPart | EO_005_01 | QuestionResponseTitleRelatedQuestionID | EO_005_01_0003 | Title of question response | Survey/Analysis/Interview |
| QuestionPart | EO_005_01 | QuestionResponseExplain | EO_005_01_0004 | Explanation of response | Survey/Analysis/Interview |
| QuestionPart | EO_005_01 | QuestionResponseExplainTitle | EO_005_01_0005 | Title of explanation field | Survey/Analysis/Interview |
| QuestionPart | EO_005_01 | QuestionResponseExplainTItle2 | EO_005_01_0006 | 2nd title of explanation field | Survey/Analysis/Interview |
| QuestionPart | EO_005_01 | ExplainConfigurator | EO_005_01_0007 | Configure explanation field | Survey/Analysis/Interview |
| QuestionPart | EO_005_01 | QuestionResponse2 | EO_005_01_0008 | Question resonse #2 | Survey/Analysis/Interview |
| QuestionPart | EO_005_01 | QuestionReseponseTitle2 | EO_005_01_0009 | Title of question respnse #2 | Survey/Analysis/Interview |
| QuestionPart | EO_005_01 | ValueListSortOrder | EO_005_01_0010 | Field to configure the sort order value | Survey/Analysis/Interview |
| QuestionPart | EO_005_01 | R1FieldLabel | EO_005_01_0011 | Response 2 field label | Survey/Analysis/Interview |
| QuestionPart | EO_005_01 | R2FieldLabel | EO_005_01_0012 | Response 2 fields label | Survey/Analysis/Interview |
| QuestionPart | EO_005_01 | SelectionType | EO_005_01_0014 | Configuration field to select radio button type or text for field display | Survey/Analysis/Interview |
| QuestionPart | EO_005_01 | ThroughCurrentDate | EO_005_01_0015 | Field that holds the value when through current date is selected | Survey/Analysis/Interview |
| QuestionPart | EO_005_01 | QuestionPartID | EO_005_01_0016 | Back end field used for database relationship | Survey/Analysis/Interview |
| QuestionPart | EO_005_01 | QuestionResponseType | EO_005_01_0017 | Question type for selection for multi-type questions | Survey/Analysis/Interview |
| QuestionPart | EO_005_01 | QuestionResponseSerial | EO_005_01_0018 | Unique iD for multi-type question part | Survey/Analysis/Interview |

FIG. 48

| Table Name | Table Ref # | Field Name | Field Ref# | Description | Module/UI Reference |
|---|---|---|---|---|---|
| Analysis | EO_006 | RecordID | EO_006_0001 | Unique ID for this Analysis | internal |
| Analysis | EO_006 | RelatedQuestionID | EO_006_0002 | Question ID | Survey/Analysis/Interview |
| Analysis | EO_006 | AnalysisType | EO_006_0003 | Type of Analysis | Survey/Analysis/Interview |
| Analysis Part | EO_006_01 | RecordID | EO_006_01_0001 | Unique ID for this Analysis | Survey/Analysis/Interview |
| Analysis Part | EO_006_01 | RelatedAnalysisID | EO_006_01_0002 | Analysis ID | Survey/Analysis/Interview |
| Analysis Part | EO_006_01 | FollowupRequired | EO_006_01_0003 | Y/N whether followup is required | Survey/Analysis/Interview |
| Analysis Part | EO_006_01 | AnalysisResponseLabel | EO_006_01_0004 | Label for Response field | Survey/Analysis/Interview |
| Analysis Part | EO_006_01 | AnalysisResponseChoices | EO_006_01_0005 | Response choices | Survey/Analysis/Interview |
| Analysis Part | EO_006_01 | AnalysisResponseOtherLabel | EO_006_01_0006 | Label for additional response fields | Survey/Analysis/Interview |
| Analysis Part | EO_006_01 | AnalysisResponseOtherDescription | EO_006_01_0007 | Description of response choice | Survey/Analysis/Interview |
| Analysis Part | EO_006_01 | AnalysisResponseOtherDescriptionVisible | EO_006_01_0008 | Holds whether description is visible | Survey/Analysis/Interview |

FIG. 49

| Table Name | Table Ref # | Field Name | Field Ref# | Description | Module/UI Reference |
|---|---|---|---|---|---|
| Interview | EO_007 | RecordID | EO_007_0001 | Unique ID for the Interview | internal |
| Interview | EO_007 | InterviewText | EO_007_0002 | Text of the Interview question | Survey/Analysis/Interview |
| Interview | EO_007 | RelatedQuestionID | EO_007_0003 | Related Question ID | Survey/Analysis/Interview |
| Interview | EO_007 | InterviewType | EO_007_0004 | Identifies type of Question | Survey/Analysis/Interview |
| Interview | EO_007 | constant | EO_007_0005 | internal field | internal |
| Interview | EO_007 | Field1EvaluationVisibility | EO_007_0006 | Instruction to interviewee | Survey/Analysis/Interview |
| Interview | EO_007 | Field2EvaluationVisibility | EO_007_0007 | Instruction to interviewee | Survey/Analysis/Interview |
| Interview | EO_007 | Field3EvaluationVisibility | EO_007_0008 | Instruction to interviewee | Survey/Analysis/Interview |
| Interview | EO_007 | Field4EvaluationVisibility | EO_007_0009 | Instruction to interviewee | Survey/Analysis/Interview |
| Interview | EO_007 | Field1EvaluationRequired | EO_007_0010 | Instruction to interviewee | Survey/Analysis/Interview |
| Interview | EO_007 | Field2EvaluationRequired | EO_007_0011 | Instruction to interviewee | Survey/Analysis/Interview |
| Interview | EO_007 | Field3EvaluationRequired | EO_007_0012 | Instruction to interviewee | Survey/Analysis/Interview |
| Interview | EO_007 | Field4EvaluationRequired | EO_007_0013 | Instruction to interviewee | Survey/Analysis/Interview |
| Interview | EO_007 | RelatedSurveyID | EO_007_0014 | Related Survey ID | Survey/Analysis/Interview |
| Interview | EO_007 | Field1EvaluationCollection | EO_007_0015 | Instruction to interviewee | Survey/Analysis/Interview |
| Interview | EO_007 | Field2EvaluationCollection | EO_007_0016 | Instruction to interviewee | Survey/Analysis/Interview |
| Interview | EO_007 | Field3EvaluationCollection | EO_007_0017 | Instruction to interviewee | Survey/Analysis/Interview |
| Interview | EO_007 | Field4EvaluationCollection | EO_007_0018 | Instruction to interviewee | Survey/Analysis/Interview |

FIG. 50

| Table Name | Table Ref # | Field Name | Field Ref# | Description | Module/UI Reference |
|---|---|---|---|---|---|
| Interview configuration settings | EO_007_01 | RecordID | EO_007_01_0001 | Unique ID for the Interview | internal |
| Interview configuration settings | EO_007_01 | RelatedInterviewPartID | EO_007_01_0002 | Related Question ID | Survey/Analysis/Interview |
| Interview configuration settings | EO_007_01 | RequiredField | EO_007_01_0003 | Question requirements/display | Survey/Analysis/Interview |
| Interview configuration settings | EO_007_01 | RequiredWith OtherField | EO_007_01_0004 | Question requirements/display | Survey/Analysis/Interview |
| Interview configuration settings | EO_007_01 | RequiredObjectName | EO_007_01_0005 | Question requirements/display | Survey/Analysis/Interview |
| Interview configuration settings | EO_007_01 | RequiredObjectValue | EO_007_01_0006 | Question requirements/display | Survey/Analysis/Interview |
| Interview configuration settings | EO_007_01 | FieldVisibility | EO_007_01_0007 | Question requirements/display | Survey/Analysis/Interview |
| Interview configuration settings | EO_007_01 | FieldsVisibilityonOtherField | EO_007_01_0008 | Question requirements/display | Survey/Analysis/Interview |
| Interview configuration settings | EO_007_01 | FieldsVisibilityObjectName | EO_007_01_0009 | Question requirements/display | Survey/Analysis/Interview |
| Interview configuration settings | EO_007_01 | FieldVisibilityObjectValue | EO_007_01_0010 | Question requirements/display | Survey/Analysis/Interview |
| Interview configuration settings | EO_007_01 | CollectionRequired | EO_007_01_0011 | Captures whether collection is required | Survey/Analysis/Interview |
| Interview configuration settings | EO_007_01 | CollectionEvidenceType | EO_007_01_0012 | Captures data source type | Survey/Analysis/Interview |
| Interview configuration settings | EO_007_01 | CollectionEvidenceField | EO_007_01_0013 | Captures data source field | Survey/Analysis/Interview |

FIG. 51

| Table Name | Table Ref # | Field Name | Field Ref# | Description | Module/UI Reference |
|---|---|---|---|---|---|
| InterviewPart | EO_007_02 | RecordID | EO_007_02_0001 | Unique ID for the Interview | internal |
| InterviewPart | EO_007_02 | RelatedInterviewID | EO_007_02_0002 | Related Question ID | Survey/Analysis/Interview |
| InterviewPart | EO_007_02 | InterviewResponse | EO_007_02_0003 | Response data | Survey/Analysis/Interview |
| InterviewPart | EO_007_02 | InterviewResponse2 | EO_007_02_0004 | Response data | Survey/Analysis/Interview |
| InterviewPart | EO_007_02 | InterviewResponseTitle | EO_007_02_0005 | Response data | Survey/Analysis/Interview |
| InterviewPart | EO_007_02 | InterviewResponseExplain | EO_007_02_0006 | Response data | Survey/Analysis/Interview |
| InterviewPart | EO_007_02 | ExplainConfigurator | EO_007_02_0007 | Response data | Survey/Analysis/Interview |
| InterviewPart | EO_007_02 | InterviewResonse1DValue | EO_007_02_0008 | Response data | Survey/Analysis/Interview |
| InterviewPart | EO_007_02 | InterviewResponse2DValue | EO_007_02_0009 | Response data | Survey/Analysis/Interview |
| InterviewPart | EO_007_02 | InterviewResponse1ObjectName | EO_007_02_0010 | Response data | Survey/Analysis/Interview |
| InterviewPart | EO_007_02 | InterviewRepsonse2ObjectName | EO_007_02_0011 | Response data | Survey/Analysis/Interview |
| InterviewPart | EO_007_02 | ValueListSortOrder | EO_007_02_0012 | Sort order for the interview part | Survey/Analysis/Interview |
| InterviewPart | EO_007_02 | IR1FieldLabel | EO_007_02_0013 | Field label | Survey/Analysis/Interview |
| InterviewPart | EO_007_02 | IR2FieldLabel | EO_007_02_0014 | Field label | Survey/Analysis/Interview |
| InterviewPart | EO_007_02 | InterviewPartID | EO_007_02_0015 | ID used for relationships and system settings | Survey/Analysis/Interview |
| InterviewPart | EO_007_02 | cSub | EO_007_02_0016 | calculated value used for relationship | Survey/Analysis/Interview |
| InterviewPart | EO_007_02 | SubInterviewIdentifier | EO_007_02_0017 | Tyep of subquestion | Survey/Analysis/Interview |
| InterviewPart | EO_007_02 | Notes | EO_007_02_0018 | Captures Notes related to question | Survey/Analysis/Interview |
| InterviewPart | EO_007_02 | NotesTitle | EO_007_02_0019 | Title for Notes field | Survey/Analysis/Interview |
| InterviewPart | EO_007_02 | ThroughCurrentDate | EO_007_02_0020 | Field to hold value when through current date | Survey/Analysis/Interview |
| InterviewPart | EO_007_02 | InterviewResponseStillActiveIDValue | EO_007_02_0021 | Response data | Survey/Analysis/Interview |
| InterviewPart | EO_007_02 | InterviewResponseStillActiveIDValue | EO_007_02_0022 | Response data | Survey/Analysis/Interview |
| InterviewPart | EO_007_02 | InterviewResponseType | EO_007_02_0023 | Response data | Survey/Analysis/Interview |
| InterviewPart | EO_007_02 | SelectionType | EO_007_02_0024 | Selection type for multi-part question type | Survey/Analysis/Interview |

FIG. 52

| Table Name | Table Ref # | Field Name | Field Ref# | Description | Module/Ui Reference |
|---|---|---|---|---|---|
| ReportScheduler | EO_008 | RecordID | EO_008_0001 | Unique ID for record | Reporting |
| ReportScheduler | EO_008 | MatterID | EO_008_0002 | ID for the matter | Reporting |
| ReportScheduler | EO_008 | RecipientName | EO_008_0003 | Name of recipient for the report | Reporting |
| ReportScheduler | EO_008 | RecipientEmail | EO_008_0004 | Recipient's email address | Reporting |
| ReportScheduler | EO_008 | ReportName | EO_008_0005 | Name of the Report | Reporting |
| ReportScheduler | EO_008 | Schedule | EO_008_0006 | Delivery schedule | Reporting |
| ReportScheduler | EO_008 | LastExecution | EO_008_0007 | Last delivery | Reporting |

FIG. 53

SYSTEMS AND METHODS FOR DETERMINING PROPORTIONALITY IN E-DISCOVERY

CROSS-REFERENCE TO RELATED APPLICATION

This application claims the benefit of U.S. Provisional Patent Application Ser. No. 62/713,274, filed on Aug. 1, 2018, the disclosure of which is hereby incorporated by referenced in its entirety.

FIELD OF THE DISCLOSURE

The present disclosure relates generally to systems and methods for facilitating discovery, and more specifically, to systems and methods for facilitating discovery using proportional discovery assessment software.

BACKGROUND

In the context of civil litigation, discovery is frequently one of the most time-consuming and costly aspects of the litigation process. One of the major problems with discovery is that, often, an unreasonable or excessive amount of discovery is preserved, requested and/or produced. In other words, the amount of discovery is disproportionate to the nature of the case, the amount in controversy, or the issues or values at stake.

One of the major problems leading to excessive discovery is that parties to the litigation preserve more data and documents than is necessary, out of fear that they will inadvertently destroy relevant discovery and may be penalized for it during the discovery process. Therefore, for many parties, the costs and burdens of discovery commence at the outset of a dispute, long before the actual discovery period begins. At the first sign of trouble, legal holds are broadly distributed with instructions to preserve any potentially relevant electronic and paper data. When issuing legal holds, the claims and defenses may not yet be articulated, leaving organizations attempting to predict which employees are most likely to have relevant knowledge, and which data sources contain relevant information. Consequently, a broad net is often cast at this preliminary stage. Legal hold notices are issued to all potentially relevant custodians, which triggers their duty to preserve relevant content within their control, and to refrain from any deletion or disposition of relevant devices or sources. In tandem with issuance of the legal hold, it is also a common practice to issue a data usage survey or questionnaire where the custodian is asked specific questions about where relevant data may reside. These survey responses are used to develop a data map of potentially relevant locations and sources, and preservation and collection activities ensue. Once discovery commences, a significant volume of what was preserved and collected is moved forward for early case assessment, searching, processing, review and production. This process is costly, burdensome and time-consuming.

If proportionality is applied from the outset, the more relevant information is likely to be located earlier in the process, and neither side is burdened with wading through excessive amounts of irrelevant or marginally relevant information.

The present disclosure is aimed at solving one or more of the problems identified above.

SUMMARY OF INVENTION

According to one embodiment of the present invention, a system comprises a database stored on a server and a processing device in communication with a user device accessible to a user. The processing device includes: a hosting module configured to generate and display a web-based application on a user device; a communications module configured to enable the user to access and interact with the web-based application on the user device; a matter administration module configured to maintain a plurality of matter data associated with a matter stored in the database; a custodian administration module configured to maintain a plurality of custodian data stored in the database; an evidence administration module to maintain a plurality of evidence data stored in the database; and an interview building module to prompt the user to prepare at least one custom interview based on the plurality of matter data.

According to another embodiment of the present invention, a computer-implemented method comprises generating and displaying, by a hosting module, a web-based application on a user device accessible by a user. A communications module enables the user to access and interact with the web-based application on the user device. A matter administration module maintains a plurality of matter data associated with a matter stored in a database that is stored on a server. A custodian administration module maintains a plurality of custodian data stored in the database. An evidence administration module maintains a plurality of evidence data stored in the database. An interview building module prompts the user to prepare at least one custom interview based on the plurality of matter data.

According to yet another embodiment of the present invention, a non-transitory information recording medium on which a computer readable program is recorded that causes a computer to function as a system comprises a database stored on a server and a processing device in communication with a user device accessible to a user. The processing device includes: a hosting module configured to generate and display a web-based application on a user device; a communications module configured to enable the user to access and interact with the web-based application on the user device; a matter administration module configured to maintain a plurality of matter data associated with a matter stored in the database; a custodian administration module configured to maintain a plurality of custodian data stored in the database; an evidence administration module to maintain a plurality of evidence data stored in the database; and an interview building module to prompt the user to prepare at least one custom interview based on the plurality of matter data.

BRIEF DESCRIPTION OF THE DRAWINGS

Advantages of the present disclosure will be readily appreciated, as the same becomes better understood by reference to the following detailed description, when considered in connection with the accompanying drawings. Non-limiting and non-exhaustive embodiments of the present disclosure are described with reference to the following figures, wherein like numerals refer to like parts throughout the various views unless otherwise specified.

FIG. 4C is an exemplary screenshot of a custodian administration module screen according to one embodiment of the present invention;

FIG. 4E is an exemplary screenshot of a custodian phase and status configuration screen according to one embodiment of the present invention;

FIG. 5 is an exemplary matter data table illustrating storage of matter information according to one embodiment of the present invention;

FIG. 7B is an exemplary custodian record according to one embodiment of the present invention;

FIGS. 9A-9B are exemplary custodian relevancy assessment builder screens according to one embodiment of the present invention;

FIGS. 13A-13E are exemplary survey builder screenshots according to one embodiment of the present invention;

FIGS. 15A-15C are exemplary screenshots of data source screens according to one embodiment of the present invention;

FIG. 17A-17G are exemplary screenshots of a proportional discovery assessment module screen according to one embodiment of the present invention;

FIG. 18 is an exemplary evidence ranking screen according to one embodiment of the present invention;

FIG. 22A is an exemplary matter status dashboard screen according to one embodiment of the present invention;

FIG. 23 is an exemplary custodian list according to one embodiment of the present invention;

FIG. 25 is an exemplary screenshot of a report scheduling tool according to one embodiment of the present invention;

FIG. 26 is an exemplary screenshot of a proportional discovery assessment tool according to one embodiment of the present invention;

FIGS. 27A-27F are exemplary data tables illustrating storage of information collected and utilized by the proportional discovery assessment system of FIG. 1 according to one embodiment of the present invention;

FIGS. 28-53 illustrate various exemplary databases that may be stored on a database server of the proportional discovery assessment system of FIG. 1 according to one embodiment of the present invention;

DETAILED DESCRIPTION

Figure 1:
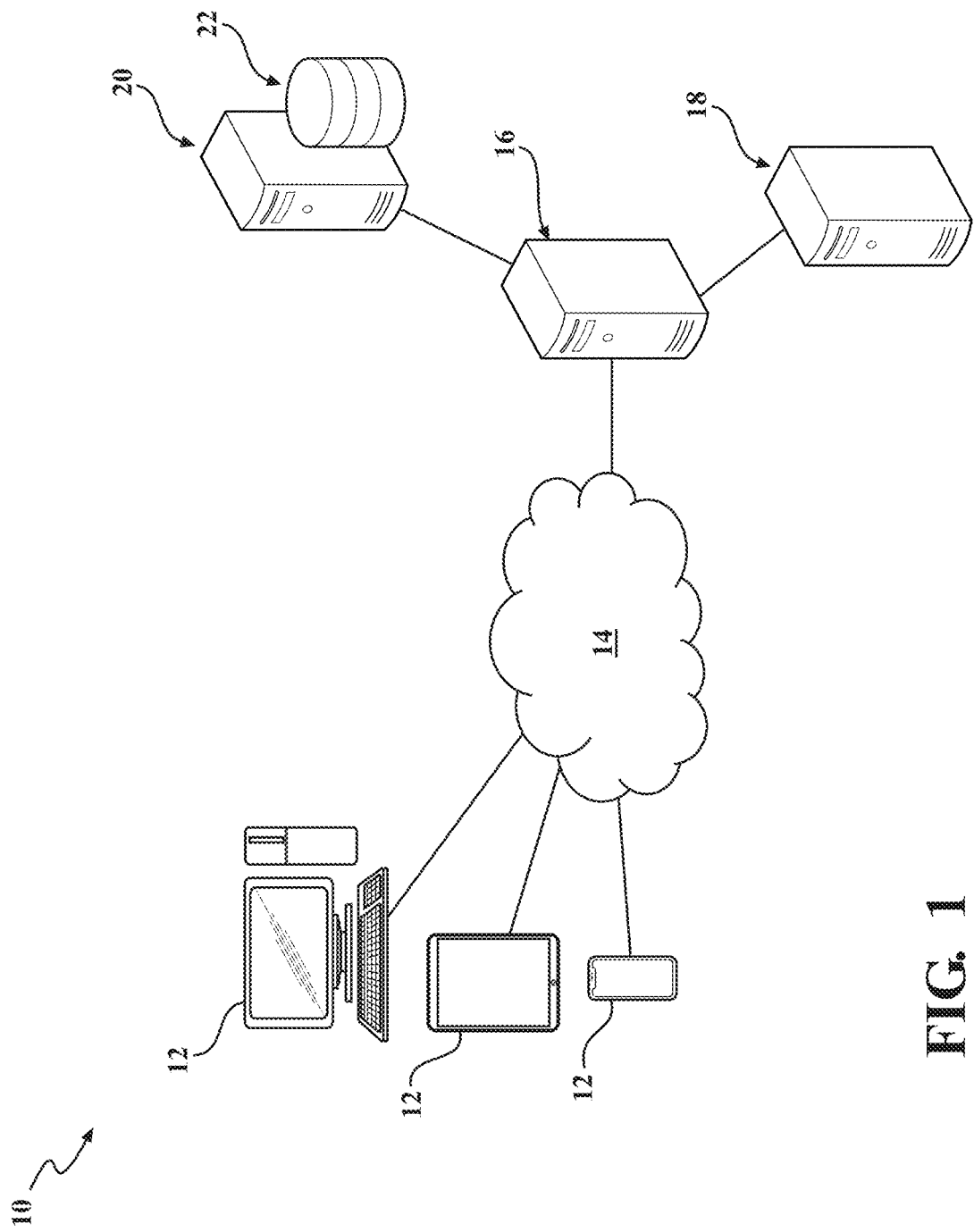
FIG. 1 is a schematic illustrating various aspects of a proportional discovery assessment system, according to the present invention.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an examples" means that a particular feature, structure or characteristic described in connection with the embodiment of example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The present disclosure particularly describes systems and methods for facilitating discovery using proportional discovery assessment. Proportional discovery assessment provides a comprehensive, centralized approach to discovery assessment workflow in the context of litigation and governmental investigations. Users may quickly access information about custodians, including custodian relevancy rankings based on the claims and defenses in a matter. Custodian ranking can be customized using a variety of scoring algorithm options to prioritize custodians. Custodian rankings can also be used to make decisions about releasing non-relevant custodians, consequently reducing the overall number of custodians who will remain under hold. For custodians who are determined to be relevant, a more comprehensive interview process can be conducted, which may also identify relevant data sources to be collected and/or additional relevant custodians.

In addition to the custodian rankings, evidence rankings are assigned to evidence based on the ease or difficulty, as well as cost, associated with preservation and/or collection of different types of evidence. Evidence ranking can utilize various classifications based on the data source itself, or it may be driven by specific criteria or conditions relating to a custodian, such as location or privacy and consent requirements.

Together, the custodian rankings and the evidence rankings are combined to create a proportionality ranking of a custodian and evidence linked to the custodian, to aid in decision-making about the custodian and the evidence during the discovery process. Additionally, cost estimations are generated based on these decisions to provide immediate insight as to the budget implications for moving data from collection through production. This insight provides parties to a case with a roadmap that can be used to negotiate the scope of discovery.

With reference to the Figures and in operation, the present invention provides a proportional discovery assessment system 10, as well as methods and computer product media to allow the facilitation of discovery using the system 10. In general use, the system 10 includes a processing device that allows a user (e.g., a customer of a discovery management service) to manage discovery matters via a website or an application, i.e., "app", running on a user device. Referring to FIG. 1, an exemplary environment in which the system 10 operates is illustrated. In the illustrated embodiment, the system 10 is configured to enable a user to access a website or application with one or more user computing devices 12 to manage discovery matters.

For clarity in discussing the various functions of the system 10, multiple computers and/or servers are discussed as performing different functions. These different computers (or servers) may, however, be implemented in multiple different ways such as modules within a single computer, as nodes of a computer system, etc. . . . The functions performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

In the illustrated embodiment, the system 10 includes a hosting server 16, a system server 18, a database server 20, a database 22, and one or more user computing (or customer) devices 12 that are each coupled in communication via a communications network 14. The communications network 14 may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed.

The user computing device 12 may include any suitable device that enables a user to access and communicate with the system 10 including sending and/or receiving information to and from the system 10 and displaying information received from the system 10 to a user. For example, in one embodiment, the user computing device 12 may include, but is not limited to, a desktop computer, a laptop or notebook computer, a tablet computer, smartphone/tablet computer hybrid, a personal data assistant, a handheld mobile device including a cellular telephone, and the like. The user computing device 12 may be used to by a user, such as a customer, to access the proportional discovery assessment system.

The hosting server 16 may be configured to host a website or provide data to the app that is accessible by a user via one or more user computing devices 12. For example, the hosting server 16 may retrieve and store a web page associated with one or more websites in response to requests received by the user via the user computing device 12 to allow users to interact with the website or web-based application. In one embodiment, the hosting server 16 is configured to generate and display a web page associated with the website in response to requests being received from consumers via corresponding web browsers that are displayed on the user computing devices 12.

Figure 2:
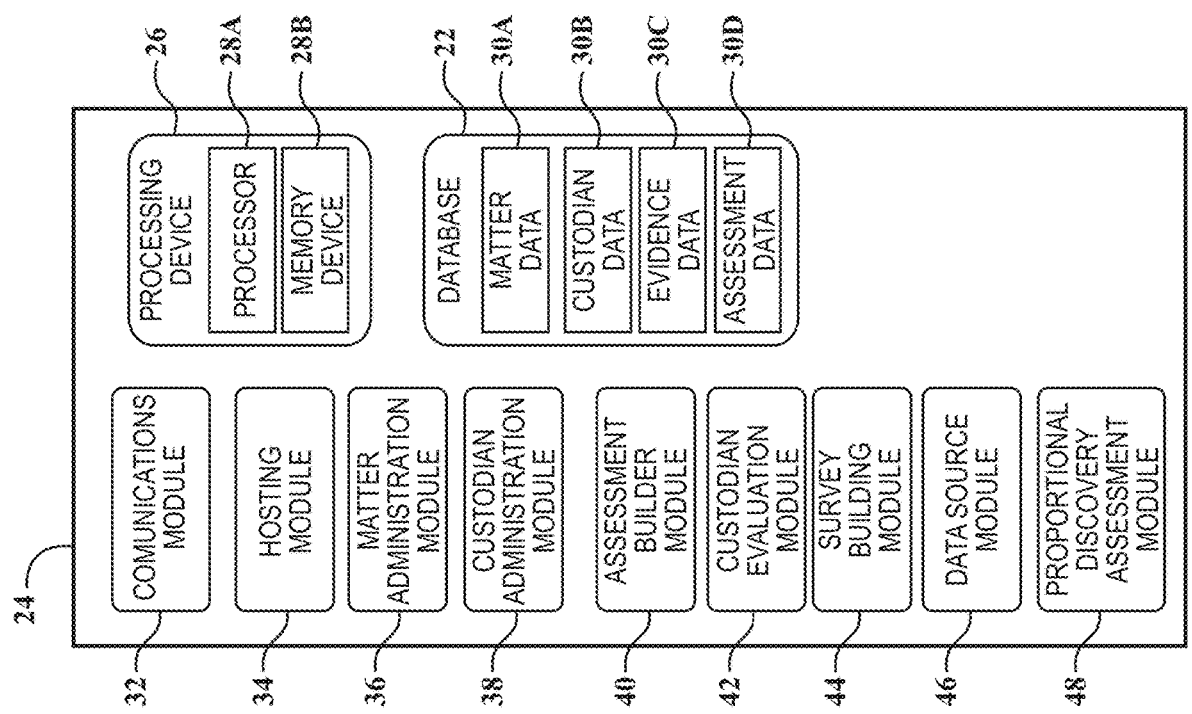
FIG. 2 is a schematic illustrating example components of a server, according to one embodiment of the present invention.

Referring to FIG. 2, in one embodiment, the system 10 of FIG. 1 may include a server 24 that is configured to perform the functions of the hosting server 16, the system server 18, and/or the database server 20. In the illustrated embodiment, the server 24 includes a processing device 26 and the database 22.

The processing device 26 executes various programs, and thereby controls components of the server 24 according to user instructions received from the user computing device 12. The processing device 26 may include a processor or processors 28A and a memory device 28B, e.g., read only memory (ROM) and random access memory (RAM), storing processor executable instructions and one or more processors that execute the processor-executable instructions. In embodiments where the processing device 26 includes two or more processors 28A, the processors 28A can operate in a parallel or distributed manner. In an example, the processing device 26 may execute and/or implement a communications module 32, a hosting module 34, a matter administration module 36, a custodian administration module 38, an assessment builder module 40, a custodian evaluation module 42, a survey building module 44, a data source module 46, and a proportional discovery assessment module 48.

The database server 26 includes a memory device 28A that is connected to the database 22 to retrieve and store information contained in the database 22. The database 22 contains information on a variety of matters, such as, for example, matter data 30A, custodian data 30B, evidence data 30C, and assessment data 30D, and/or any suitable information that enables the system 10 to function as described herein.

The memory device 28B may be configured to store programs and information in the database 22, and retrieve information from the database 22 that is used by the processor to perform various functions described herein. The memory device 28B may include, but is not limited to, a hard disc drive, an optical disc drive, and/or a flash memory drive. Further, the memory device may be distributed and located at multiple locations.

In one embodiment of the present invention, the memory device 28B may include one or more of the memory devices and/or mass storage devices of one or more of the computing devices or servers. The modules that comprise the invention are composed of a combination of hardware and software, i.e., the hardware as modified by the applicable software applications. In one embodiment, the modules of the present invention are comprised of one of more of the components of one or more of the computing devices or servers, as modified by one or more software applications.

The communications module 32 retrieves various data and information from the database 22 and sends information to the user computing device 12 via the communications network 14 to enable the user to access and interact with the system 10. In one embodiment, the communications module 32 displays various images on a graphical interface of the user computing device 12 preferably by using computer graphics and image data stored in the database 22 including, but not limited to, web pages and/or any suitable information and/or images that enable the system 10 to function as described herein. The communications module 32 may further send information about system 10 to the user, such as by e-mail, text message, or push notification.

The hosting module 34 may be programmed to perform some or all of the functions of the hosting server 16 including hosting various web pages associated with one or more websites or web-based applications that are stored in the database 22 and that are accessible to the user via the user computing device 12. The hosting module 34 may be programmed to generate and display web pages associated with a website in response to requests being received from users via corresponding web browsers.

In one embodiment of the present invention, the matter administration module 36 may maintain data about matters stored in database 22.

In one embodiment of the present invention, the custodian administration module 38 may maintain data about custodians stored in database 22.

In one embodiment of the present invention, the assessment builder module 40 may allow an administrator to create a series of questions to assess a custodian's involvement and knowledge relating to the claims and defenses of a matter.

In one embodiment of the present invention, the custodian evaluation module 42 may be configured to facilitate evaluation of individual custodians and their relevance to a particular matter.

In one embodiment of the present invention, the survey building module 44 may be programmed to customize surveys and interviews based on input from users via user computing device 12 and/or based on one or more survey or interview templates stored in database 22.

In one embodiment of the present invention, the data source module 46 may maintain data about evidence stored in database 22.

In one embodiment of the present invention, the proportional discovery assessment module 48 may be programmed to hold the central workflow for the examination of custodians and data sources for collection.

Figure 3:
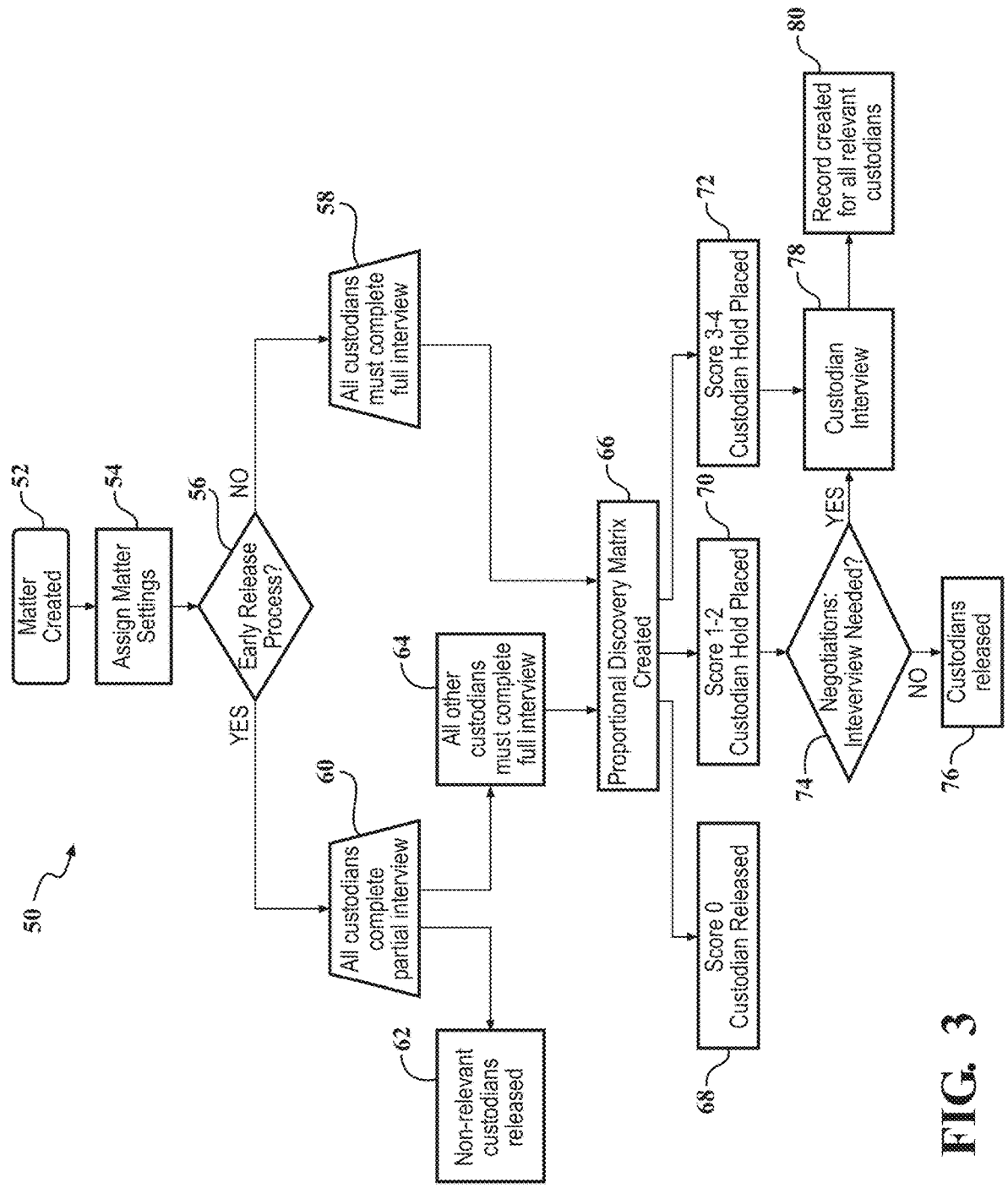
FIG. 3 is a flow diagram illustrating a first method using the proportional discovery assessment system of FIG. 1.

Referring now to FIG. 3, a flow diagram illustrating a method 50 using proportional discovery assessment system according to a first embodiment is shown. The method includes a plurality of steps. Each method step may be performed independently of, or in combination with, other method steps. Portions of the method may be performed by any one of, or any combination of the components of the system 10.

At step 52, a new matter is created. A matter may be created, for instance, when a discovery order is entered in a litigation case or discovery is instituted in another investigation. This occurs preferably before, but may occur after, parties have held a discovery conference (e.g., a Fed. R. Civ. P. 26(f) "Meet and Confer") to negotiate a discovery plan. At this step, details about the matter may be assigned, including, for instance, client name, matter description, and party names (e.g., defendant, plaintiff, etc.). It will be understood that multiple matters may be created for a single client and that all matters associated with a client may be linked in system 10.

At step 54, a plurality of matter settings may be assigned. These settings may include but are not limited to: counsel assignment and settings; custodian assignment and settings; burden of evidence settings assignment and settings; and survey assignment and settings. One or more of these settings or data associated therewith may be imported from another matter already existing in the system 10 that is linked to the same client, or may be created by the user, or may be imported from another system, such as a human resources system associated with the client. Similarly, an existing survey template may be assigned to the matter, or a new survey may be designed specifically for the new matter. Each of these settings may be fully customizable for each new matter or client entered into system 10.

At step 56, an early release process may be utilized. The purpose of the early release process is to establish custodian relevancy and release non-relevant custodians.

If an early release process is utilized, then at step 60, all custodians may be required to complete an initial assessment. The assessment may include initial relevancy questions and assign an initial relevancy ranking to each custodian completing the assessment. All custodians not meeting a predefined initial relevancy scoring threshold may be immediately released as non-relevant at step 62. All remaining custodians may be required, at step 64, to complete the full interview.

At step 66, once all relevant custodians have been identified, a custodian rank is created. This identifies all custodians subject to completing the full interview initial survey and assigns a score to each custodian based on the results of the assessment.

By way of example and not limitation, a scale from 0-4 may be used to rank custodians, where a score of "0" indicates that the custodian is not relevant and a score of "4" indicates that the custodian is highly relevant. A score of "0" may be assigned when, for example, the custodian was employed out of the relevant time period, was employed in a position or role that is not relevant to the matter, and/or had no direct involvement in the matter. A score of "1" may indicate that the custodian has low relevancy and may be assigned when, for example, the custodian was employed during the relevant time period, but either: was not employed in a relevant role, or was employed in a relevant role but not in a high priority position, or had little or no direct involvement in the matter. A score of "2" may indicate that the custodian has low-medium relevancy and may be assigned when, for example, the custodian was employed during the relevant time period and was employed in a relevant but not high priority position, or was in a relevant role but had no or little direct involvement in the matter. A score of "3" may indicate that the custodian has medium-high relevancy and may be assigned when, for example, the custodian was employed during the relevant time period, and was employed in a relevant but not high priority position, or was employed in a relevant role and had medium involvement in the matter. A score of "4" may indicate that the custodian has high relevancy and may be assigned when, for example, the custodian was employed during the relevant time period, and was employed in a highly relevant position, and was employed in a highly relevant role, and had high involvement in the matter.

Although the illustrated embodiment uses a scale from 0-4 to rank custodians, it will be understood that any suitable ranking system may be used to identify and categorize custodians, which may or may not use a numerical ranking such as that illustrated in FIG. 3.

At step 68, all custodians with a score of "0" are released as non-relevant. At step 70, all custodians with a score of "1" or "2" are placed on a hold. However, no data is immediately collected about the custodian, and a custodian interview is not scheduled but may be scheduled in the future. At step 72, all custodians with a score of "3" or "4" are placed on a hold, and a custodian interview is scheduled.

At step 74, negotiations may take place regarding the custodians who received a low-medium relevancy score (e.g., a score of "1" or "2"). If it is determined by the parties that a custodian interview is not needed, at step 76, these low relevancy custodians may be released and no further data is collected. Alternatively, it may be determined by the parties that these custodians should complete custodian interviews.

At step 78, all remaining custodians who have not been released are required to complete a custodian interview. During the custodian interview, relevancy may be reassessed. At step 80, a record is created for each custodian determined to be relevant. If it is determined, after the custodian interview, that a custodian is not relevant, that custodian may be released and a record may not be created for such custodian.

Custodian Administration Module

Figure 4A:
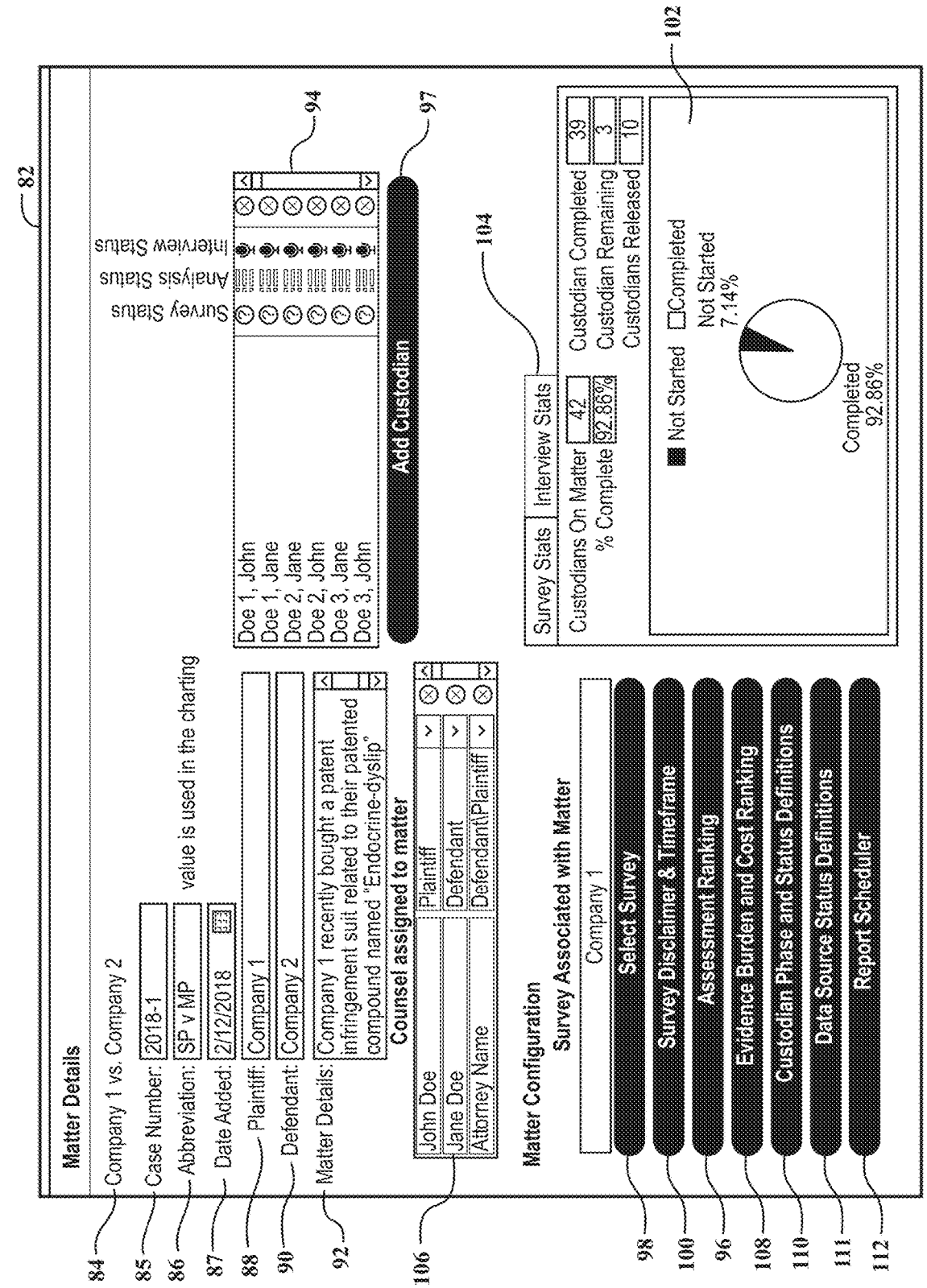
FIG. 4A is an exemplary matter creation screenshot according to one embodiment of the present invention.

Referring now to FIG. 4A, an exemplary matter administration module 36 according to one embodiment of the present invention is shown. The matter administration module 36 is the central administration and project configuration module for creating new matters in the system and for configuring the settings, values and costs used in the system for a given matter. The matter administration module 36 may capture basic background information relative to a matter, a description of the matter, the attorneys involved in the matter, basic custodian information for custodians assigned to the matter, and the survey/interview to be used for the matter. The additional configuration settings may capture various values used to designate custodians and/or data sources that form the basis of the rule set that drive the decisions and the workflow of the system.

When a new matter is created (e.g., at step 52 of method 50; see FIG. 3), a matter creation screen 82 may be presented to the user. The matter creation screen 82 may contain a plurality of fields to be populated by the user with background information about the new matter. For example, the matter name may be entered in matter name field 84. The case number associated with the matter may be entered in case number field 85. An abbreviation associated with the matter may be entered in abbreviation field 86. The date the new matter was added to system 10 may be entered in date added field 87. The names of the parties (e.g., the Plaintiff and Defendant) may be entered in party name fields 88 and 90, respectively. Details about the new matter may be entered in matter details field 92. It will be understood that more, fewer, or different fields may be used as needed for new matter creation depending on the type of matter being created. Further, matter creation screen 82 may include a variety of information about custodians, including a custodian selection screen 94 to track the custodians' progress through the survey and interview processes, and a custodian assessment ranking 96, which may be used in the configuration of the assessment builder (see FIG. 8). A new custodian may be added to the matter using the "Add Custodian" button 97. Additional details about the custodian selection screen 94 are described below with reference to FIGS. 4B-4C.

In addition, matter creation screen 82 may include a variety of information about surveys associated with the matter, including a survey selection button 98, which may identify a survey to be used for the matter (i.e., when there are multiple surveys available in the system), a survey disclaimer and timeframe button 100, which may include a standard legal disclaimer stating the purpose of the survey and the timeframe of the matter, and a survey statistics screen 102 which aggregates data pertaining to survey completion for the matter. Additional details about the survey statistics screen 102 are described below with reference to FIG. 4D.

In addition, matter creation screen 82 may include information about custodian interviews, such as custodian interview statistics screen 104 which aggregates data pertaining to interview completion for the matter. Counsel may be assigned to the matter in counsel assignment field 106.

In addition, matter creation screen 82 may include a variety of settings configuration options, which create values for various databases used throughout the system for analysis, evaluation, and reporting purposes. An evidence burden and cost ranking button 108 may be used to configure data source burden values and collection costs (see FIGS. 20, 22B). A custodian phase and action configuration button 110 may be used to configure values for phasing and custodian workflow drivers. A data source status definitions button may be used to configure values for data source status options, which define scenarios and collection workflows. A report scheduling button 112 may also be available from matter creation screen 82. Additional details about the custodian phase and action configuration screen 110 are described below with reference to FIG. 4E, additional details about the data source and status definitions 111 are described below with reference to FIG. 4F, and additional details about report scheduler 112 are described below with reference to FIG. 25.

Figure 4B:
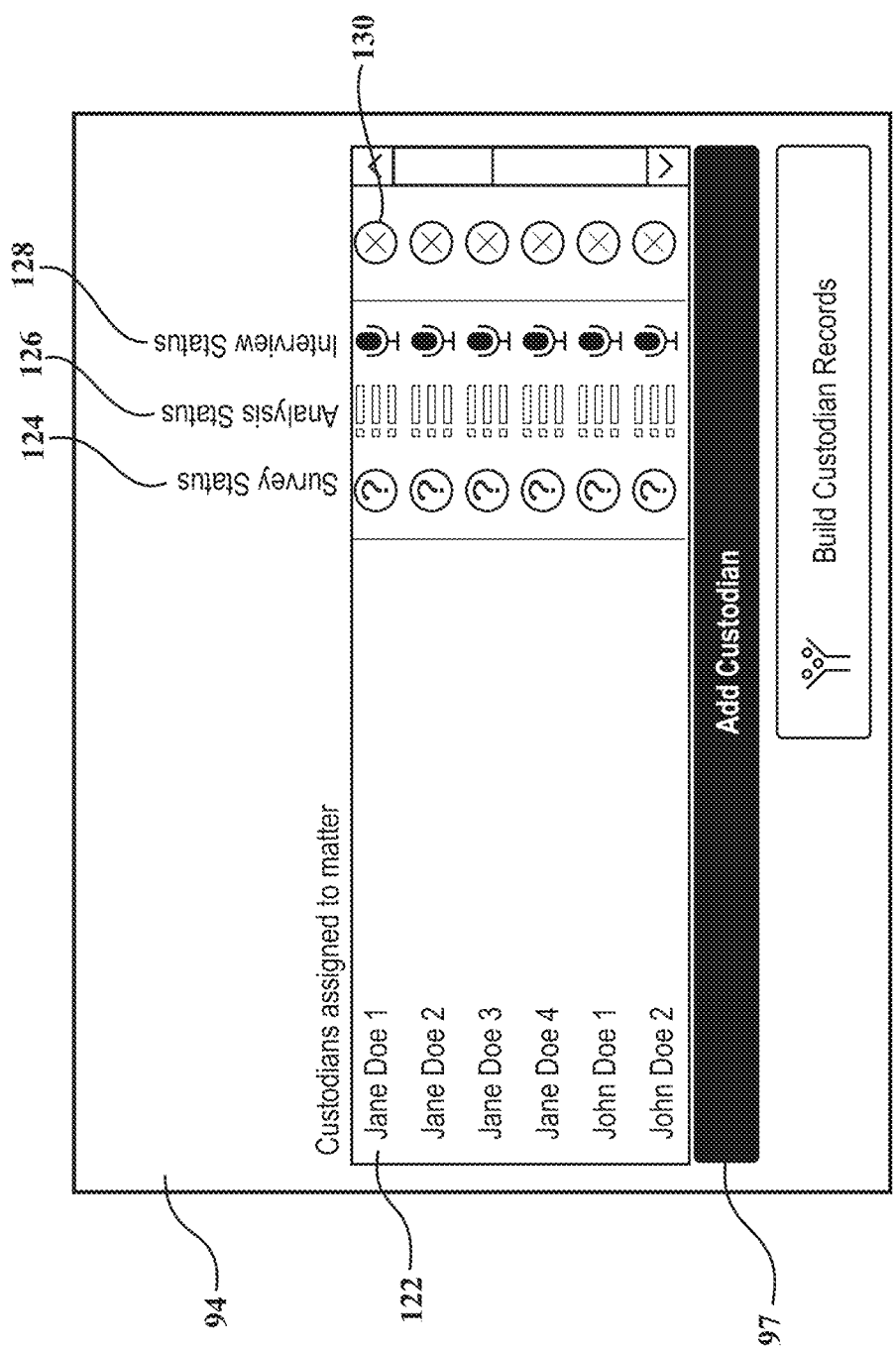
FIG. 4B is an exemplary screenshot of a custodian selection screen according to one embodiment of the present invention.

Referring now to FIG. 4B, an exemplary screenshot of a custodian selection screen 94 according to one embodiment of the present invention is shown. A custodian may be added to a matter, and the custodian selection screen 94, by using an add custodian button 97, which may prompt the user to add information about a new custodian.

Once added, a custodian name will appear in a custodian selection screen 94 (one of which is labeled 122). In one embodiment, the assignment of a custodian to a matter activates a color-coded tracking function that tracks the overall progress of the matter. The custodian selection screen 94 may include various columns with status indicators, including, for instance, a survey status indicator 124, an analysis status indicator 126, and an interview status 128 indicator. The survey status indicator 124 may indicate whether the custodian has completed all required initial surveys (e.g., partial or full initial survey). The analysis status indicator 126 may indicate the status of the analysis of the survey responses (e.g., by an assigned attorney or administrator). The interview status indicator 128 may indicate whether the custodian has completed a custodian interview (if required). There may also be a delete button 130 to delete a custodian from custodian selection screen 94.

Referring now to FIG. 4C, a custodian administration module screen 131 is shown. The custodian administration module screen 131 holds basic record information for all custodians. The custodian administration module screen 131 includes a custodian list 132, from which a particular custodian may be selected and its information viewed and edited, and an "Add New Custodian" button 133, which allows the user to create a new custodian record at any time. Data about custodians may be manually entered or uploaded in a .CSV file, which may contain basic custodian metadata pertaining to the custodian. The custodian metadata may be entered in custodian information fields 134, which may include fields such as but not limited to: name (first, middle, last); business address; city, state, zip code; country; phone number; e-mail address; company name; job title; department; and office location. An image 135 associated with the custodian may also be added. Custodian data may be displayed in numerous locations throughout the system and may be used in various calculations, as described herein. By way of example and not limitation, the "Office Location" field may be used when determining costs associated with collection of data associated with a particular custodian.

The custodian administration module 38 may also contain an assigned matters list 136, which may include information pertaining to the assigned matters for a particular custodian, and information relative to the custodian's completion of survey/analysis/interview stages for all matters in which the custodian is involved. The assigned matters list 136 may further contain custodian location group information 137, which identifies the matters assigned to the custodian and a specific data source location group assigned to a custodian for each matter. The custodian location group information 137 may be used, for instance, in assigning a burdensome/effort score to a data source as well as determining costs associated with that data source moving from preservation, through to review and production. The custodian administration module 38 may further include custodian metrics 138, which may be an at-a-glance view of certain metrics associated with the selected custodian, including, for example, survey count (total/complete/incomplete), evidence collected count, evidence added count, survey analysis count, and survey interview count.

Figure 4D:
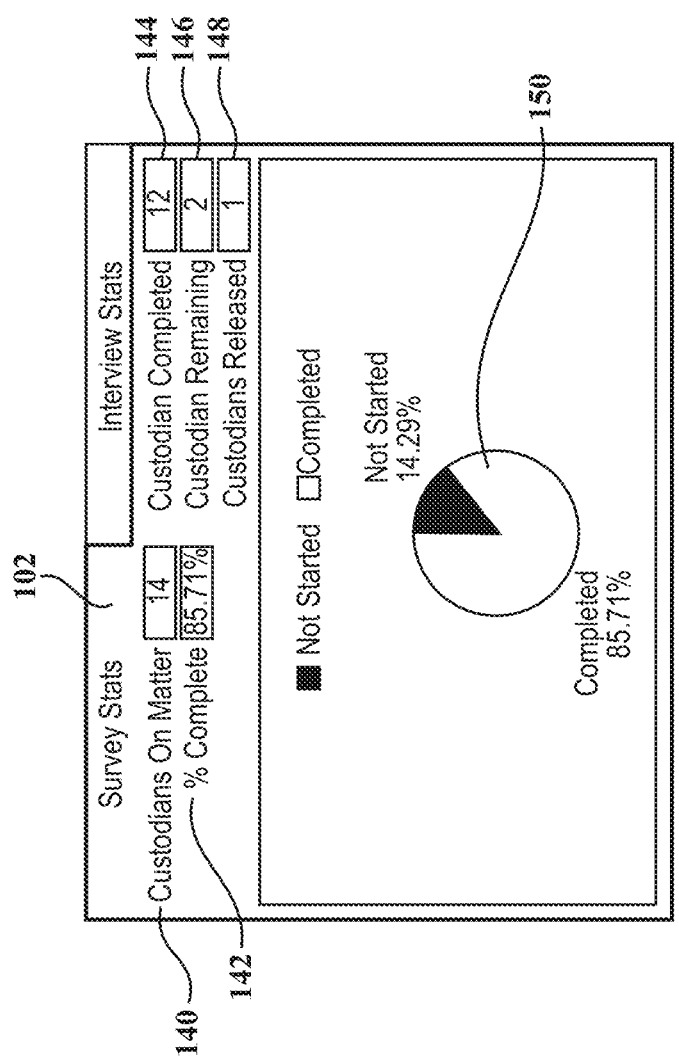
FIG. 4D is an exemplary screenshot of a survey statistics screen according to one embodiment of the present invention.

Referring now to FIG. 4D, an exemplary screenshot of a survey statistics screen 102 according to one embodiment of the present invention is shown. The survey statistics screen 102 may include various data about the status of the initial surveys for the matter. For example, the survey statistics screen 102 may include a total custodians field 140, indicating the total number of custodians assigned to the matter, as well as a percent complete field 142, indicating the percentage of the total number of custodians who have completed the required survey(s). More detailed information about the breakdown of custodians may also be included, such as a field 144 showing the number of custodians who have completed the survey(s), a field 146 for showing the number of custodians who have yet to complete the survey(s), and a field 148 for showing the number of custodians released from the matter. In some embodiments, the survey statistics screen 102 may also include a graphical representation of the statistics, such as a graph 150, shown in FIG. 4D as a pie chart. It will be understood that any suitable graphical representations may be used to display the data (e.g., a bar graph, a line graph, etc.).

Figure 4E:
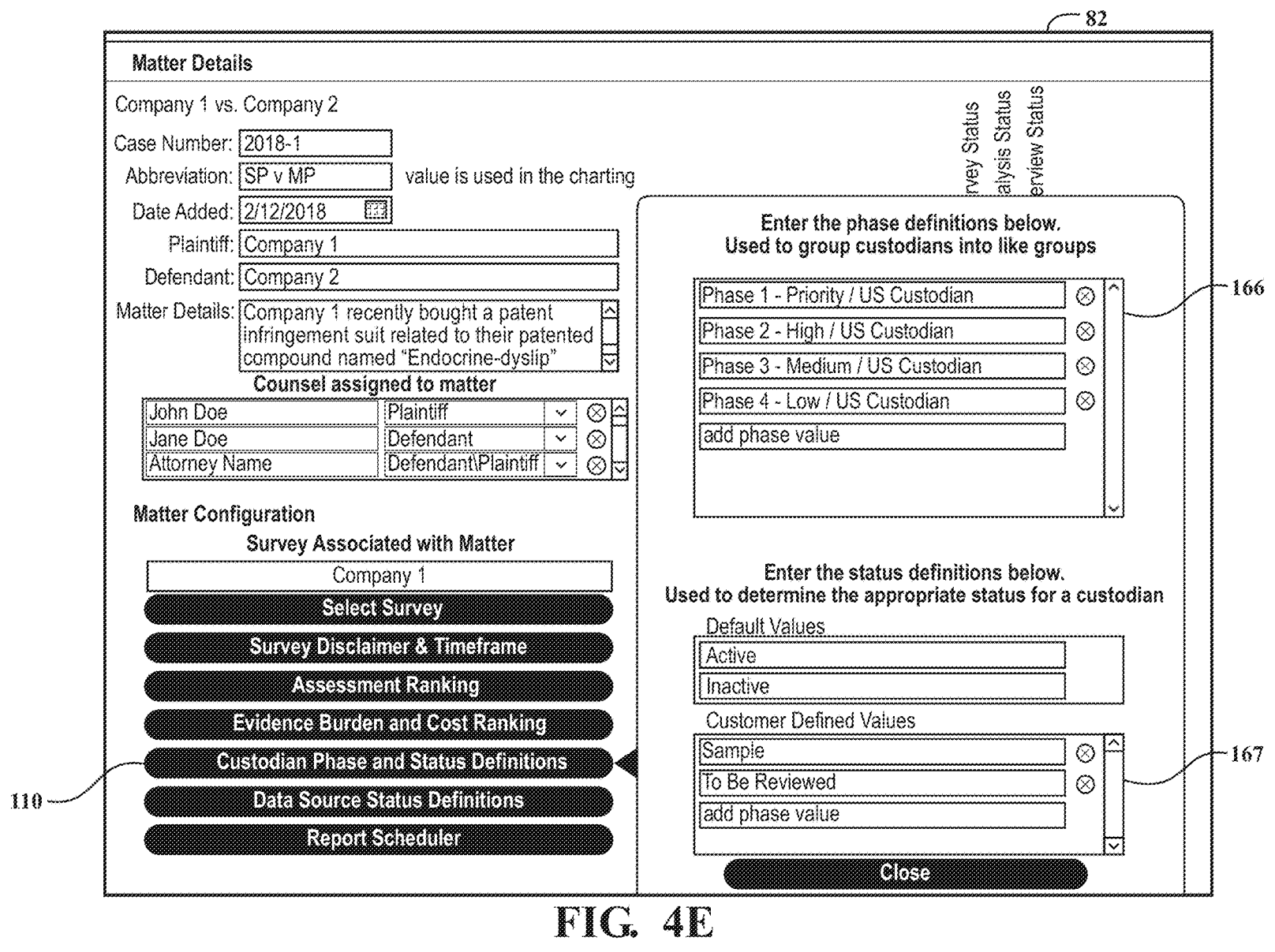

Referring now to FIG. 4E, an exemplary screenshot of a custodian phase and action configuration screen 110 according to one embodiment of the present invention is shown. The custodian phase and action configuration screen 110 allows a user to organize custodians by applying a phase number to prioritize custodians by relevancy. The custodian phase and action configuration screen 110 may allow a user to enter custodian phase definitions in a first table 166, which allows custodians to be categorized into like groups. By way of illustration and not limitation, the following groups may be used: Phase 1: Priority/U.S. Custodian; Phase 2: High/U.S. Custodian; Phase 3: Medium/U.S. Custodian; Phase 4: Low/U.S. Custodian. The custodians may then be addressed phase by phase, starting with the highest priority phase and moving to the lowest priority phase.

The custodian phase and action configuration screen 110 may further allow a user to assign an action status to custodians to classify their current status. For example, a user may enter definitions in a second table 167, which are used to assign a status designation for a custodian. By way of illustration and not limitation, the following designations may be used: "active"; "pending" or "TBD (to be determined)"; "freeze"; and "release". For an active custodian, a user may assign an action to any data sources associated with that custodian, based on the cost and burden ranking. By way of illustration and not limitation, the following actions may be used: "preserve in place"; "collect"; "hold"; "negotiate"; "sample"; and "cost shift".

Figure 4F:
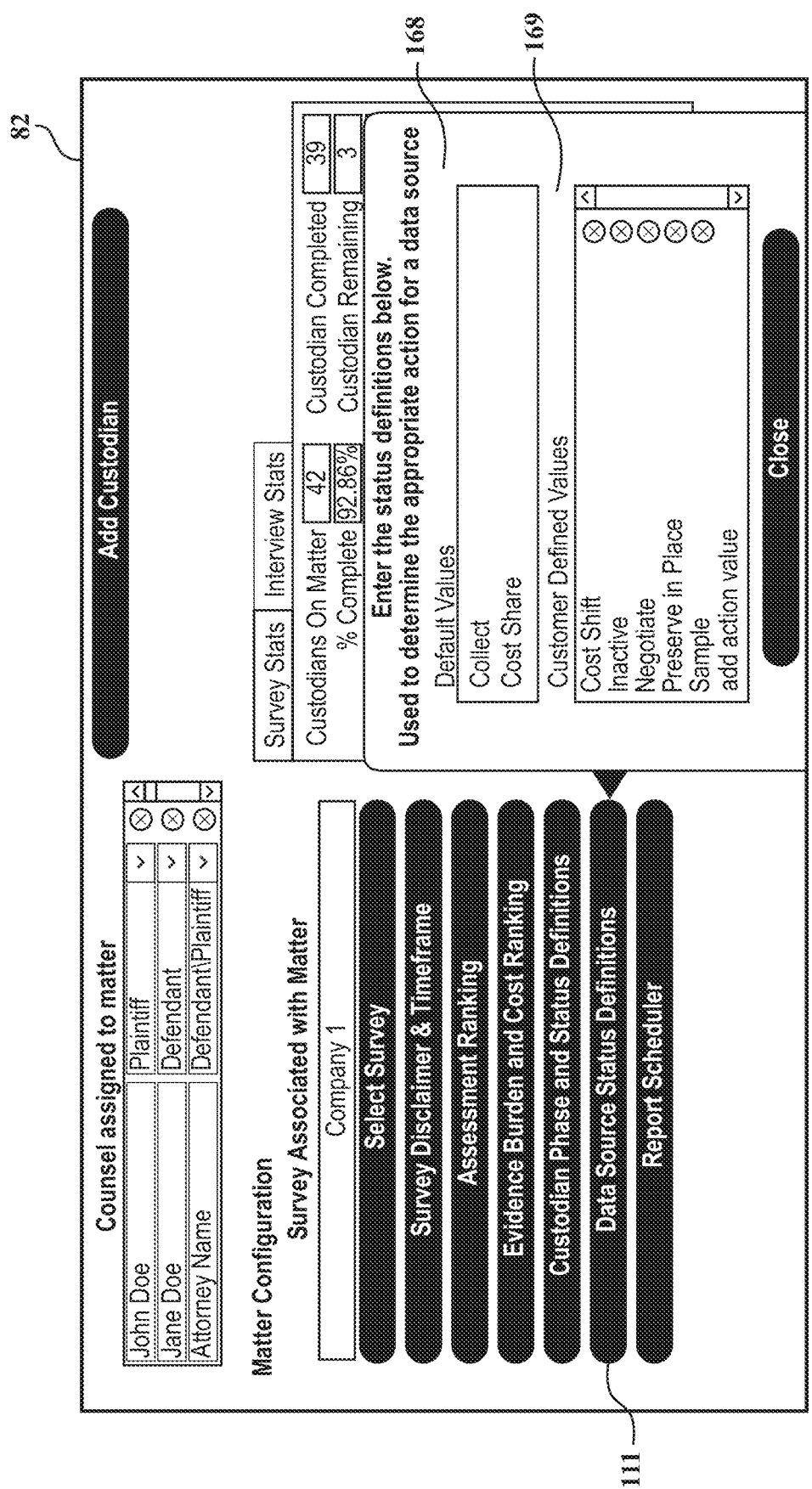
FIG. 4F is an exemplary screenshot of a data source status definitions configuration screen according to one embodiment of the present invention.

Referring now to FIG. 4F, an exemplary screenshot of a data source status definitions screen 111 according to one embodiment of the present invention is shown. The data source status definitions screen 111 allows a user to configure possible values to assign a data source to designate its status within the workflow. The status designations may be default values 168 or customer-defined values 169. By way of illustration and not limitation, the default values 168 may include "collect" and "cost share". By way of illustration and not limitation, the customer-defined values 169 may include "cost shift", "inactive", "negotiate", "preserve in place", "sample", etc.

Referring now to FIG. 5, an exemplary matter summary screenshot according to one embodiment of the present invention is shown. A matter summary screenshot 170 may include summarized information about a list of matters and organized by columns. A matter name column 172 may display matter names. A survey name column 174 may display survey names associated with each matter. A total custodians column 176 may display the total number of custodians associated with each matter. A completed surveys column 178 may display the number of custodians who have completed the survey associated with the matter. The custodians released column 180 may display the number of custodians who have been released as non-relevant from the matter. The custodians held column 182 may display the number of custodians who have been placed on a hold based on the results of the survey. The user may add a new matter using a new matter button 184. The user may edit an existing matter by using an editor button next to each matter name, one of which is labeled 186.

Custodian Evaluation Module

The custodian evaluation module 42 facilitates evaluation of individual custodians and their relevance to a particular matter. The goal of the evaluation is to make an informed decision about whether to include the custodian in the evidence collection process, or to release them from further involvement in the matter. The custodian evaluation module 42 provides a visual status view on the progress of the evaluation and links to specific tasks that are part of the evaluation.

Figure 6:
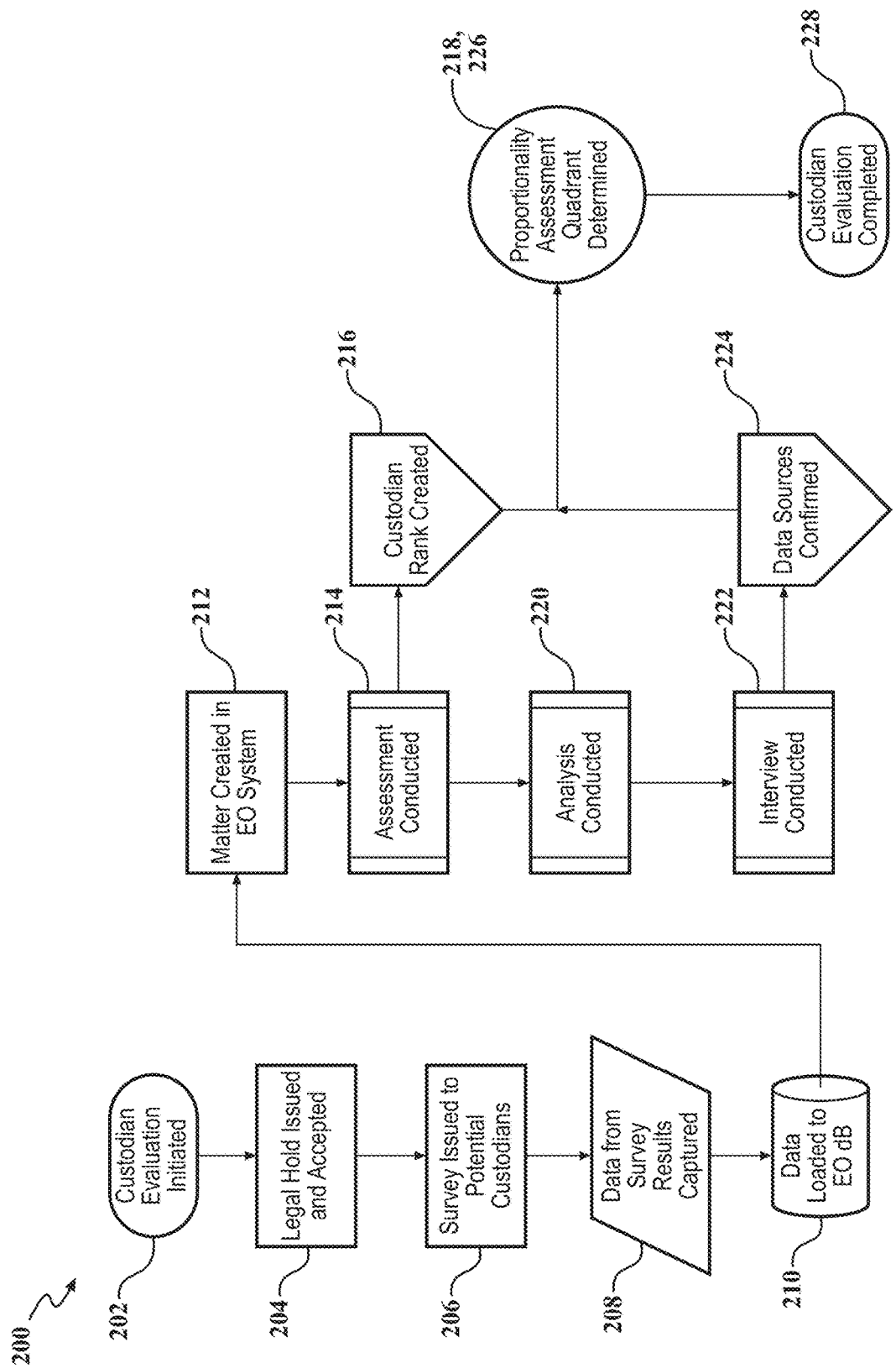
FIG. 6 is a flow diagram illustrating a custodian evaluation method using a custodian evaluation module according to one embodiment of the present invention.

Referring now to FIG. 6, a flow diagram illustrating a custodian evaluation method 200 using the custodian evaluation module 42 is shown. At a first step 202, evaluation of a custodian is initiated. At a second step 204, a legal hold is issued to the custodian and accepted. At a third step 206, a survey is issued to potential custodians. At a fourth step 208, data from the survey results is captured. At a fifth step 210, the data is loaded into database(s) (e.g., database 22, FIG. 1). At a sixth step 212, a matter is created in the system (see FIGS. 3-5). At a seventh step 214, a custodian assessment is conducted, including the optional steps 216, 218 of creating a custodian rank and proportionality assessment quadrant (e.g., if not already done). At an eighth step 220, a custodian survey analysis is conducted. At a ninth step 222, an interview of the custodian is conducted. At a tenth step 224, data sources associated with the custodian are confirmed. At an eleventh step 226, a proportionality assessment quadrant for the custodian and data source(s) is determined. At a twelfth step 228, the custodian evaluation is completed.

Figure 7A:
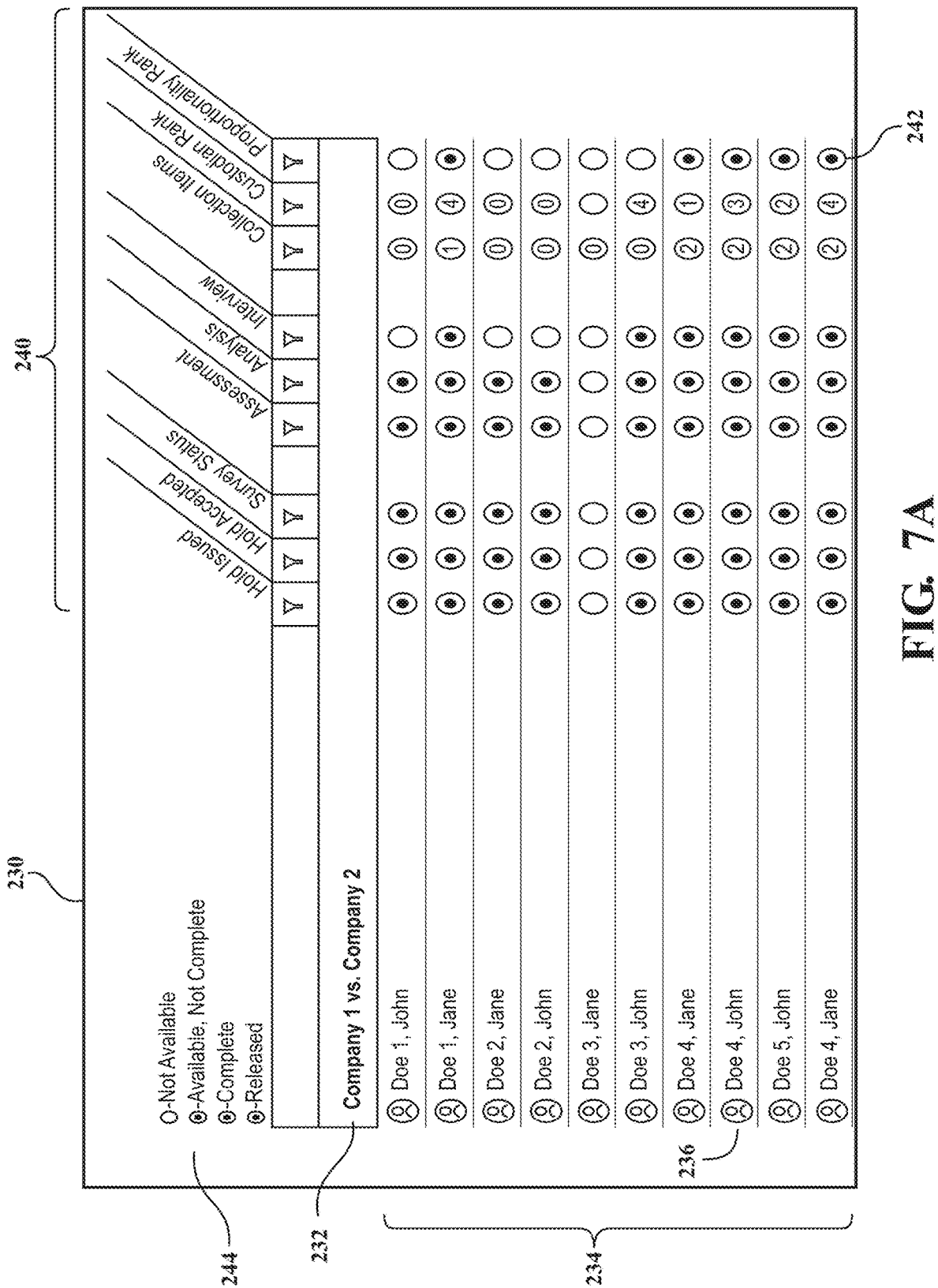
FIG. 7A is an exemplary custodian evaluation status screen according to one embodiment of the present invention.

Referring now to FIG. 7A, an exemplary custodian evaluation status screen 230 according to one embodiment of the present invention is shown. All custodians assigned to a particular matter 232 are listed in a custodian list 234. Each listed custodian may include a clickable icon or link, one of which is labeled 236. As shown in FIG. 7B, clicking on the icon or link may allow the user to quickly view additional custodian information 238 stored in the system.

Referring again to FIG. 7A, next to the custodian list 234 is a status chart 240 that includes columns for each of the custodian evaluation stages (see method 200, FIG. 6), which may include, for instance: "Hold Issued", "Hold Accepted", "Survey Status", "Assessment", "Analysis", "Interview", "Collection Name", "Custodian Rank", and "Proportionality Rank". Under each column for each listed custodian, a status indicator (one of which is labeled 242) is used to quickly display the status of the custodian within the selected stage. Status indicators 242 may be simply a radio button selection to indicate completion (or an unselected radio button to indicate an incomplete status), a color-coded indicator, a numeral (e.g., 1-4 to indicate rank), or any other similar indicator that provides an at-a-glance status. An indicator key 244 may include a key of the indicator icons and their definitions. In some embodiments, access to certain functionalities of the system may be rule-based and/or dependent upon completion of the previous stages.

Assessment Builder Module

The subject invention may utilize a standardized process, such as a technology-assisted interview, to conduct both assessment surveys and full interviews to classify a custodian's relevance and identify relevant data sources. An assessment interview can be used to quickly release active custodians or place holds on custodians who have not yet been identified. This accelerated process provides the ability to rank and prioritize custodians based on relevancy, which guides the overall discovery approach.

The assessment builder module 40 allows an administrator to create a series of questions to assess a custodian's involvement and knowledge relating to the claims and defenses of the matter. Such assessment may have any number of questions. The answers to these questions may be submitted through the system to the algorithm that calculates a rank and an initial status (e.g., "Hold" or "Release") associated with the custodian. Each question is scored individually and then combined to create a total score or rank for the custodian. The user doing the "building" of the assessment (sometimes referred to herein as the "builder") is typically a site administrator who is responsible for setting up the assessment, creating the questions, and determining the scoring methodology. This is typically done in coordination with the attorneys assigned to the matter.

In addition, the assessment builder module 40 provides the building blocks for the assessment interview. This interview provides a unique assessment technique designed to evaluate a custodian's knowledge and involvement in the matter. The user doing the interviewing of custodians (sometimes referred to herein as the "interviewer") is typically an attorney assigned to the matter responsible for making subjective decisions about which custodians are to be held and which are to be released. Through the assessment builder module 40, the builder develops a strategy for assessing each custodian and his/her importance relative to the matter. Based on the algorithms employed in building and scoring the assessment, a rank for each custodian is defined and a determination about his/her status (e.g., "Hold" or "Release") is made. The results of this assessment, the custodian rank, and other data points generated in other modules, are combined to create a proportional assessment rank for each data source for each custodian. The proportional assessment rank forms the basis for strategic cost analysis and potential negotiations with an opposing party.

Figure 8:
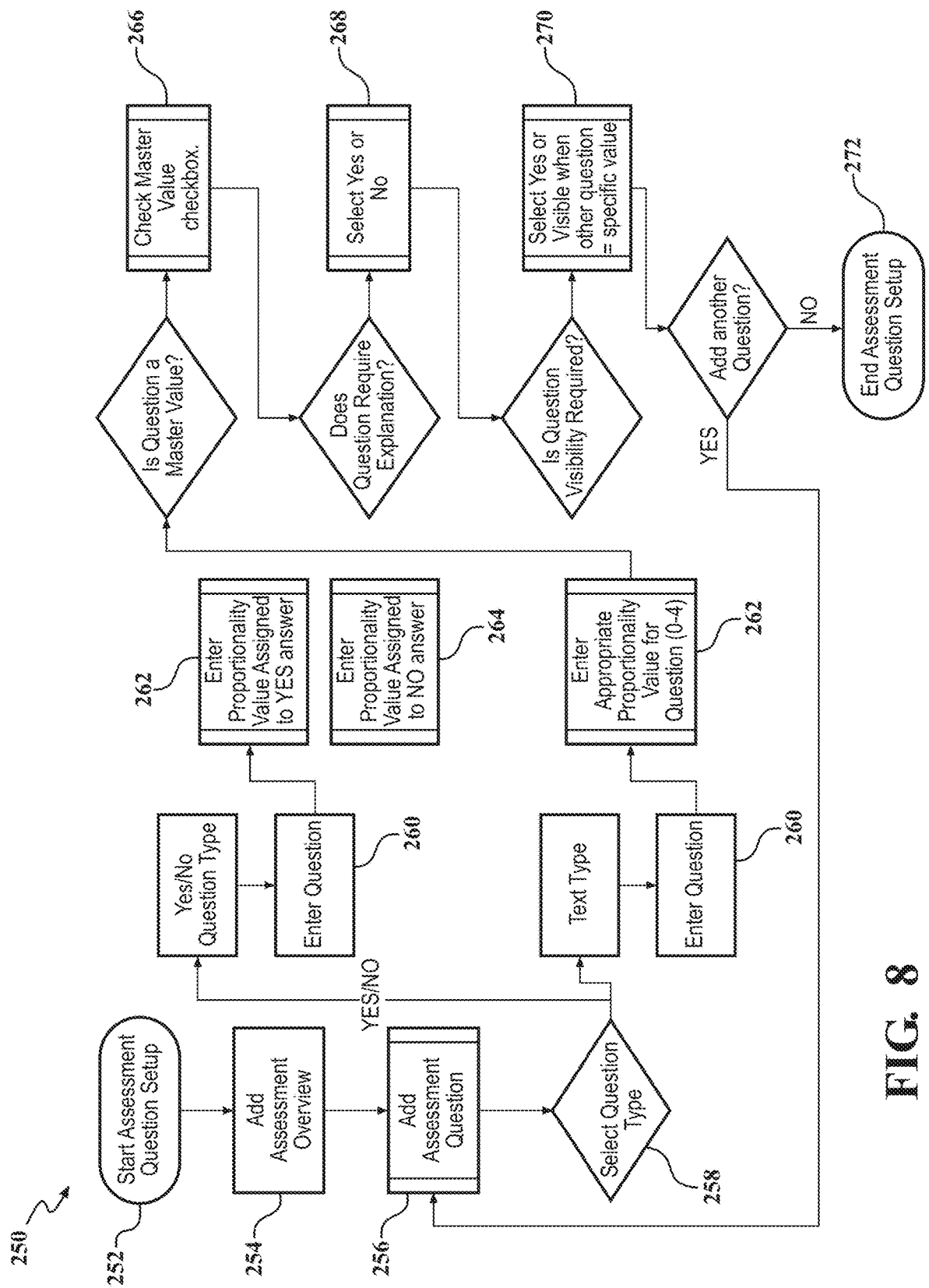
FIG. 8 is a flow diagram illustrating an assessment builder method using an assessment builder module according to one embodiment of the present invention.

Referring now to FIG. 8, a flow diagram illustrating an assessment builder method 250 using the assessment builder module 40 is shown. At a first step 252, an assessment question setup is initiated. At a second step 254, an assessment overview is added. At a third step 256, an assessment question is added. At a fourth step 258, a question type is added. At a fifth step 260, a question is added. At a sixth step 262, a proportionality value is assigned for the question response (e.g., a value between 0 and 4). If the question type is a "yes/no" question, at a step 264, a second proportionality value is assigned.

At a seventh step 266, a "master value" checkbox is marked if the question is designated as a master value question. At an eighth step 268, an "explanation" checkbox is marked if the question requires an explanation. At a ninth step 270, a "visibility" checkbox is marked if the question should be visible always, or when a response to another question has a specific value. If another question needs to be added to the assessment, the method is repeated from step 256. When all questions have been added to the assessment, the question setup concludes at step 272.

Figure 9A:
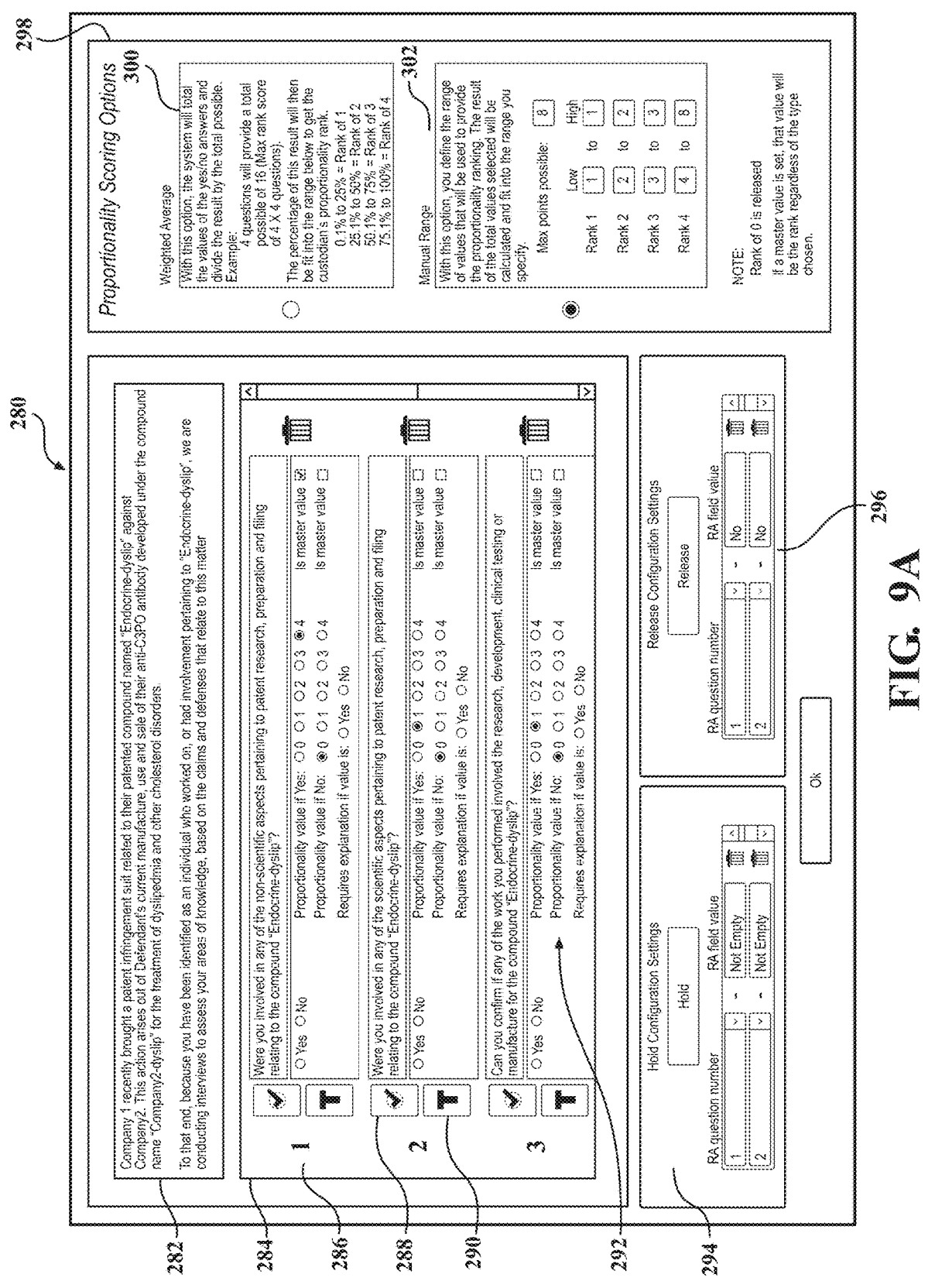
Figure 9B:
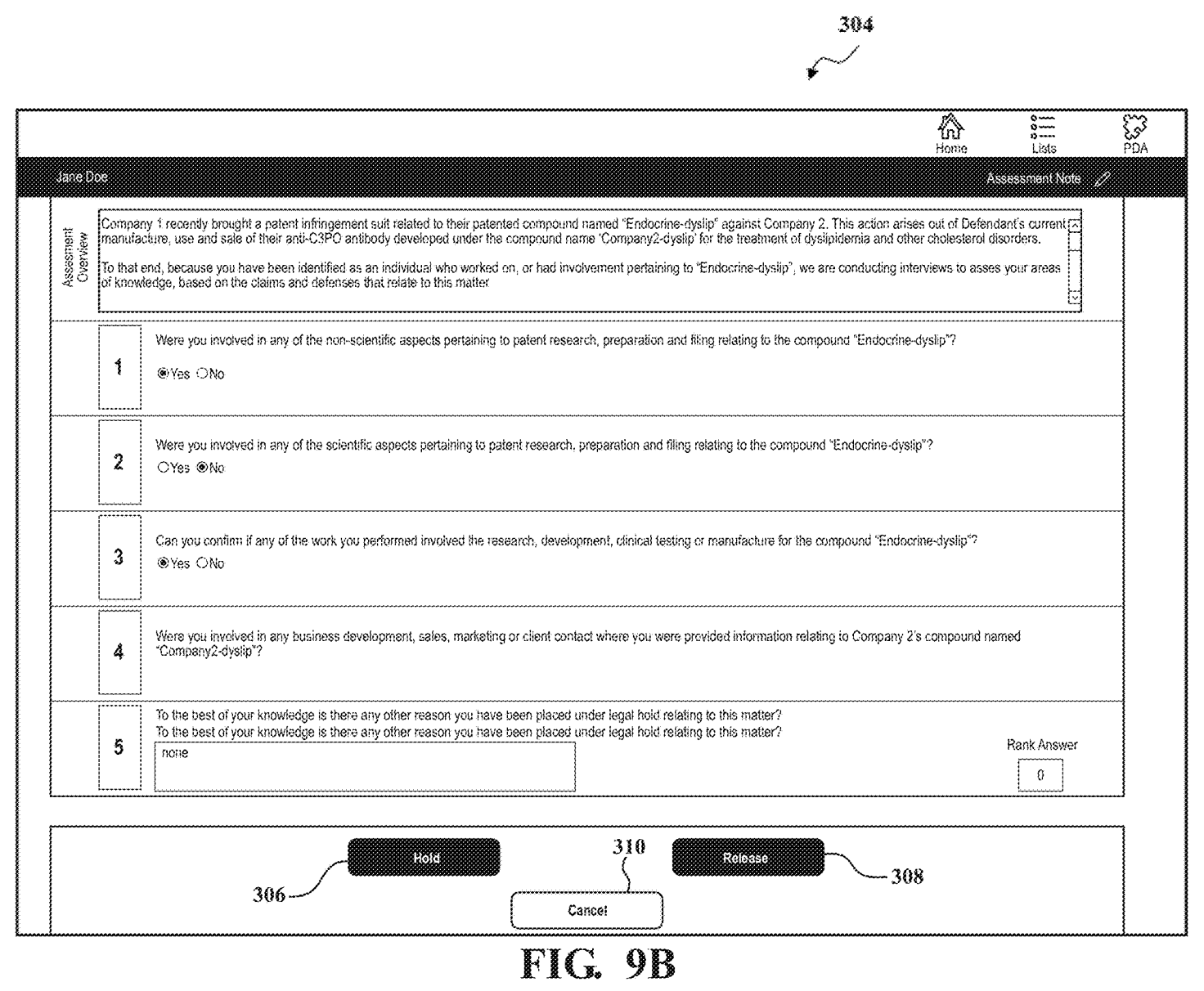

Referring now to FIGS. 9A-9B, exemplary custodian relevancy assessment builder screens according to one embodiment of the present invention are shown.

Referring now to FIG. 9A, an exemplary custodian relevancy assessment builder screenshot according to one embodiment of the present invention is shown. A custodian relevancy assessment builder screen 280 may include a summary of the matter 282 that includes an administrator-created description of the matter and the objectives of the assessment. The custodian relevancy assessment builder screen 280 may further include an assessment question builder 284. The assessment question builder 284 may include administrator-created assessment question(s); exemplary assessment questions are numbered within screen 280 as "1", "2", and "3", one of which is labeled 286. The assessment questions may be of any type. For example, and not by way of limitation, assessment questions may be questions that require a Yes/No answer, and/or questions that require a text-based answer.

Next to each question, a question field 288 allows entry of question text and a response field "T" 290 allows for entry of a question response. Each question 286 may additionally have a variety of question settings 292. The question settings 292 may be fully customizable and may be different for each question within a survey. The question settings 292 may define how much weight a particular response to a question is given, for example, on a scale of 0-4. For example, in the illustrated embodiment, a response of "yes" to Question 1 indicates a high value of "4" should be assigned, whereas a response of "no" indicates the lowest value of "0" should be assigned. A score of "4" indicates the highest relevance to the claims and/or defenses in a matter. A score of "0" indicates no relevance to the claims and/or defenses in a matter. Scores of 1, 2, or 3 may indicate varying levels of relevance, as may be determined by the interviewer. Moreover, the question settings 292 may allow the user to choose whether additional explanation is required based on the response given.

Additionally, each assessment question may be designated as a master value by the administrator. The master value designation is a rule which can be applied to stipulate that if the interviewee responds to that question with a "4" value, that score becomes the interviewee's default score to ensure that the score for a highly relevant question gets the maximum score available.

The administrator may choose a range of available scores in a text-based question. A text-based question requires a narrative response by the interviewee. The interviewer may have the flexibility to select a score based on the interviewee's answer. Scores from "0" (low) to "4" (high) may be available.

The administrator may also determine whether any assessment question is visible to the interviewer. The administrator may choose to display or hide assessment questions based on answers to previous questions. For example, the administrator may designate that an assessment question is always visible, or only visible if a certain answer was given to the previous assessment question.

The custodian relevancy assessment builder screen 280 may further include hold configuration settings 294, in which settings can be configured such that certain responses to specific questions may enforce a hold of the custodian for further evaluation in relation to the matter, indicating that the custodian has been deemed a potentially relevant custodian. The custodian relevancy assessment builder screen 280 may further include release configuration settings 296, in which settings can be configured such that certain responses to specific questions may enforce the release of the custodian, indicating that the custodian has been deemed irrelevant to the matter. The assessment builder module 40 may define when hold and/or release options are selectable during the assessment interview. This ensures that the assessment is completed accurately. The administrator may also require that an explanation be provided when a hold and/or release option is selected.

The custodian relevancy assessment builder screen 280 may further include proportionality scoring options 298. Different scoring options may be presented to the user. Different scoring algorithms may be used for the different scoring options, including, for example, a weighted average scoring algorithm and a manual scoring algorithm.

For instance, a weighted average option 300 may be chosen. With this option, the algorithm calculates the custodian rank by aggregating the weighted scores from each question in the assessment including the qualitative score assigned by the interviewer to text questions. The sum of these scores is then divided by the total possible score of all the questions in the assessment to calculate the quartile in which the custodian's score falls. Each quartile corresponds to a specific Custodian Rank. For example, four questions provide a total possible score of 16. The result will be converted to a percentage of this total score and then compared against a known range to determine the proportionality rank of the custodian. For example, the following ranges may be used:

0.01% to 25%=Rank of 1
25.1% to 50%=Rank of 2
50.1% to 75%=Rank of 3
75.1% to 100%=Rank of 4

Another option is a manual range option 302. With this option, the user defines the range of values that will be used to determine the custodian's proportionality ranking. The result of the total values selected will be calculated and compared against the ranges provided by the user.

In one embodiment, a custodian with a rank of 0 is always released, regardless of the proportionality scoring option 298 chosen by the user. In other embodiments, if a master value is set for any one question, that master value will be the resulting proportionality ranking, regardless of the proportionality scoring option 298 chosen by the user.

Referring now to FIG. 9B, an exemplary custodian relevancy assessment screen 304 according to one embodiment of the present invention is shown. The custodian relevancy assessment screen 304 displays the custodian assessment ranking questions (previously set up in the custodian relevancy assessment builder screen 280 of FIG. 9A), which the interviewer may be required to ask the interviewee. In some embodiments, the interviewee's prior responses are already populated. The custodian relevancy assessment screen 304 may include a hold button 306 and a release button 308. In some embodiments, the hold button 306 and the release button 308 will appear only if certain question numbers and response values match. If the custodian assessment ranking has already been assigned, one of the two buttons 306, 308 will be toggled to indicate whether the custodian was held or released based on the initial survey questions. If the custodian assessment ranking has not been assigned, the ranking will be calculated based on the provided responses and the interviewer will be required to hold or release the custodian based on the assessment ranking. The interviewer may exit the custodian relevancy assessment screen 304 by selecting the cancel button 310.

Survey Building Module

The survey building module 44 holds the workflow for the creation of the custodian survey and interview process. This entails three stages: an initial survey, analysis of the survey responses, and a final interview. The initial survey is typically distributed to custodians to complete and return. Analysis of the survey responses is typically conducted by an administrator. The final interview is typically conducted by an assigned attorney for the purposes of confirming previously gathered information from the custodian and finalizing a status associated with the custodian (e.g., "hold" or "release").

The question configuration has pre-defined programmatic intelligence which records decisions based on how the question is assessed and answered during the interview. Each question in the survey and interview has the potential to drive execution decisions pertaining to the custodian's role in the matter, the data sources associated with the custodian, and the collection of the data sources. The process, therefore, must follow a series of logical steps. There are three different categories of questions and eighteen question types available in the illustrated embodiment, although it is contemplated that any number of question categories and/or types may be made available.

It is contemplated that the survey creation platform may exist as a web-based platform that allows users to build surveys and interviews via a web interface.

Figure 10:
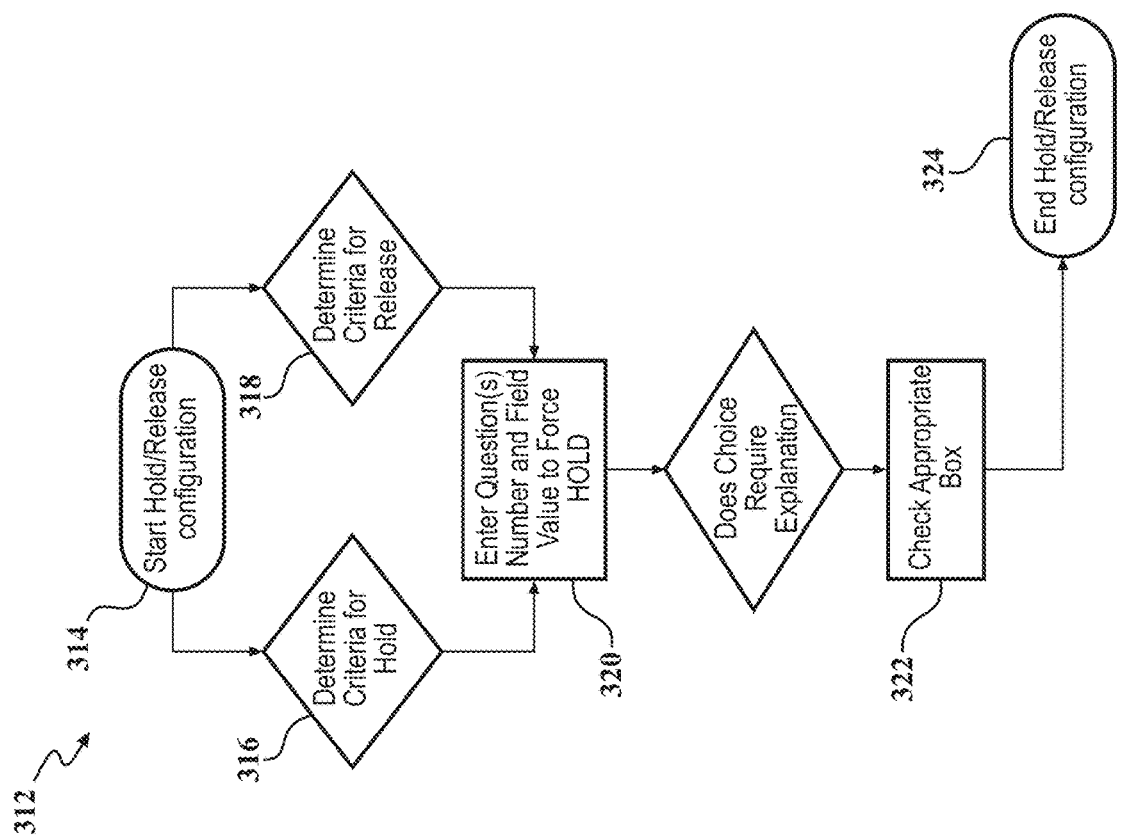
FIG. 10 is a flow diagram illustrating a hold/release configuration method according to one embodiment of the present invention.

Referring now to FIG. 10, a flow diagram illustrating a hold/release configuration method 312 is shown. At a first step 314, a hold/release configuration is started. At a second step 316, criteria for a custodian "hold" are determined. At a third step 318, criteria for a custodian "release" are determined. At a fourth step 320, question number(s) and field value(s) are entered that will force a custodian "hold". At a fifth step 322, a box is checked to indicate whether the choice of "hold" or "release" requires an explanation by the interviewer, once selected. At a sixth step 324, the hold/release configuration is terminated.

Figure 11:
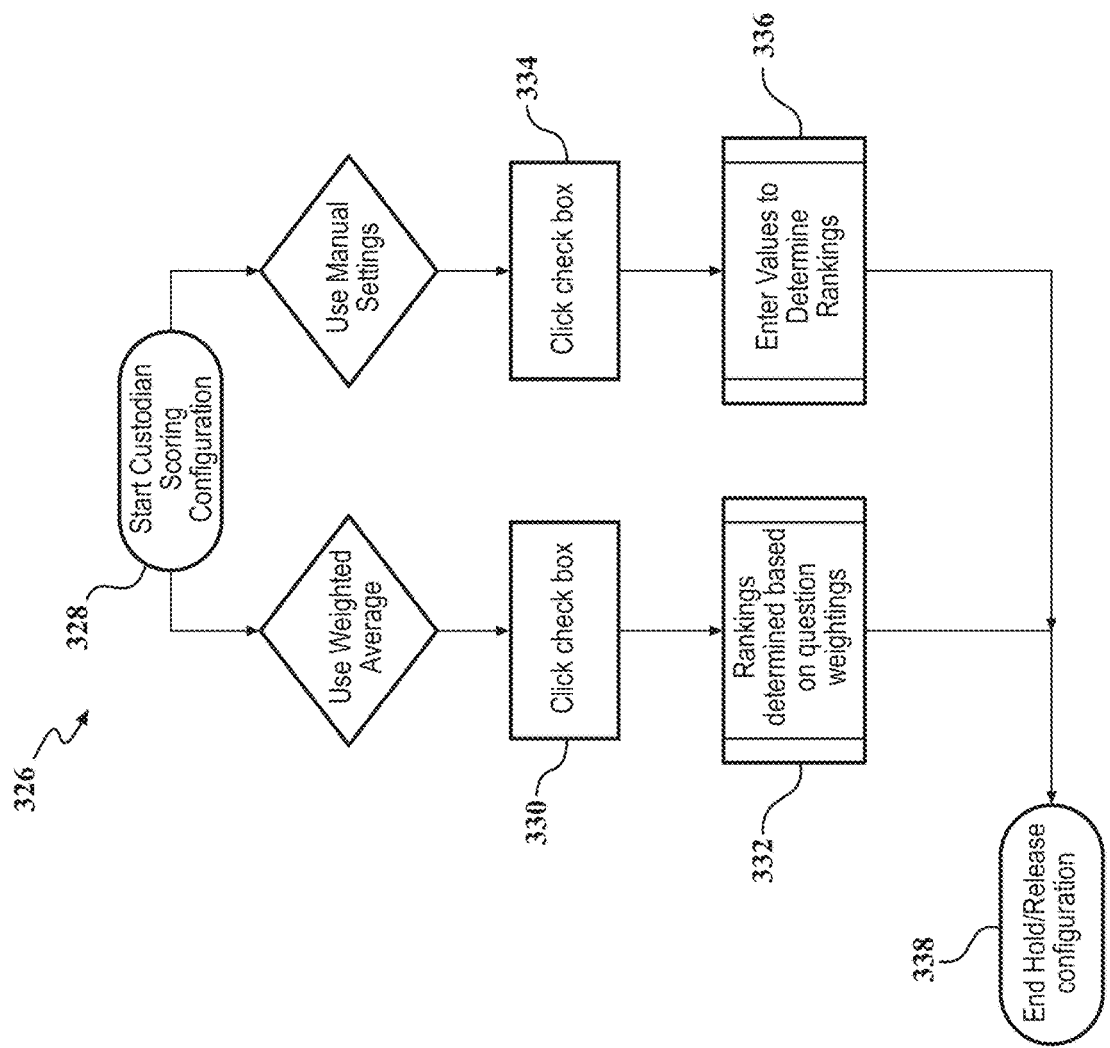
FIG. 11 is a flow diagram illustrating a custodian scoring configuration method according to one embodiment of the present invention.

Referring now to FIG. 11, a flow diagram illustrating a custodian scoring configuration method 326 is shown. At a first step 328, a custodian scoring configuration is started. If a weighted average is being utilized, at step 330, a box for "weighted average" is checked. At step 332, rankings are determined based on question weightings. If manual scoring settings are utilized, at step 334, a box for "manual scoring" is checked. At step 336, values for questions are entered manually to determine rankings. At a sixth step 338, the custodian scoring configuration is terminated.

Figure 12:
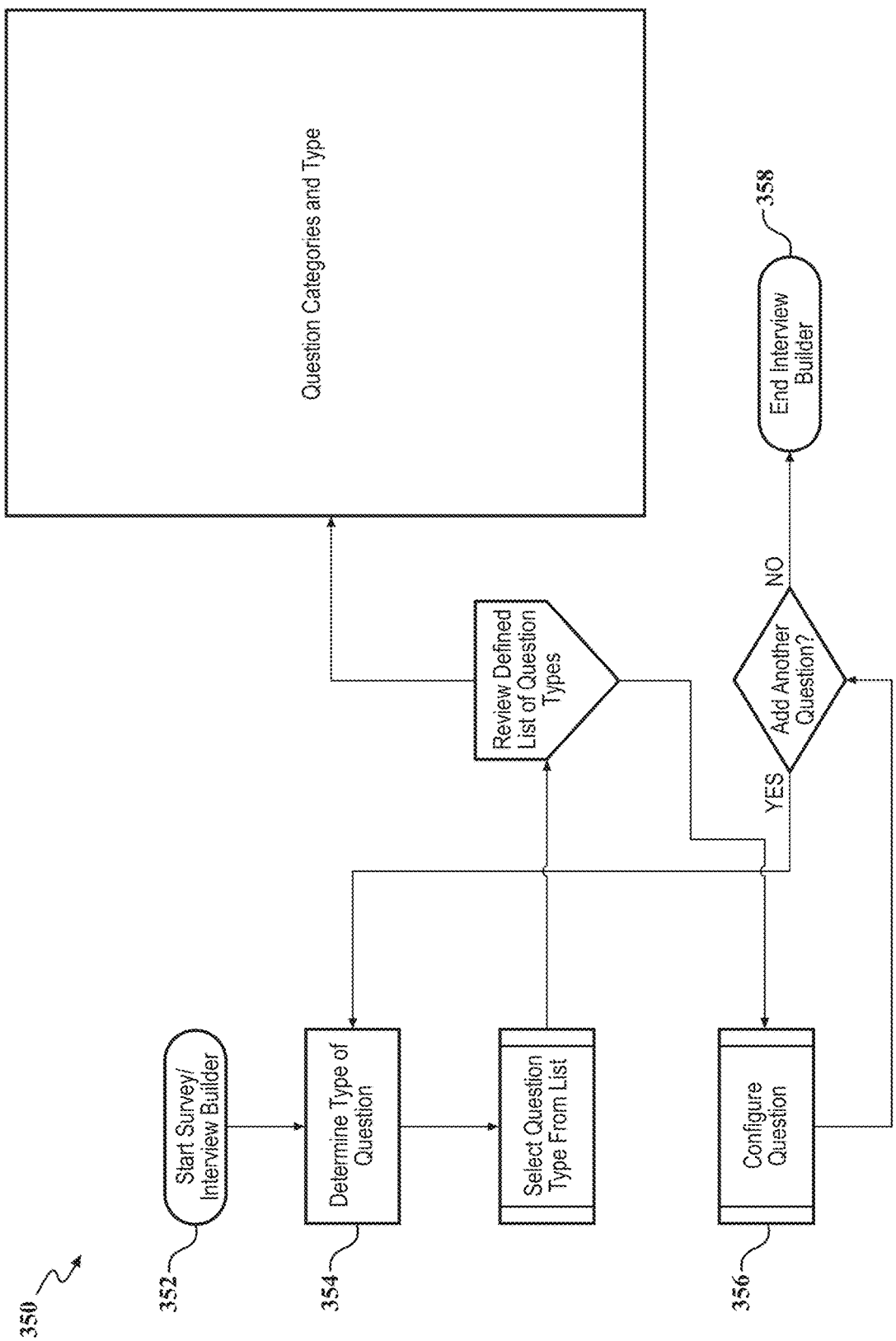
FIG. 12 is a flow diagram illustrating a survey building method using a survey building module according to one embodiment of the present invention.

Referring now to FIG. 12, a flow diagram illustrating a survey building method 350 using the survey building module 44 is shown. At a first step 352, a survey builder is initiated. At a second step 354, a type of question is chosen by, for example, choosing from a list of question types. A builder may review the list of question types which may include explanations of different types of questions. At a third step 356, the question is configured by the builder. If another question needs to be added to the assessment, the method is repeated from step 354. When all questions have been added to the survey, the method concludes at step 358.

Figure 13A:
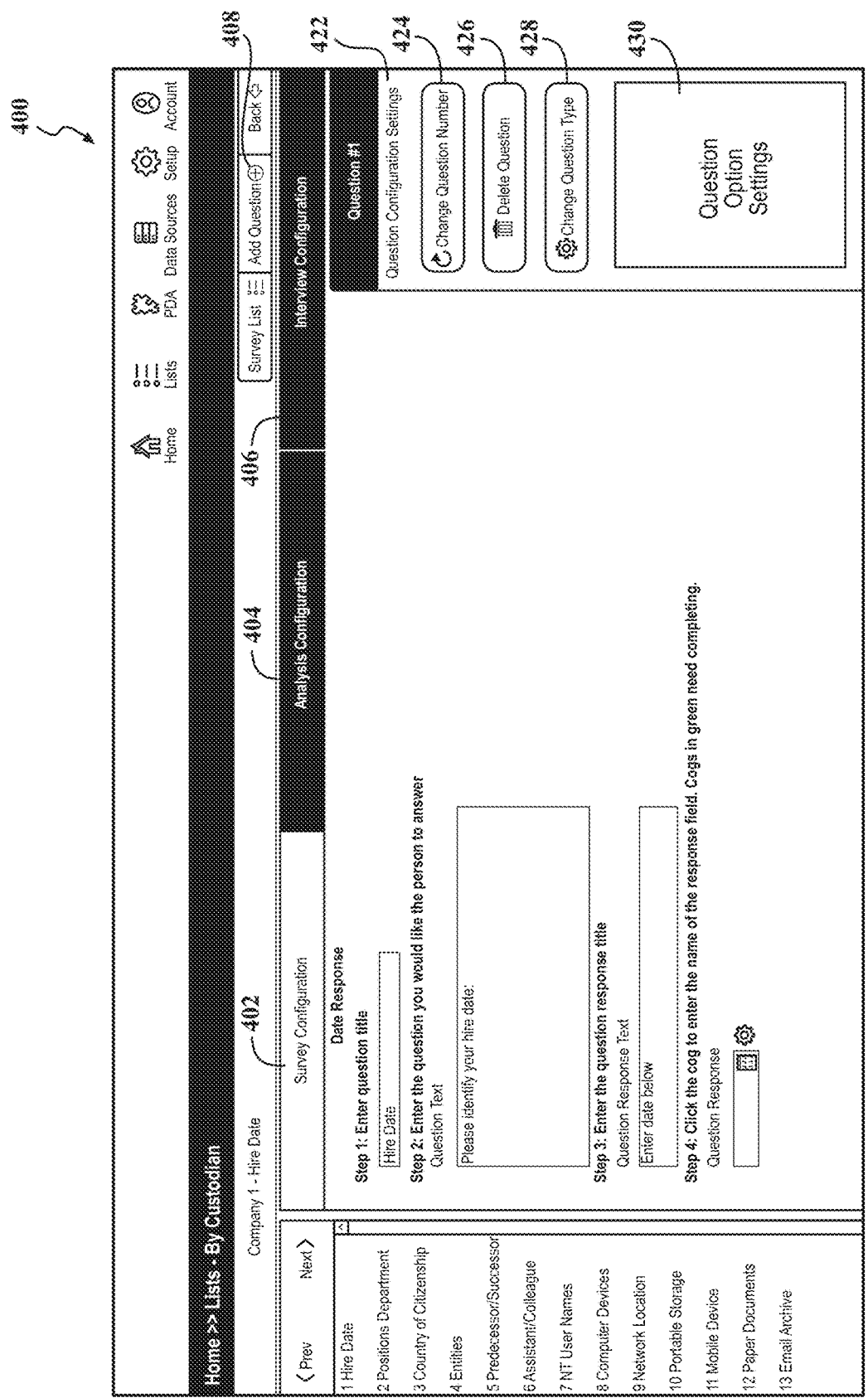

Referring now to FIGS. 13A-13E, exemplary survey builder screenshots according to one embodiment of the present invention are shown. Referring now to FIG. 13A, a survey builder screen 400 includes a survey configuration screen 402, an analysis configuration screen 404, and an interview configuration screen 406. The survey builder screen 400 further includes an add question button 408, which a user may use to add a new question to a survey.

Figure 13B:
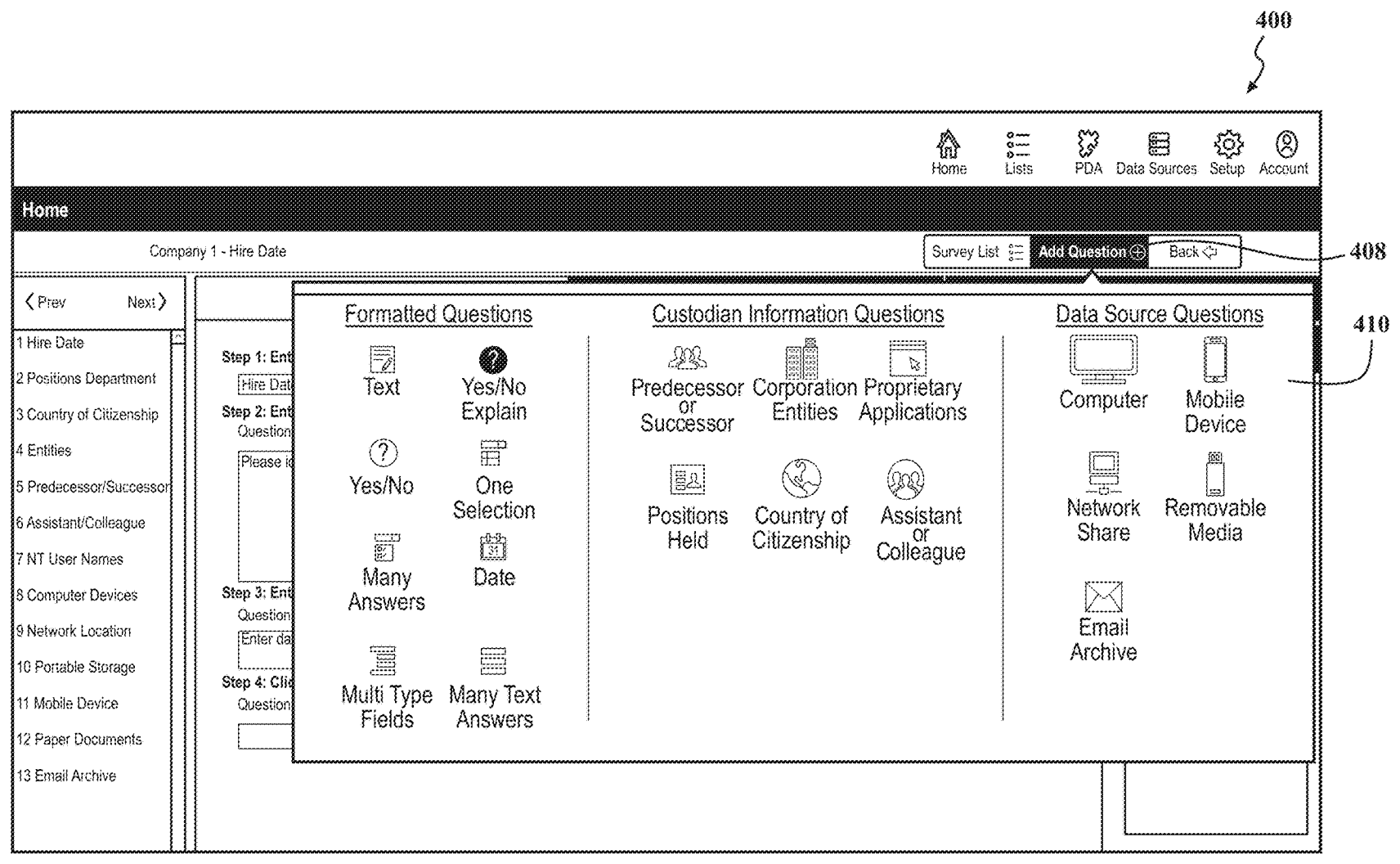

Referring Now to FIG. 13B, when Add Question Button 408 is Selected, a Question Type Screen 410 Appears. In the Illustrated Embodiment, the User May Choose One of Eighteen Question Types, Including the Following:

Formatted Questions

"Text", which allows the builder to create question(s) with a large, free-text area for the user to add a narrative response.

"Many Text Answers", which allows the builder to create question(s) with multiple, large, free-text area for the user to add narrative responses.

"One Selection", which allows the builder to create question(s) in response to which the custodian may choose only one selection (e.g., a radio button).

"Many Answers", which allows the builder to create question(s) in response to which the custodian may choose one or multiple selections (e.g., checkboxes)

"Yes/No/Explain", which allows the builder to create question(s) that require either a "yes" or a "no" response, and a text box in which the custodian must provide an explanation for the selected response.

"Yes/No", which allows the builder to create question(s) that require either a "yes" or a "no" response, and no other information is required.

"Date", which allows the builder to create question(s) that require a date entry as a response. A calendar may be provided for uniformity in date selection.

"Multi-type Field", which allows the builder to create question(s) that may require different types of answers (e.g., "Yes/No", "Text", "Many Answers", etc.)

Custodian Information Questions

"Corporation Entities", which allows the builder to create question(s) that capture information pertaining to the custodian's relationship with an entity.

"Positions Held", which allows the builder to create question(s) that capture information pertaining to a custodian's position held within an entity and the dates the custodian held that position.

"Country of Citizenship", which allows the builder to create question(s) that capture information pertaining to the custodian's country of citizenship and the dates associated with that citizenship.

"Predecessor or Successor", which allows the builder to create question(s) that capture information pertaining to a custodian's predecessor or successor in a position, including the predecessor's or successor's name and the position title.

"Assistant or Colleague", which allows the builder to create question(s) that capture information pertaining to a custodian's assistant or colleague in a position, including the assistant's or colleague's name and the position title.

Data Source Questions

"Computer", which allows the builder to create question(s) that capture information pertaining to a computer, which may include the device name, device type, relevant content on device, and content location.

"Mobile Device", which allows the builder to create question(s) that capture information pertaining to a mobile device, which may include mobile device type and serial number.

"Network Share", which allows the builder to create question(s) that capture information pertaining to a network share, which may include network share type and path.

"Removable Media", which allows the builder to create question(s) that capture information pertaining to a removable media.

"Email Archive", which allows the builder to create question(s) that capture information pertaining to the email systems used, which may include archived email systems and local email systems.

"Proprietary Applications", which allows the builder to create question(s) that capture information pertaining to proprietary applications utilized within an organization, which may include application type and purpose.

"Hard Drive", which allows the builder to create question(s) that capture information pertaining to hard drive information.

"Paper", which allows the builder to create question(s) that capture information pertaining to a paper document information.

It will be understood that these are illustrative question types only, and that more or fewer question types, or different question types than illustrated in FIG. 13B, may be presented to the builder. According to one embodiment of the present invention, the survey builder screen 400 may be fully customizable and may use conditional logic on any/all questions to perform actions based on how questions are answered.

Figure 13C:
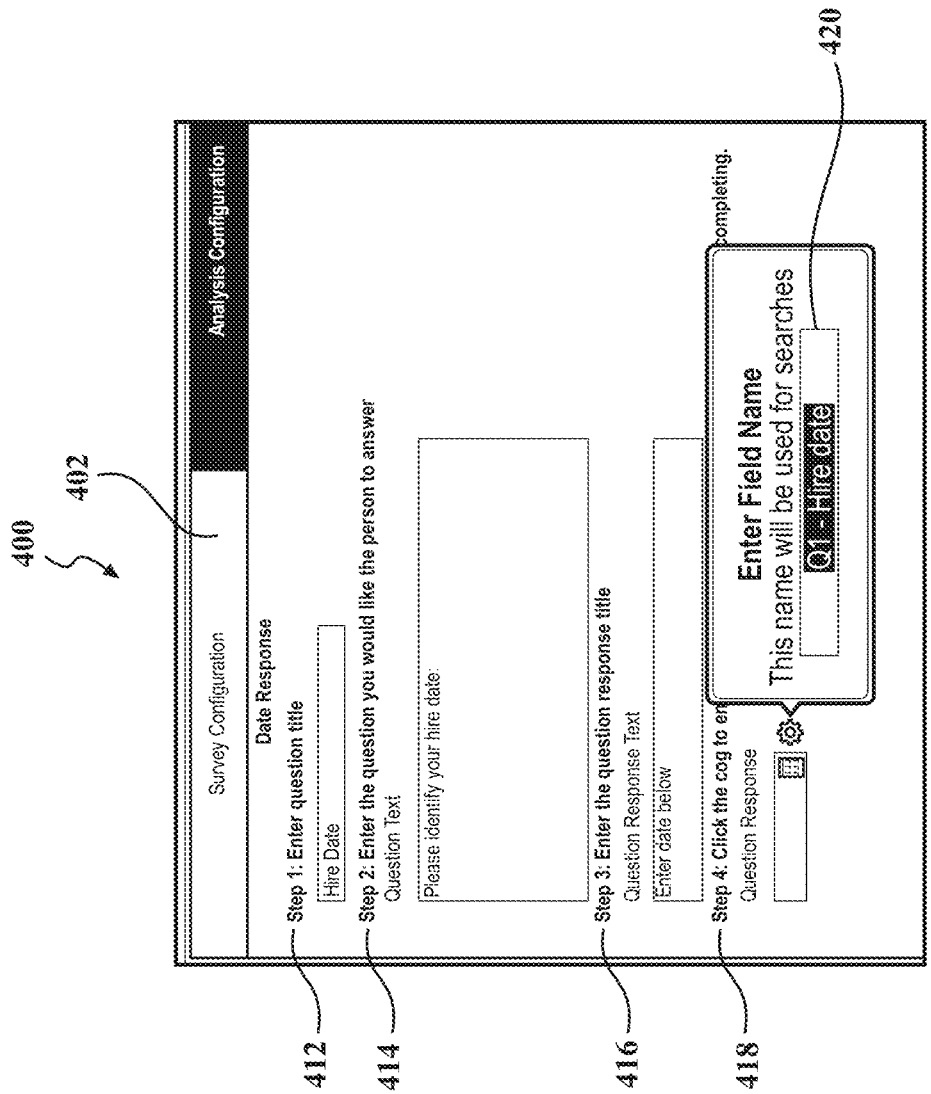

Referring now to FIG. 13C, an exemplary survey configuration screen 402 is shown illustrating a "Date" question type configuration. At a first step 412, the builder is prompted to enter a question title. At a second step 414, the builder is prompted to enter question text for the question. At a third step 416, the builder is prompted to enter response field(s), which may be entered as free-form text, chosen from a drop-down menu or similar, or a combination of both. In one embodiment, response field(s) may be imported directly from an outside legal hold platform. At a fourth step 418, the builder is prompted to enter a field name 420, which is the name of the internal database field that captures the response by the custodian. The field name 420 may later be used for ad-hoc searching of the field.

Referring again to FIG. 13A, the survey configuration screen 400 may further include question configuration settings 422, including a change question number button 424, to allow the user to re-order question numbering, a delete question button 426, to allow the user to delete an existing question, and a change question type button 428, to allow the user to change the type of question. In addition, depending on the selected response field(s), the survey configuration screen 400 may further include question option settings 430. These options 430 may allow the user to edit response choices and how they appear to the survey-taker (e.g., the order of responses in a drop-down menu, etc.).

Figure 13D:
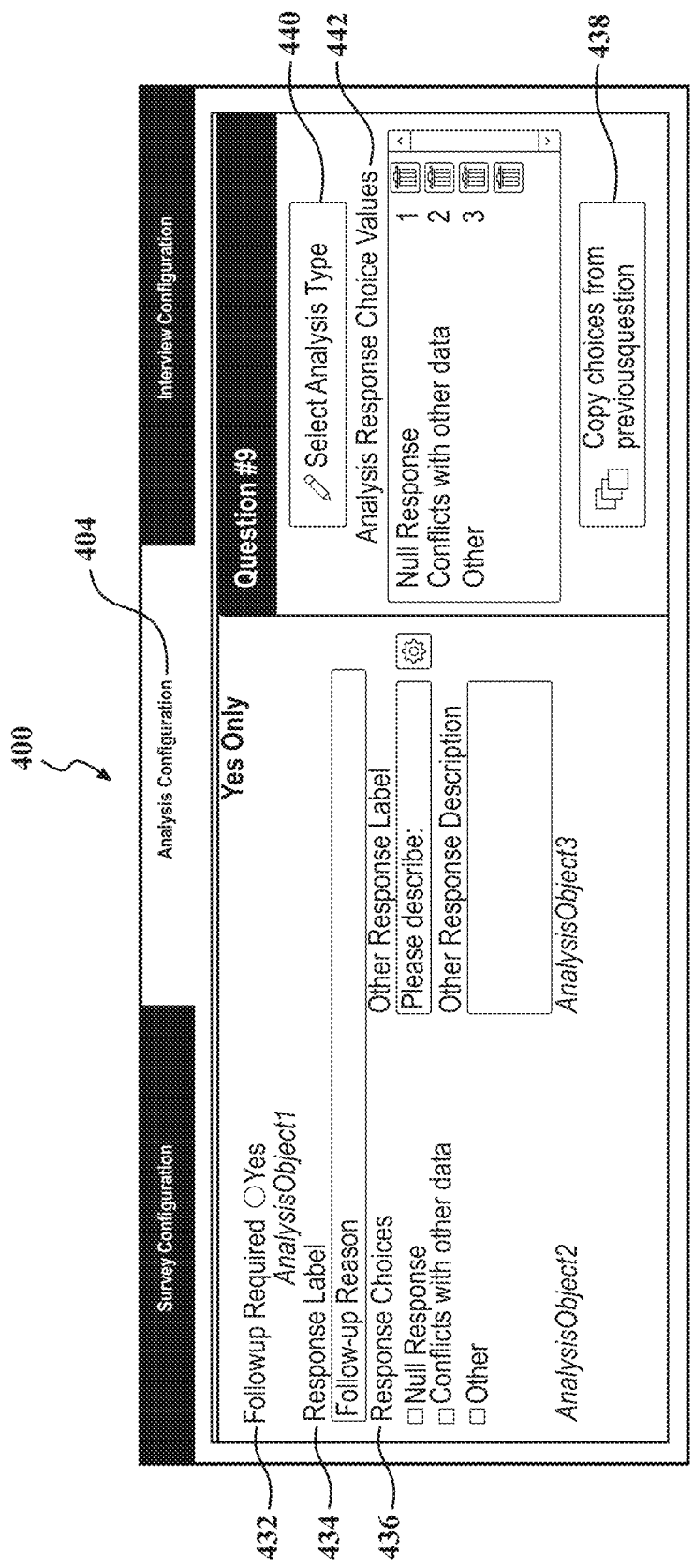

Referring now to FIG. 13D, an exemplary analysis configuration screen 404 is shown. The analysis configuration screen 404 may be used when a question requires additional information or follow-up based on a response. For instance, the builder may be prompted to select whether a question requires any follow-up using button 432. If follow-up is required, the builder may be prompted to enter a response label in response label field 434, and provide response choices that will trigger the follow-up. In some circumstances, a builder may be able to enter a free-form text description of the response requiring a follow-up in a text field. These choices may be configurable by editing the analysis response choice values 436. The user may copy response choices from a previous question using button 438, if a previous question with choices exists. Additionally, the analysis configuration screen 404 may include a select analysis type button 440, to allow the user to change the type of analysis being built. Analysis response choice values 442 may allow the builder to set a value associated with each possible response.

Figure 13E:
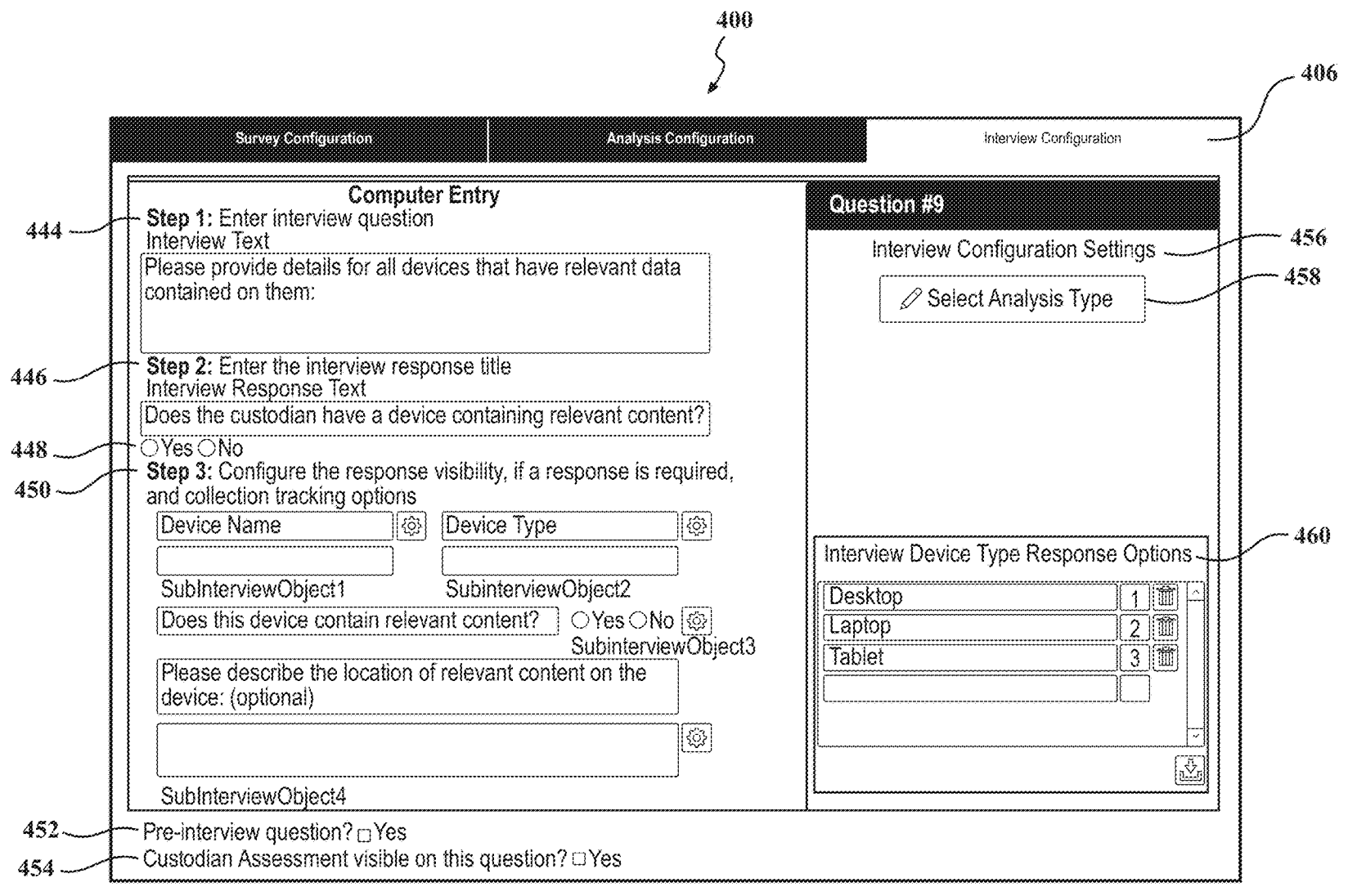

Referring now to FIG. 13E, an exemplary interview configuration screen 406 is shown. At a first step 444, the builder is prompted to enter question text for the question. At a second step 446, the builder is prompted to enter a response title for the question, which may also include a response field 448. At a third step 450, the builder is prompted to enter response configuration and collection tracking options, which may be entered as free-form text, chosen from a drop-down menu or similar, or a combination of both. The interview configuration screen 406 may further include additional screening options, such as, for example, an option 452 to select that the question is a pre-interview question and an option 454 that the custodian assessment is visible on the question.

The interview configuration screen 406 may further include interview configuration settings 456, including a select interview type button 458, to allow the builder to change the type of interview being built. In addition, depending on the selected response field(s), the interview configuration screen 406 may further include interview response option settings 460. These options may allow the user to edit response choices and how they appear to the interviewer (e.g., the order of responses in a drop-down menu, etc.).

Figure 14:
FIG. 14 is an exemplary screenshot of an interviewer screen according to one embodiment of the present invention.

Referring now to FIG. 14, an exemplary screenshot of an interviewer screen according to one embodiment of the present invention is shown. This screen shows the survey(s) as presented to the interviewer (rather than the builder) so that the interviewer can complete the survey as he/she interviews the subject custodian. In cases where an interviewer is not utilized, a custodian may instead be presented with this screen directly so that the custodian can complete the survey.

An exemplary interviewer question screen 462 is shown. On the interviewer question screen 462, side bar 464 allows the interviewer to easily navigate through interview questions. The interviewer question screen 462 further includes a survey response section 466 that includes the selected survey question and the response(s) provided by the interviewee.

The interviewer question screen 462 further includes a response analysis section 468 that indicates whether the selected question/response(s) require follow-up, and if so, what additional follow-up questions or information are required to be gathered by the interviewer. The interviewer question screen 462 further includes a survey interview section 470 that includes questions for the interviewer to ask the interviewee and response fields 472 to indicate the responses provided by the interviewee. In some embodiments, an interview may be suspended and restarted at a later time. Although responses are recorded automatically while the interview is in progress, in one embodiment, a record of the interview is only created for the custodian when an interview is marked as completed. In some instances, a response to an interview question may trigger identification of additional custodians that require being placed under hold and/or creation of a data source record.

The processes outlined above have several advantages. First, the interviewer is able to conduct pre-interview analysis regarding which questions may require follow-up. Second, the interview process is standardized across all interviewers such that information is solicited and gathered consistently from all custodians.

Data Source Module

The data source module 46 contains chain of custody information pertaining to each data source identified for each custodian. A thorough and comprehensive record regarding the tracking of all custodial and non-custodial data sources from preservation through disposition is managed through the data source module 46. Identification of relevant data sources through the interview process creates corresponding records in the data source module 46. Additionally, data source records can be imported and added individually, as needed. Commencement of data source collection is also tied to decisioning and approval in the proportional discovery assessment module 48.

Figure 15A:
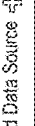
Figure 15C:
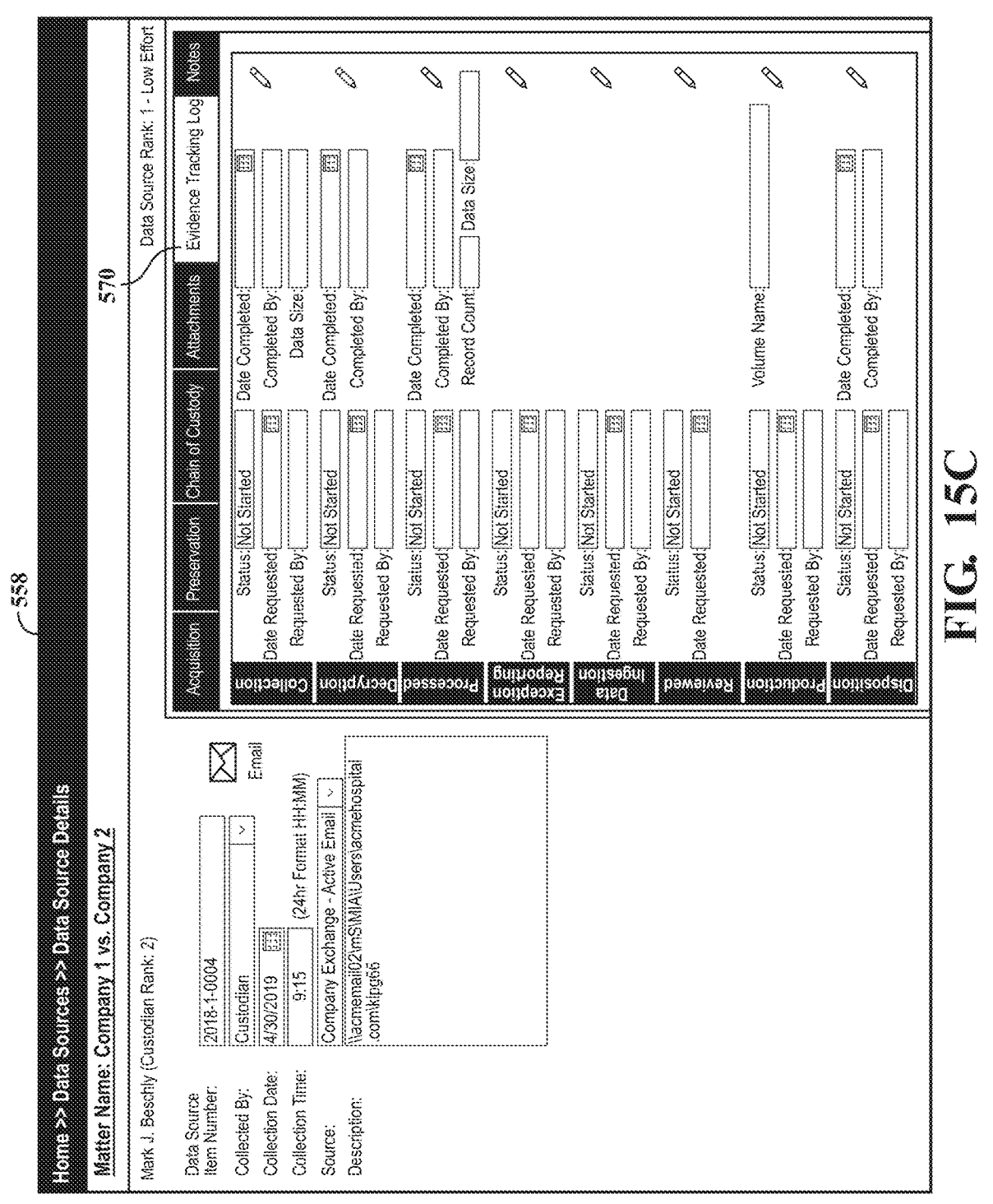

Referring now to FIGS. 15A-15C, exemplary screenshots of data source screens according to one embodiment of the present invention are shown.

Referring now to FIG. 15A, an exemplary screenshot of a data source list screen is shown. A data source list screen 550 includes data source list 552, which is a list of all available data sources for a matter, and an "Add Data Source" button 554, which allows an administrator to add an additional data source to the data source list 552. The data source list 552 may list pertinent at-a-glance information about the data source, including, for example, type of data source, associated custodian(s), and status information. The data source list screen 550 may include a search function 556 that allows a user to search and/or sort the data source list 552.

Each entry on data source list 552 may include a link to a full data source record of information about the data source, tracking the acquisition, preservation, and chain of custody process. Referring now to FIG. 15B, an exemplary screenshot of a data source record screen 558 is shown. The data source record screen 558 may list basic data source information 560, including, for example, an item number, a name of the collector, a collection date, a collection time, a source, and a description. The data source record screen 558 may further include various tabs for tracking the data source, including an acquisition tab 562, a preservation tab 564, a chain of custody tab 566, an attachments tab 568, an evidence tracking log tab 570, and a notes tab 572. The acquisition tab 562 identifies when data sources were acquired and by whom, as well as a destination to which the data source has been sent. The preservation tab 564 verifies whether the data source was preserved. The chain of custody tab 566 tracks possession and movement of the data source once collected. The attachments tab 568 identifies attachments (e.g., copies of devices and physical media) associated with the data source. The notes tab 572 allows for contextual information to be added to the data source record. In addition, the data source record screen 558 may include a data source rank 574, which may be assigned when a data source is added to the system, and may be based on the evidence burden values configured in the matter administration module 36.

Referring now to FIG. 15C, an exemplary evidence tracking log tab 570 is shown. The evidence tracking log tab 570 tracks the movements of the data source and the information contained on the source from preservation through disposition of the matter. For instance, the evidence tracking log tab 570 may include information about the progress, dates, and responsible parties for each data source, which may include the following workflow: collection, decryption, processed, exception reporting, data ingestion, reviewed, production, and disposition. It is contemplated that fewer, more, or different workflow stages may be included in the evidence tracking log tab 570.

Proportional Discovery Assessment Module

The proportional discovery assessment module 48 holds the central workflow for the examination of custodians and data sources for collection. An attorney will use the data points, along with the custodian relevancy and data source burden/effort scores to create scenarios to negotiate a discovery strategy that is proportional to the merits of the case. The output of the custodian evaluation module 42 is a proportional score for each custodian and each data source. The score is the basis for a custodian's movement within the proportional discovery assessment module 48 and affords the user the ability to make judgements relative to the value of certain custodians and the burden and effort of collecting associated data sources. Using this information, the user may be better equipped to conduct defensible cost-sharing or cost-shifting negotiations with opposing counsel relative to the costs and effort for collection, processing, review and production. Logical rules are embedded that allow or prohibit data sources from advancing within the workflow. The four stages of the proportional discovery assessment module 48 workflow include: (1) Custodian Status; (2) Data Source Status; (3) Scenario Builder; and (4) Approved List.

Figure 16:
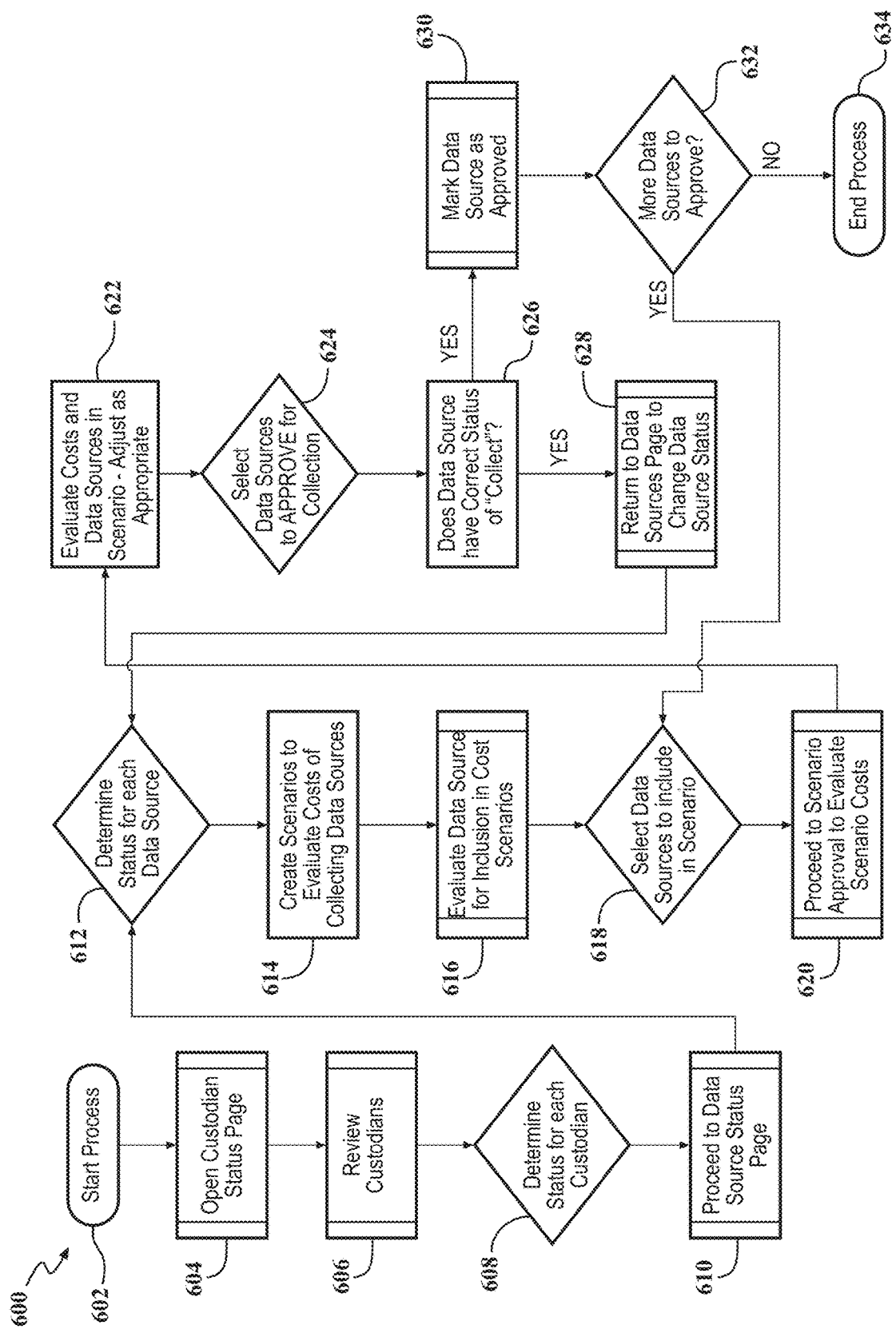
FIG. 16 is a flow diagram illustrating a proportional discovery assessment method according to one embodiment of the present invention.

Referring now to FIG. 16, a flow diagram illustrating a proportional discovery assessment method 600 is shown. At a first step 602, a proportional discovery assessment method is started. At a second step 604, a custodian status page is opened. At a third step 606, custodians are reviewed. At a third step 608, a status for each custodian is determined.

At a fourth step 610, a data source status page is opened. At a fifth step 612, a status for each data source is determined. At a sixth step 614, scenarios are created (and may also be named by the user) to evaluate costs of collecting data sources. At a seventh step 616, data sources are evaluated for inclusion in the scenarios. At an eighth step 618, data sources are selected for inclusion in the scenarios. Alternatively, the user may select from a list of existing scenarios, and may add or delete data sources from the existing scenarios.

At a ninth step 620, a scenario approval page is opened. At a tenth step 622, the costs and data sources included in a selected scenario are evaluated and adjusted as needed. At an eleventh step 624, one or more data sources is selected for approval for collection. At a twelfth step 626, the selected data source is reviewed to ensure that it is correctly marked for collection. If it is not, at step 628, the user returns to step 612 to change the status of the data source. If it is correctly marked, then at step 630, the data source is marked as approved. If another data source needs to be approved, the method is repeated from step 618. When all data sources have been approved, the method concludes at step 634.

Referring now to FIGS. 17A-17G, exemplary screenshots of proportional discovery assessment module screen 650 according to one embodiment of the present invention are shown. The proportional discovery assessment module screen 650 includes a dashboard tab 652, a custodian status tab 654, a data source status page 656, a scenario approval tab 658, and an approved list tab 660.

Referring now to FIG. 17A, an exemplary custodian status tab 654 is shown. The custodian status tab 654 may include a custodian status 662, where the user may assign a status to the custodian. The user may choose from rule-based values to determine the ongoing status of each individual custodian, which may include, for instance, "active", "inactive", or "to be reviewed". Each of the values in the list can be searched and sorted using search field 664 to assist the user in making decisions as to the custodian status.

Referring now to FIG. 17B, an exemplary data source status tab 656 is shown. The data source status tab 656 may include a data source status 658, from which the user may choose from rule-based values to determine the ongoing status of each individual data source. Options may include "collect", "cost share", "cost shift", "inactive", "negotiate", "preserve in place", "sample", etc. Each of the values in the list can be searched and sorted using search field 660 to assist the user in making decisions as to the data source status. The data source status tab 656 may further include a data source assignment 662, from which the user may select individual data sources to add to a designated cost negotiation scenario.

Figure 17D:
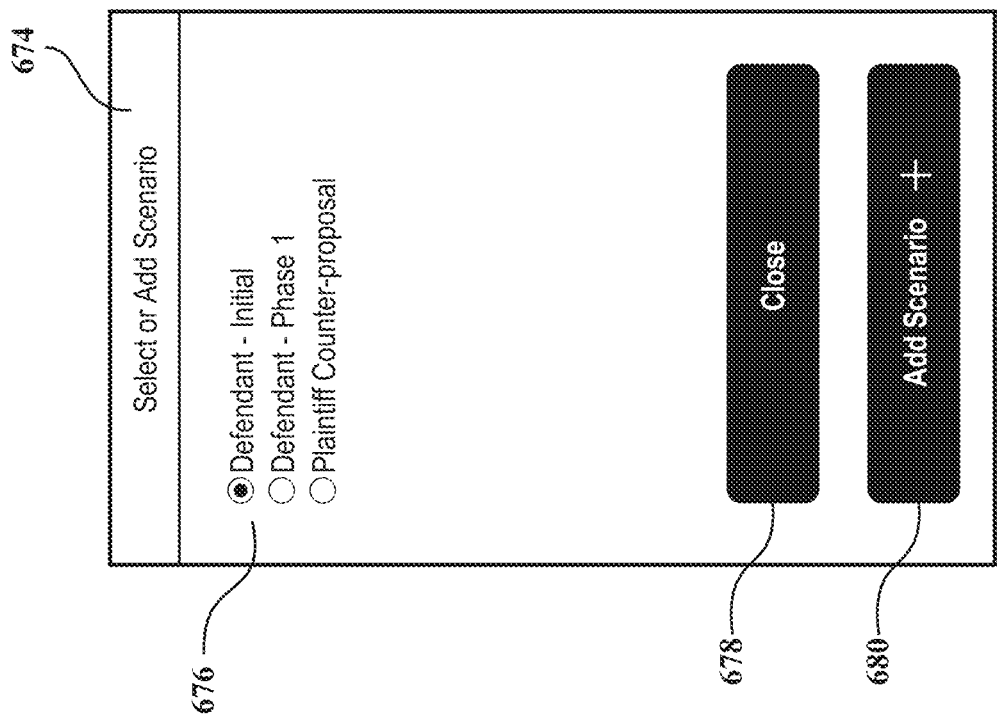
Figure 17C:
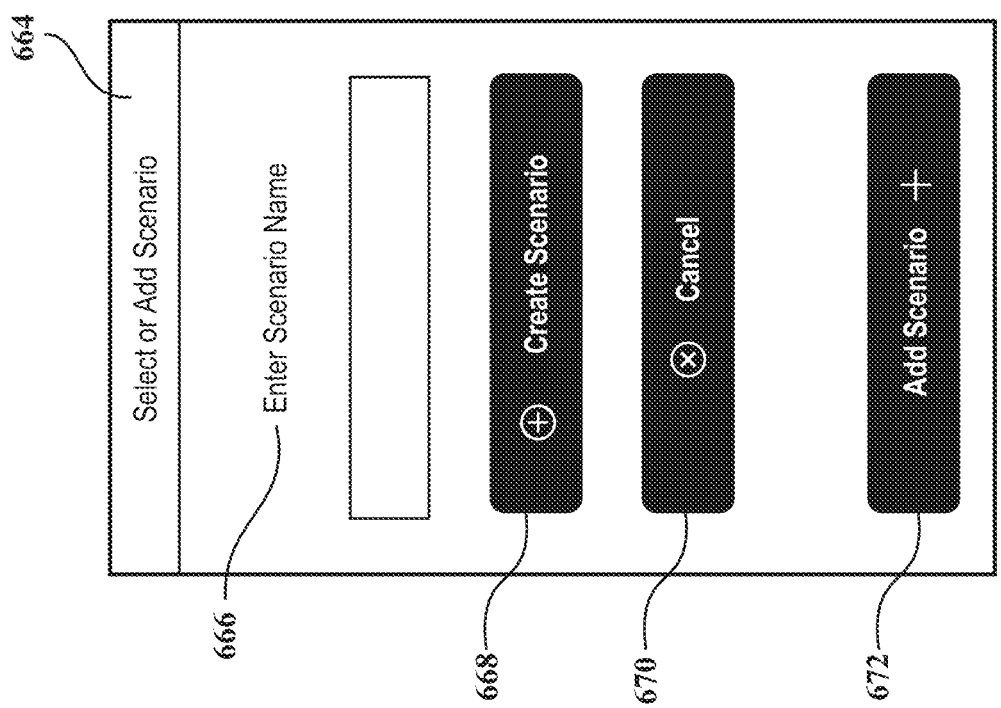

Referring now to FIG. 17C, an exemplary new scenario tab 664 is shown. A user may create a scenario name 666, then select from "Create Scenario" button 668 to configure the scenario or cancel the operation using "Cancel" button 670. An additional scenario may be added using "Add Scenario" button 672.

Referring now to FIG. 17D, an exemplary existing scenario tab 674 is shown. A user may select from a list of existing scenarios 676, or cancel the operation using "Close" button 678. An additional scenario may be added using "Add Scenario" button 680.

Figure 17E:
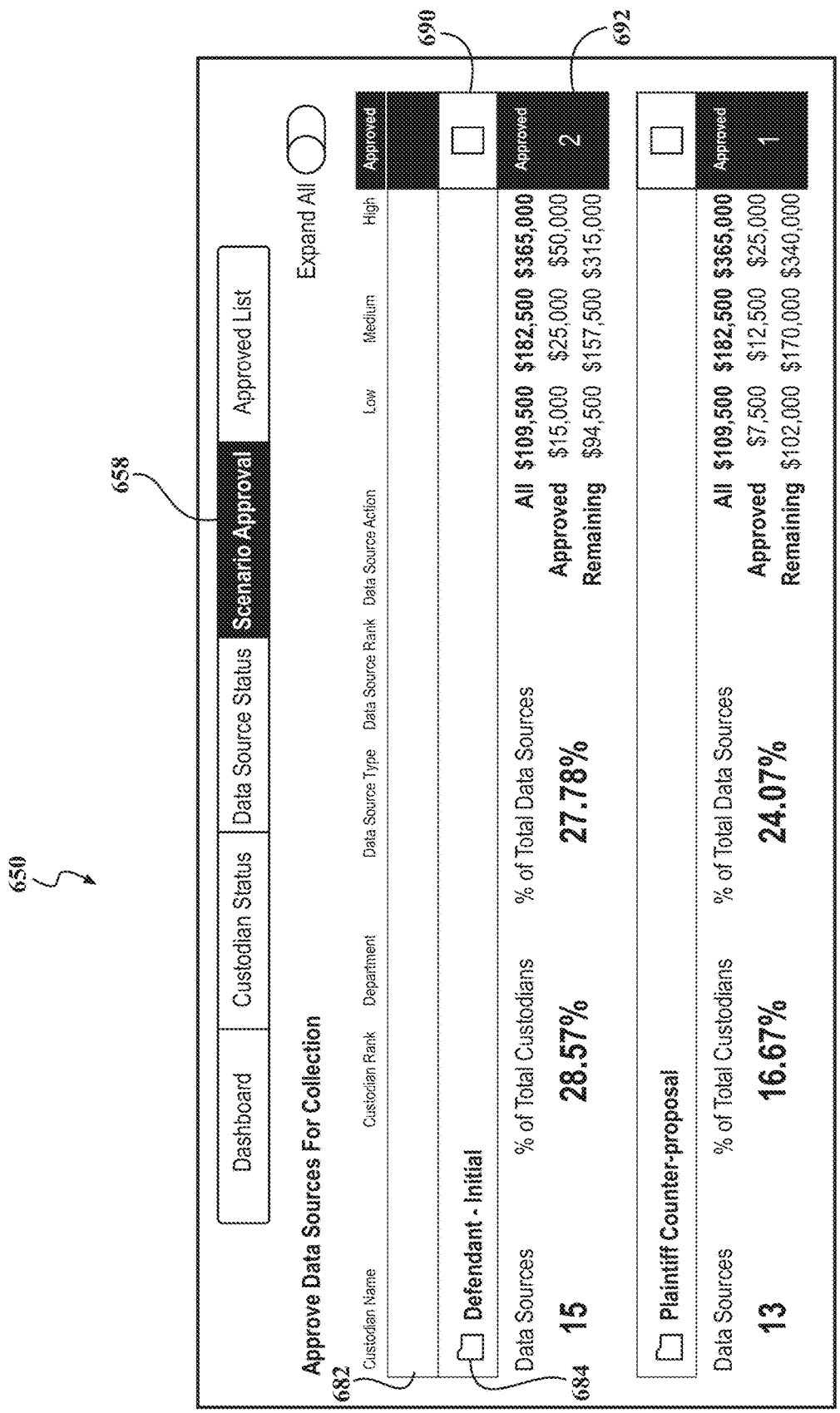

Referring now to FIG. 17E, an exemplary scenario approval tab 658 is shown. The scenario approval tab 658 includes a scenario summary 682, which may include summary information relative to the number of custodians designated to the scenario, the number of data sources, and the estimated costs to collect those data sources. The scenario summary 682 may include an icon 684 next to a party name.

Referring now to FIG. 17F, an exemplary scenario details screen 686 is shown. When the icon 684 is selected, it expands into scenario details screen 686, from which a user may obtain detailed information relative to the individual data sources assigned to a scenario. The scenario details screen 686 may also indicate data source approval checkboxes 688. Using data source approval checkboxes 688, a user may approve individual data sources for collection. Once a data source is approved for collection, the data source module 46 is updated with the approval status.

Referring again to FIG. 17E, the scenario approval tab 658 may further include scenario approval checkboxes 690. When a user approves a scenario by checking scenario approval checkbox 690, total approved scenario count 692 is updated to reflect the total number of approved scenarios for the selected party.

Referring now to FIG. 17G, an exemplary approved list tab 660 is shown. From the approved list tab 660, the user may review all data sources that have been approved for collection. The approved data sources may be searchable using search bar 694. Additionally, the approved list tab 660 may include a toggle 696 to provide the option to sort the approved data sources by scenario.

Referring back to FIG. 4A, the evidence burden and cost ranking button 108 allows a user to access an evidence ranking screen 720. Referring now to FIG. 18, an exemplary evidence ranking screen 720 is shown. The evidence ranking screen 720 allows a user to assign values for ranking evidence based on cost and burden of collection factors using pre-defined logic, which can be configured within a matter. Moreover, different classifications may be defined based on criteria specific to the custodian, including, for example, location, citizenship, privacy and consent requirements, and/or other criteria. The evidence ranking screen 720 allows a user to create data source records and enter collection difficulty values for each source type and location.

The evidence ranking screen 720 may allow a user to create a new data source location area using button 722 or access existing data source location areas 724, 726. The data source location areas 724, 726 may be used to develop collection cost groups. A user may identify multiple groups and assign level of effort scores and costs based on a particular location. For instance, it may be less burdensome to collect evidence at a domestic location than a foreign location. Thus, a domestic location may be assigned a lower effort and/or lower cost score than a foreign location. The evidence ranking screen 720 may display collection difficulty rank definitions 728. The user may assign collection difficulty values 730 to different types of data sources (e.g., computer, email, mobile device, removable media, network share, hard drive, paper document, etc.) for each data source location areas 724, 726, which may help determine level of effort score and costs, so each device type may have different scoring and costs associated with it. Corresponding collection cost estimates 732 are calculated based on the assigned collection difficulty values 730, and may include ranges, such as low, medium, and high cost estimate values, as shown in the illustrated embodiment.

Figure 19:
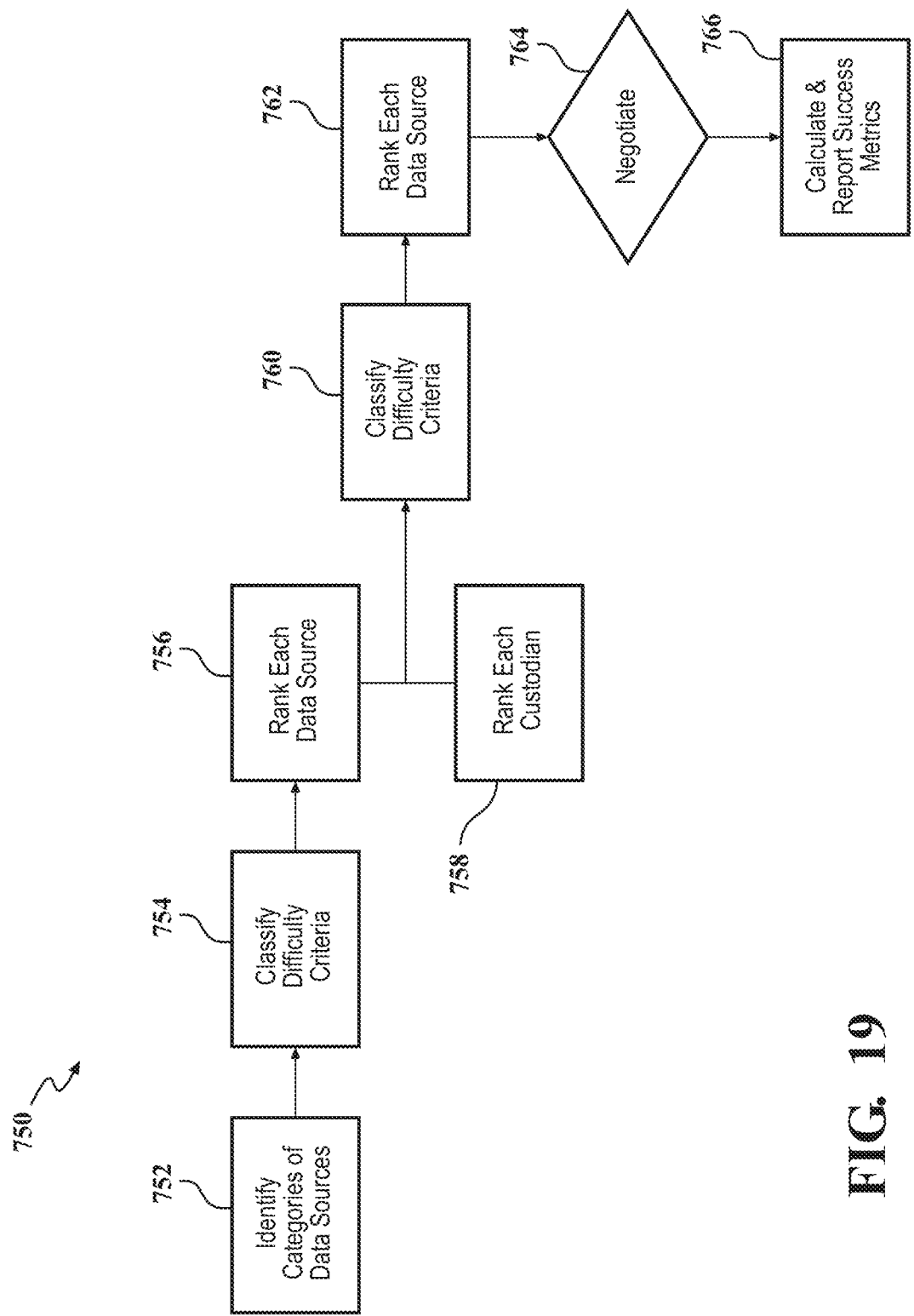
FIG. 19 is a flow diagram illustrating a data source ranking method using the proportional discovery assessment system of FIG. 1 according to one embodiment of the present invention.

Referring now to FIG. 19, a flow diagram illustrating a data source ranking method using the proportional discovery assessment system of FIG. 1 is shown. The second method 750 may be used for identifying, categorizing, and calculating costs and burdens associated with different data sources. At step 752, categories of data sources are identified. At step 754, criteria are established for classifying the difficulty of a particular data source.

At step 756, each data source is ranked based on the difficulty criteria established in step 754. By way of example and not limitation, a scale from 0-4 may be used to rank data sources, where a score of "1" indicates that the data source is easy to collect and a score of "4" indicates that the data source is burdensome to collect. A score of "0" may be assigned when, for example, an identified data source does not maintain relevant content. This may be established through an interview, and a user (e.g., an attorney) may assign a "Do Not Collect/Preserve" decision to the data source. A score of "1" may indicate that the data source is easy to collect and may be assigned when, for example, the data source is controlled by a corporate information technology department, remote collection of data is possible, en masse collection is possible (e.g., multiple data sets or source; no targeted collection required), there is a low risk of data loss (e.g., default setting is retention), and/or there is an ability to preserve the data in place, there is a low preservation and/or collection cost, and there is duplicative content. A score of "2" may indicate that the data source is somewhat easy to collect and may be assigned when, for example, the data source is controlled by a corporate information technology department, remote collection of data is possible, individual/targeted collection is required, there are increased logistics involved in collection (e.g., some remote capabilities, but not all), and/or there is a medium preservation and/or collection cost. A score of "3" may indicate that the data source is somewhat difficult to collect and may be assigned when, for example, the data source is not controlled by a corporate information technology department but rather in the control of a third party or other custodian), an additional information technology resource is required to collect the data from the data source, or third party collection expertise is required to collect the data from the data source, there is a high risk of data loss, there is a medium preservation or collection cost, and the content is unique and disparate rather than duplicative. A score of "4" may indicate that the data source is difficult to collect and may be assigned when, for example, the data source is not controlled by a corporate information technology department but rather in the control of a third party or other custodian), an additional information technology resource is required to collect the data from the data source, the data is not reasonable accessible, the data cannot be collected remotely, or third party collection expertise is required to collect the data from the data source, the data is stored on a legacy or proprietary system, there is a high preservation or collection cost (e.g., new hardware, expertise, or software is required), and the content is unique and disparate rather than duplicative.

Although the illustrated embodiment uses a scale from 0-4 to rank data sources, it will be understood that any suitable ranking system may be used to identify and categorize data sources, which may or may not use a numerical ranking.

Figure 20:
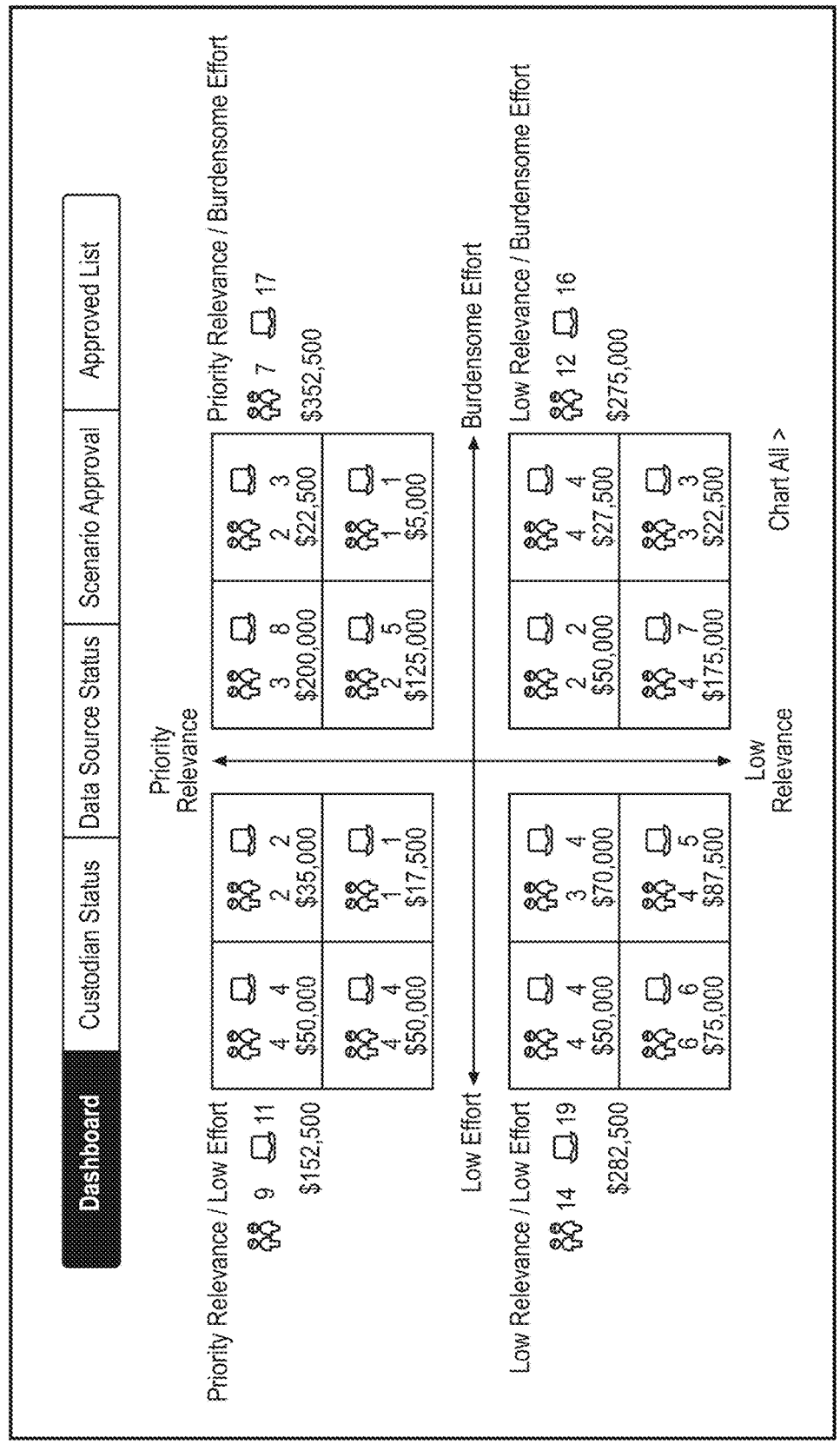
FIG. 20 is an exemplary graph illustrating the plotting of data source rankings and custodian rankings according to one embodiment of the present invention.

At step 758, each custodian is ranked, such as according to the first method of FIG. 3. At step 760, the data source rankings and custodian rankings are plotted. An exemplary graph illustrating the plotting of data source rankings and custodian rankings is shown in FIG. 20.

Referring again to FIG. 19, at step 762, the burden and effort of collecting each data source is quantified. At step 764, parties may negotiate about what types of data sources will be used for collection and/or preservation of data based on the plotted data and what steps will be taken to disclose, preserve, and/or collect data from those data sources. Based on the plotted data (see FIG. 20), a data source may be categorized as, for example, "High Priority/Easy" such that the data from the data source will be both preserved and collected; "Low Priority/Easy" such that the data will be preserved in place but not collected; "Low Priority/Difficult" such that the data will be disclosed but not preserved; or "High Priority/Difficult" such that the data will be disclosed, but preservation/collection will likely be subject to negotiation. At step 766, cost estimates are calculated based on the determinations made at step 764, and costs as well as success metrics are reported to the user.

Figure 21:
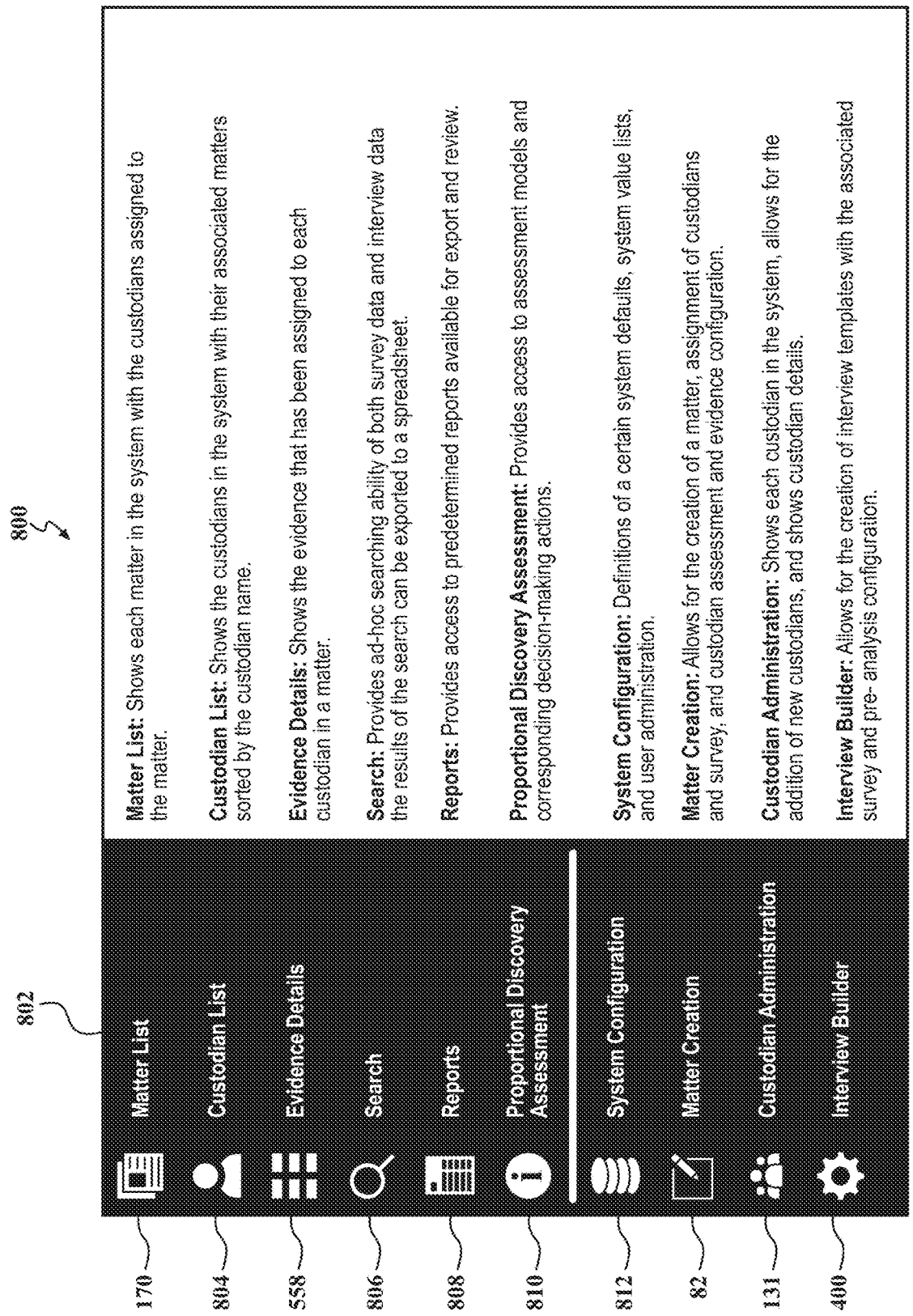
FIG. 21 is an exemplary screenshot of a main menu according to one embodiment of the present invention.

Referring now to FIG. 21, an exemplary screenshot of a main menu according to one embodiment of the present invention is illustrated. A main menu screen 800 includes a menu 802 that lists various options and functions selectable by the user. A matter list, such as matter table 170 of FIG. 5, may display each matter in the system. In some embodiments, the matter list may also list custodians assigned to each matter, sorted by matter name. A custodian list 804 may display the custodians in the system, as well as the matters associated therewith, sorted by custodian name (see FIG. 23). The matter list 170 and custodian list 804 provide a tracking workflow to identify the status of completing the legal hold and interview process, either within a matter or across matters, which allows for reusability of custodian information and data source collection history.

An evidence details screen 558 displays the evidence that has been assigned to each custodian in a matter (see FIGS. 15A-15C). A search function 806 allows the user to perform ad-hoc searching of survey data and interview data, the results of which may be exported to a spreadsheet. A report scheduling tool 808 provides access to predetermined reports available for export and review (see FIG. 25). A proportional discovery assessment tool 810 provides access to assessment models and corresponding decision-making actions (see FIG. 26).

The main menu screen 800 may further include links to configuration and administrative functions, including a system configuration screen 812, which allows configuration of system defaults, system value lists, and user administration; the matter creation screen 82 (see FIG. 4A), which allows for the creation of a matter, assignment of custodians and surveys, and custodian assessment and evidence configuration; a custodian administration screen 131 (see FIG. 4C), which displays each custodian in the system and details associated therewith, and allows for the addition of new custodians; and the interview/survey builder 400 (see FIGS. 13A-E), which allows for the creation of interview templates with the associated survey configuration options.

Figure 22A:
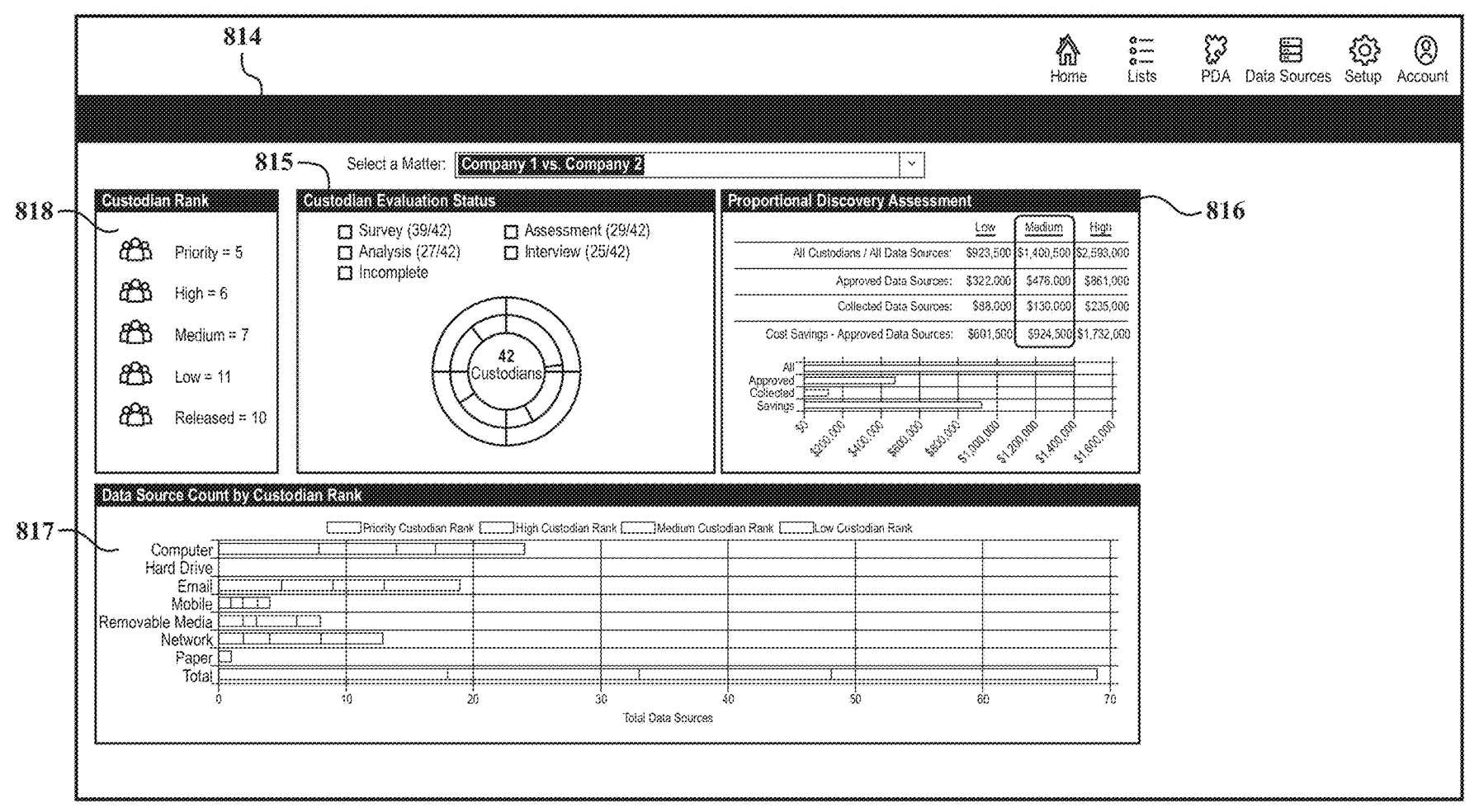

Referring now to FIG. 22A, an exemplary matter status dashboard screen according to one embodiment of the present invention is shown. The matter status dashboard screen 814 may include a custodian evaluation status dashboard 815, a proportional discovery assessment dashboard 816, a data source count by custodian rank dashboard 817, and a custodian rank dashboard 818. The custodian evaluation status dashboard 815 may include a variety of summarized survey, assessment, interview, and analysis information in text and/or graphical form, including, for example, survey and/or assessment status (e.g., completed versus not completed); analysis status (e.g., completed versus not completed versus not available); interview release/hold status (e.g., hold, released, not started); etc. This information may be represented for a single matter or across all matters for a single client. The custodian rank dashboard 818 may include a visual and/or textual representation of custodian relevancy rankings for all custodians for a matter or across all matters (e.g., the total number of custodians with priority, high, medium, low, and released rankings). The proportional discovery assessment dashboard 816 may include cost estimations calculated in real-time based upon decision logic. The proportional discovery assessment dashboard 816 may include a variety of summarized cost estimation information in text and/or graphical form, including, for example, projected costs for collection through production. As illustrated, projected cost estimate ranges—low, medium, high—are shown for all custodians/all data sources as well as approved and collected data sources. A projected cost savings (the difference between all custodians/all data sources and approved data sources) is also displayed. The data source count by custodian rank dashboard 817 may include a variety of information about the data sources and associated custodian rank information. It is contemplated that this dashboard information may be represented for a single matter or across all matters for a single client. It is further contemplated that more or less information, depending on the user's needs and/or preferences, may be included in the matter status dashboard screen 814.

Figure 22B:
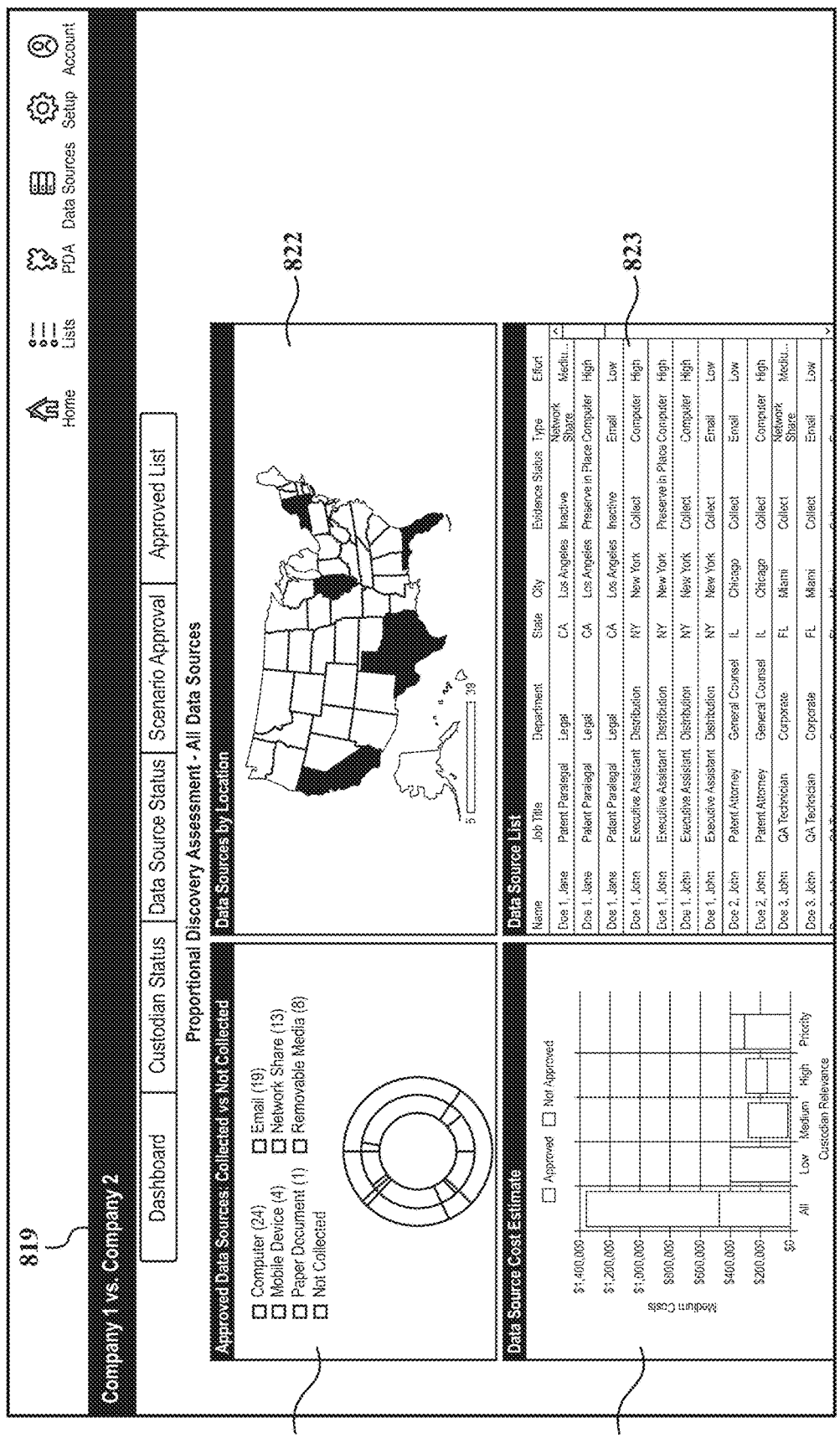
FIG. 22B is an exemplary data source dashboard screen according to one embodiment of the present invention.

Referring now to FIG. 22B, an exemplary data source dashboard screen according to one embodiment of the present invention is shown. The data source dashboard screen 819 may include a data source status dashboard 820, a data source cost estimate dashboard 821, a data sources location dashboard 822, and a data source list 823. Information about the status, location, cost, and details of each data source may be represented on data source dashboard screen 819 in text and/or graphical format. It is contemplated that this dashboard information may be represented for a single matter or across all matters for a single client. It is further contemplated that more or less information, depending on the user's needs and/or preferences, may be included in the matter status dashboard screen 814.

Referring now to FIG. 23, an exemplary custodian list according to one embodiment of the present invention is shown. The custodian list 804 may display each custodian in the system, along with the matter associated with each custodian, sorted by custodian name. Additional details and information may also be displayed or linked next to each custodian listed in the custodian list screen 804, including, for example: whether a hold was issued, whether a hold was accepted, survey status, assessment interview status, pre-interview analysis, interview status, collection items, a relevancy ranking, and a proportionality ranking.

Figure 24:
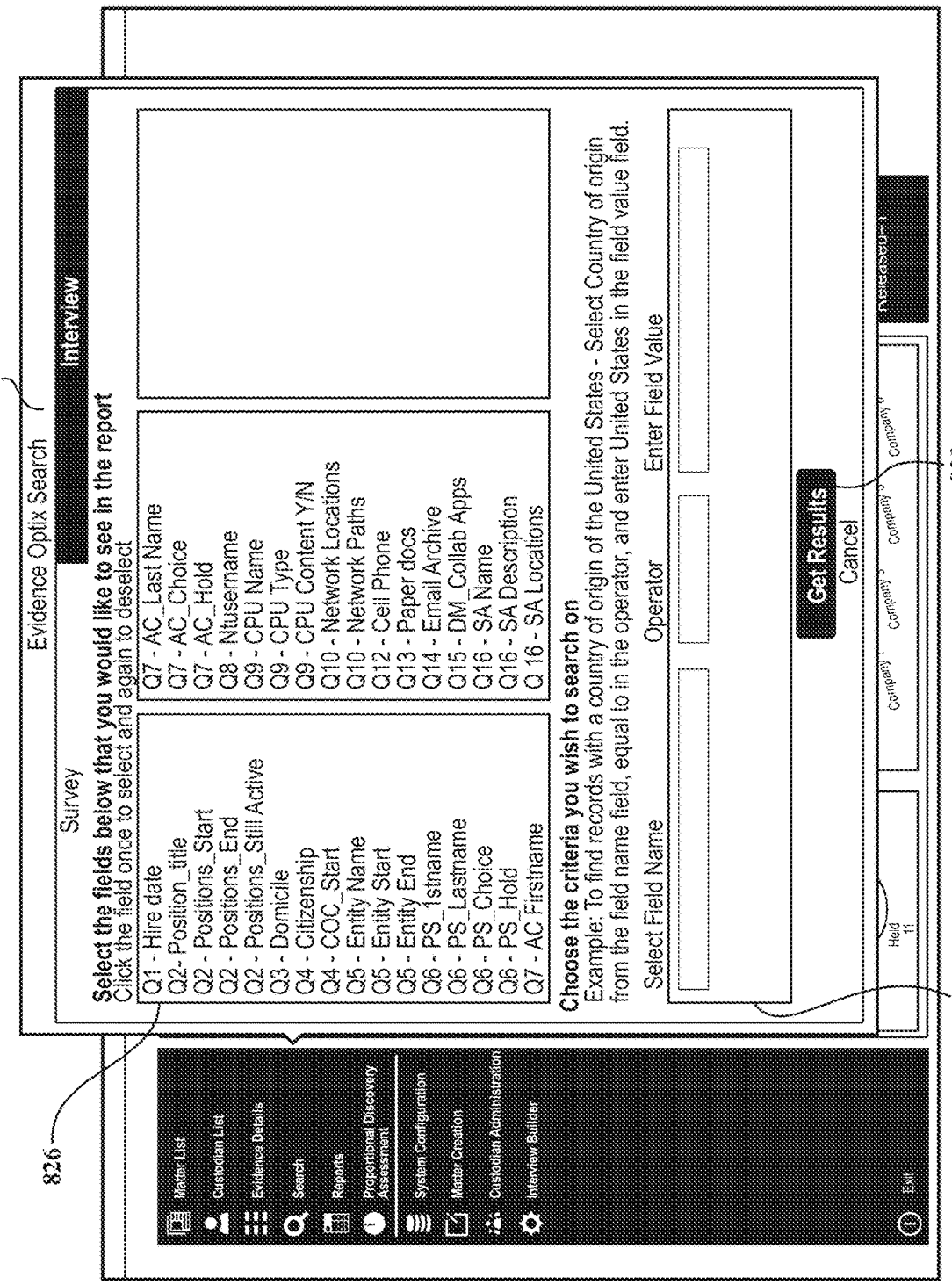
FIG. 24 is an exemplary screenshot of a search function according to one embodiment of the present invention.

Referring now to FIG. 24, an exemplary screenshot of a search function according to one embodiment of the present invention is shown. The search function screen 806 allows the user to perform ad-hoc searching of survey data and interview data, the results of which may be exported to a spreadsheet. A number of search fields 826 may be selected by a user to build a search query for either a search of survey data or a search of interview data. In FIG. 24, an exemplary search of survey data is illustrated, but it will be understood that a similar search screen is displayed to build a search of interview data. Once a field has been selected, a search table 828 is populated with the selected fields, and a user may enter an operator and a field value for each selected field. Multiple fields may be selected and defined to build a search query. The user may press the get results button 830 to perform the search.

Referring now to FIG. 25, an exemplary screenshot of a report scheduling tool according to one embodiment of the present invention is shown. The report scheduling tool 808 provides access to reports available for export and review, which may be automatically or manually generated. The report scheduling tool 808 may allow a user to schedule a report to be sent by email to a recipient once or at various intervals (e.g., daily, weekly, bi-weekly, monthly, etc.).

Figure 26:
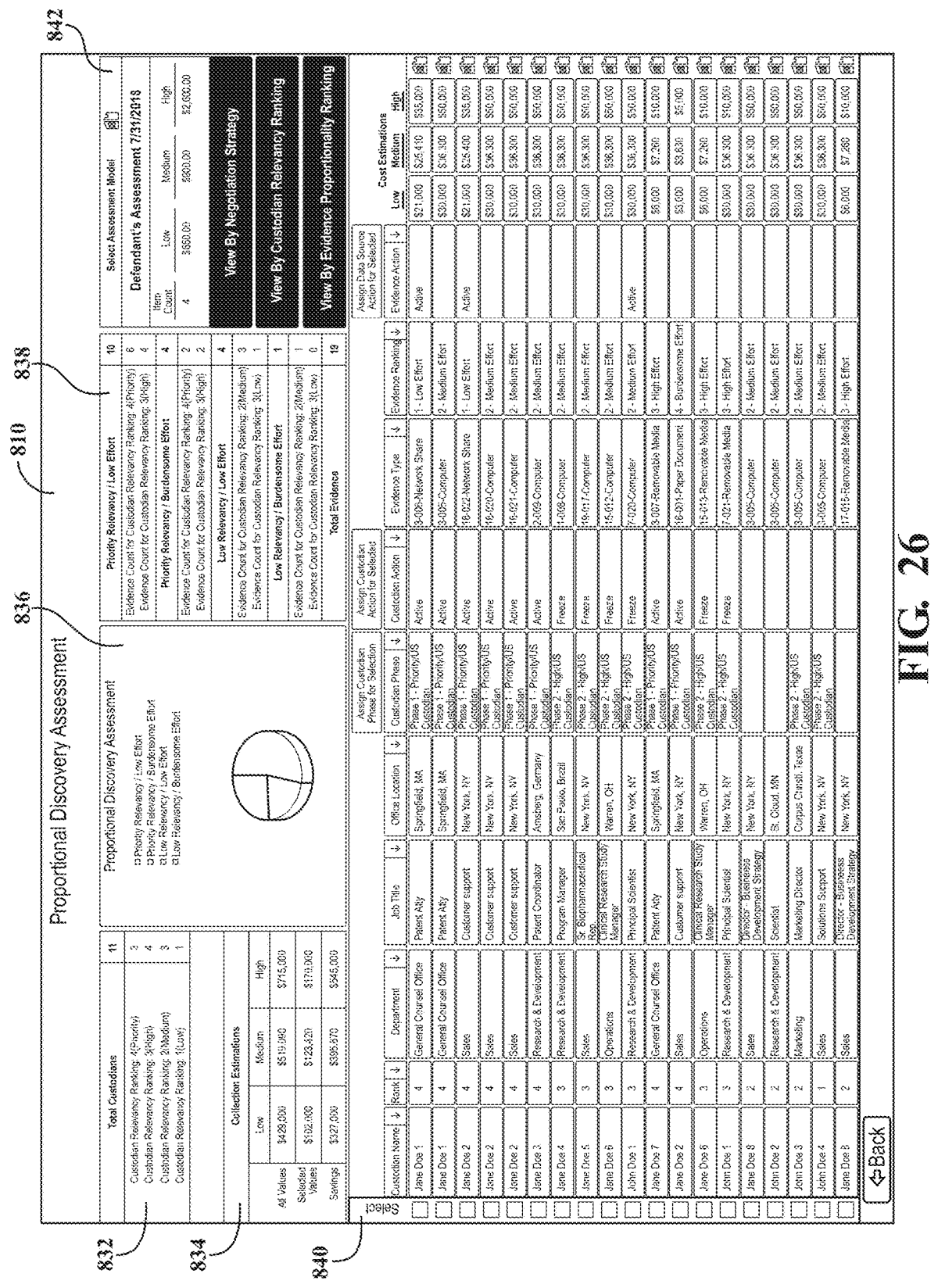

Referring now to FIG. 26, an exemplary screenshot of a proportional discovery assessment tool according to one embodiment of the present invention is shown. The proportional discovery assessment tool 810 provides access to assessment models and corresponding decision-making actions. Detailed information may be displayed by the proportional discovery assessment tool 810 and may be customizable to suit the user's needs. Such information may include, but is not limited to: custodian information 832, including total number of custodians and breakdown of custodian rankings; collection estimations information 834, including cost estimate ranges for all values, selected values, and savings; proportional discovery assessment data 836, including a visual and/or textual representation of categorization of custodian relevancy rankings versus evidence rankings; evidence information 838, including evidence assigned based on custodian relevancy/evidence rankings; and selectable and sortable custodian and evidence detailed information 840, including custodian name, relevancy ranking, department, job title, office location, custodian phase, custodian action, evidence type, evidence (burden and cost) ranking, evidence action, and cost estimations. Additionally, the proportional discovery assessment tool 810 may include an assessment model 842, which may be viewed by negotiation strategy, custodian relevancy ranking, or by evidence proportionality ranking. Once an agreement is reached by the parties, the final decisions can be approved through the proportional discovery assessment tool 810.

Illustrative Data Tables

Referring now to FIGS. 27A-27F, exemplary data tables illustrating storage of information collected and utilized by the proportional discovery assessment system of FIG. 1 according to one embodiment of the present invention are shown. This information may be stored in one or more databases, such as database 22 of FIG. 1.

Referring now to FIG. 27A, an exemplary matter data table illustrating storage of matter information utilized by the matter administration module 36 according to one embodiment of the present invention is shown. In the illustrated embodiment, data rows A-D are shown in two tables 900A and 900B, due to length; it will be understood that the lower table 900B is merely a continuation of the upper table 900A. The matter data table 900A-900B may include a plurality of data columns. A timestamp created column 901 may store the date and time data associated with creation of the matter record. A timestamp modified column 902 may store the date and time data associated with the last time the matter record was modified by any user. A record ID column 903 may store a unique record identifier for the matter. A created username column 904 may store a username of the user who created the record. A modified username column 905 may store a username of the last user to modify the record. A case number column 906 may store a unique case number associated with the matter. A case number may have elements in common with other case numbers to categorize matters in a specific way; for instance, a case number may identify multiple matters as being associated with a single client, created in a single year, etc. A case description column 907 may store user-created details about the matter. A case name column 908 may store a user-created case name associated with the matter to easily identify the matter to other users and distinguish it from existing matters. A number active column 909 may store information about the number of cases active within each matter. An active case column 910 may store information about whether the case is currently active or inactive. A date added column 911 may store the date on which the matter was added to the system.

A plaintiff column 912 may store the name associated with the plaintiff (and/or the name of the plaintiff's attorney(s)) in the matter. A defendant column 913 may store the name associated with the defendant (and/or the name of the defendant's attorney(s)) in the matter. A total custodian column 914 may store the total number of custodians associated with the matter, which may be calculated from the custodian data table (see FIG. 27B). A matter details column 915 may store a user-created description of the matter. A custodian survey statistics column 916 may store a calculated percentage of the total number of custodians who have completed required survey(s). A custodian survey completion column 917 may store a calculated value for the number of custodians who have completed the survey. A custodian survey hold column 918 may hold a calculated value for the number of custodians assigned a "hold" status after survey completion. A custodian survey remaining column 919 may hold a calculated value for the number of custodians who have not yet completed the survey.

A first custodian survey analysis column 920 may hold a calculated value for the number of custodians who have completed a survey but the analysis of the survey responses is not yet available. A second custodian survey analysis column 921 may hold a calculated value for the number of custodians who have completed a survey but the analysis of the survey responses has not yet been completed. A third custodian survey analysis column 922 may hold a calculated value for the number of custodians who have completed a survey and the analysis of the survey responses is complete.

A custodian interview statistics column 923 may store a calculated percentage of the total number of custodians who have completed required interview. A custodian interview release column 924 may hold a calculated value for the number of custodians assigned a "release" status after the interview. A custodian interview hold column 925 may hold a calculated value for the number of custodians assigned a "hold" status after the interview. A custodian interview remaining column 926 may hold a calculated value for the number of custodians who have not yet completed the interview.

A custodian pre-interview release statistics column 927 may store a calculated value for the number of custodians assigned a "release" status after the pre-interview. A custodian pre-interview hold statistics column 928 may store a calculated value for the number of custodians assigned a "hold" status after the pre-interview.

It will be understood that there may be additional or fewer fields in this database, and that the fields may be shared and/or cross-referenced across other database(s) accessed and used by other module(s) of the system.

Referring now to FIG. 27B, an exemplary custodian data table illustrating storage of custodian information according to one embodiment of the present invention is shown. In the illustrated embodiment, data rows E-I are shown in three tables 930A-930C, due to length; it will be understood that the lower table 930C is a continuation of the middle table 930B, which is merely a continuation of the upper table 930A. The custodian data table 930A-930C may include a plurality of data columns.

A timestamp created column 931 may store the date and time data associated with creation of a new custodian. A timestamp modified column 932 may store the date and time data associated with the last time the custodian record was modified by any user. A serial number column 933 may store a unique serial number or identifier for the custodian. A created username column 934 may store a username of the user who created the record. A modified username column 935 may store a username of the last user to modify the record. A related case column 936 may store a matter ID of a related matter. A custodian number column 938 may store a unique custodian number associated with the custodian and the matter (e.g. a custodian may be assigned "6" when he is the sixth custodian added to a matter). A last name column 939 may store a last name associated with the custodian. A first name column 940 may store a first name associated with the custodian.

An evidence count column 941 may store the number of data sources for a matter. A number active column 942 may store a value indicative of whether a custodian is active or not. A company column 943 may store a name of a company with which the custodian is employed. A job title column 944 may store a job title of the custodian. Columns 945, 946, 947, 948, and 949 may store the business address (street, city, state, postal code, and country) of the custodian. A business phone column 950 may store a business telephone number of the custodian. A second business phone column 951 may store a second business telephone number of the custodian. A mobile phone column 952 may store a mobile telephone number of the custodian. An email address column 953 may store an email address of the custodian.

An office location column 954 may store an office location associated with the custodian. A department column 955 may store information about a department in which the custodian is employed. A constant value column 956 stores a constant value of "1" and may be used for relationship building. A survey count column 957 may store a number of surveys associated with a custodian. A completed survey count column 958 may store a number of surveys that have been completed. An incomplete survey count column 959 may store a number of surveys that have not been completed. An evidence collected count column 960 may store a number of data sources that have been collected. An evidence added count column 961 may store a number of data sources that have been added for a custodian but not necessarily collected. A survey analysis count column 962 may store a number of surveys for which analysis has been completed. A survey interview count column 963 may store a number of interviews associated with the custodian. A location group column 964 may store a location group associated with the custodian.

It will be understood that there may be additional or fewer fields in this database, and that the fields may be shared and/or cross-referenced across other database(s) accessed and used by other module(s) of the system.

Referring now to FIG. 27C, an exemplary custodian assessment data table illustrating storage of custodian assessment information used for configuring a custodian relevancy assessment builder according to one embodiment of the present invention is shown. In the illustrated embodiment, data rows J-M are shown in three tables 970A-970C, due to length; it will be understood that the lower table 970B is merely a continuation of the upper table 970A and that table 970C is merely a continuation of table 970B.

The custodian assessment data table 970A-970C may include a plurality of data columns. A record ID column 971 may store a unique record number or identifier for the assessment. A release analysis text column 972 may store a description of the assessment. A related survey ID column 973 may store an internal link to an associated survey. A proportionality type column 974 may store a selected scoring option. Rank columns 975, 976, 977, 978, 979, 980, 981, 982, and 983 may all store question scores.

A record ID column 984 may store a unique record number or identifier for the assessment. A related release analysis ID column 985 may store an internal ID associated with the assessment. A release analysis type column 986 may store a type of a question. A release analysis label column 987 may store text of a question. A release analysis question number column 988 may store a question number. A proportionality "yes value" column 989 may store a score associated with a "yes" response to a question. A proportionality "no value" column 990 may store a score associated with a "no" response to a question. A proportionality "yes value override" column 991 may store a master value override value. A proportionality "no value override" column 992 may store a master value override value. A release analysis "explain required" column 993 may store text associated with an explanation. A max release analysis score column 994 may store a custodian rank.

A timestamp created column 995 may store the date and time data associated with creation of a new custodian. A timestamp modified column 996 may store the date and time data associated with the last time the custodian record was modified by any user. A record ID column 997 may store a unique record number or identifier for the custodian. A created name column 998 may store a username of the user who created the record. A modified name column 999 may store a username of the last user to modify the record. A related question ID column 1000 may store an identifier for a related question. A release analysis text column 1001 may store a description of the assessment. A release analysis label column 1002 may store the text of a question. A release status column 1004 may store a value indicating the status of a custodian's release.

It will be understood that there may be additional or fewer fields in this database, and that the fields may be shared and/or cross-referenced across other database(s) accessed and used by other module(s) of the system.

Referring now to FIG. 27D, an exemplary evidence type table according to one embodiment of the present invention is shown. An evidence type table 1100 stores data about evidence for purposes of cost and burden estimation and may include a plurality of data columns. A primary key column 1101 may store a primary key associated with an evidence record. A timestamp created column 1102 may store the date and time data associated with creation of a new evidence record. A created by column 1103 may store a name of the creator of the evidence record. A timestamp modified column 1104 may store the date and time data associated with the last time the record was modified by any user. A modified by column 1105 may store the name of the last user to modify the record. A name column 1106 may store a name assigned to the type of evidence. A matter ID column 1107 may store a unique matter identifier associated with the matter with which the evidence is associated.

It will be understood that there may be additional or fewer fields in this database, and that the fields may be shared and/or cross-referenced across other database(s) accessed and used by other module(s) of the system.

Referring now to FIG. 27E, an exemplary evidence cost configuration table according to one embodiment of the present invention is shown. An evidence configuration table 1120 stores data source calculated cost estimates associated with evidence and may include a plurality of data columns. A timestamp created column 1121 may store the date and time data associated with creation of a new evidence record. A timestamp modified column 1122 may store the date and time data associated with the last time the record was modified by any user. A serial number column 1123 may store a unique serial number or identifier for the record. A nconstant value column 1124 may store a unique value assigned to each device. An evidence type column 1125 may store a type of data source. A collection status column 1126 may store an assigned evidence status. An FK-Case data primary key column 1127 may store a unique data source identifier. A location group column 1128 may store source location group associated with the custodian. The low cost estimate column 1129 may store a calculated cost estimate with a low value. The medium cost estimate column 1130 may store a calculated cost estimate with a medium value. The high cost estimate column 1131 may store a calculated cost estimate with a high value. An evidence type primary key column 1132 stores standardized code for the evidence type.

It will be understood that there may be additional or fewer fields in this database, and that the fields may be shared and/or cross-referenced across other database(s) accessed and used by other module(s) of the system.

Referring now to FIG. 27F, an exemplary evidence burden configuration table according to one embodiment of the present invention is shown. An evidence burden configuration table 1140A-1140D stores data source burden values associated with evidence. In the illustrated embodiment, data rows AA-GG are shown in four tables 1140A-1140D, due to length; it will be understood that the lower table 1140D is merely a continuation of the table 1140C, which is merely a continuation of the table 1140B, which is merely a continuation of the upper table 1140A.

The evidence burden configuration table 1140A-1140D may include a plurality of data columns. A timestamp created column 1141 may store the date and time data associated with creation of a new evidence record. A timestamp modified column 1142 may store the date and time data associated with the last time the record was modified by any user. A serial number column 1143 may store a unique serial number or identifier for the record. A created username column 1144 may store a username of the user who created the record. A modified username column 1145 may store a username of the last user to modify the record. An evidence item number column 1146 may store a unique value assigned to a device. A collected by column 1147 may store a name of the person who collected the data source. A collection date column 1148 may store a date on which the data source was collected. A collection method column 1149 may store a collection method by which the data source was collected.

A device make column 1150 may store a device make name associated with the data source. A device model column 1151 may store a device model name associated with the data source. A device serial number column 1152 may store a device serial number associated with the data source. An evidence type column 1153 may store information about the type of evidence associated with the data source. A destination make column 1154 may store a destination make name associated with the data source. A destination model column 1155 may store a destination model name associate with the data source. A destination serial number column 1156 may store a destination serial number associated with the data source. A destination type column 1157 may store a type of destination associated with the data source. An encryption column 1158 may store information about whether the data source is encrypted. An encryption type column 1159 may store information about the type of encryption used for the data source. A hard drive make column 1160 may store a hard drive make name associated with the data source. A hard drive model column 1161 may store a hard drive model name associated with the data source. A hard drive size column 1162 may store a hard drive size associated with the data source. A device size column 1163 may store a device size associated with the data source. A related case serial ID column 1164 may store a matter identifier for cases to which the data source is assigned. A share path column 1165 may store information about a share path associated with the data source. A share type column 1166 may store a share path type associated with the data source. A source column 1167 may store source information associated with the data source. An operating system column 1168 may store information about an operating system associated with the data source. An SD card column 1169 may store information about an SD card associated with the data source. A related custodian primary key column 1170 may store a custodian identifier for a custodian who owns the data source. A collection time column 1171 may store a time at which the data source was collected. An active column 1172 may store information about a removable media device associated with the data source. A complete column 1173 may store information about whether collection of the data source is complete. A device type column 1174 may store information about the type of device on which the evidence is stored. A collection ranking column 1176 may store a collection ranking associated with the evidence or data source. An interview PK column 1177 may store a primary key of the interview where the data source was identified. A custodian ranking column 1178 may store a custodian ranking associated with the custodian that controls the data source, which custodian rank is based on the results of the assessment.

It will be understood that there may be additional or fewer fields in this database, and that the fields may be shared and/or cross-referenced across other database(s) accessed and used by other module(s) of the system.

Illustrative Databases

Referring now to FIGS. 28-53, illustrate various exemplary databases that may be stored on a database server of the proportional discovery assessment system of FIG. 1 according to one embodiment of the present invention. It will be understood that these are illustrative only and shall not be construed as limiting in any way.

Illustrative Embodiment

The application of the legal principle of proportionality has recently become a critical requirement to control the scope and cost of discovery. Defining a proportionate eDiscovery response based on the "value and uniqueness of the information" is subjective, and the parties involved may hold quite different views of a proportionate discovery strategy. A computer program is presented that provides a methodical framework and discipline to reach an agreement on discovery that is proportional to the needs of the case. The program combines multiple decision factors, including weighing the relevance of the custodians; identifying and scoring each data source held by a custodian, relative to its potential value and collection burden and cost; and facilitating negotiations amongst the parties.

To accomplish the calculated scoring of proportionality, the system first captures detailed custodian information through self-surveys and attorney interviews that provide insight into the custodian's relevance, their knowledge of the claims and defenses, and the overall value of their data sources. The level of burden and cost associated with various data sources is also assessed, and these variables are recorded in the system.

The computer system's proprietary scoring algorithms analyze the information regarding custodian relevancy, combined with the relative cost and complexity for collection, creating a Proportional Discovery Assessment® (PDA) score. This score is both measurable and quantifiable and allows for an informed selection and deselection of custodians and their data sources. This unique scoring process creates a logical, transparent, and defensible methodology for creating a discovery approach that is proportional to the merits of the case.

The Proportional Discovery Assessment® process is managed through the following modules: (1) Matter Administration; (2) Custodian Administration; (3) Survey/Analysis/Interview; and (4) Assessment/Proportional Discovery Assessment® (PDA).

The first two modules contain the administrative setup and configuration settings that capture employee/custodian information and custodian/data source status, effort, and cost variables. These variables may be customized by each client to serve their needs and to provide the granularity necessary for appropriate cost and burden measurements.

The Survey/Analysis/Interview module allows for the creation, dissemination and execution of custodian interview questions. The approach to this interview process may vary by firm and/or by matter and is facilitated by the system. The intent is to uncover substantive specifics about each custodian, their involvement relative to the claims and defenses, and lastly, the identification and location of unique relevant data sources.

The system offers flexibility in creating the questions to capture the necessary information, as well as a high level of granularity in order to capture the specificity required to inform the scoring algorithms. An unlimited number of questions are allowed, backed by an extensive set of rule-based configuration settings which use conditional logic.

Assessment—Part I: Custodians

The Assessment process is designed to examine and evaluate a custodian's level of involvement and knowledge of the claims and defenses of the matter. The assessment is used to quickly determine a Hold/Release status, and subsequently rank a custodian's relative importance to the matter beyond the standard Hold/Release classification. The system utilizes logic rules to assist attorneys in crafting narratives and questions, to assess a custodian's response, and produce a quantifiable measurement of their level of involvement.

The custodian responses to the questions serve two purposes: (1) Provide a defensible determination regarding the Hold/Release decision; and (2) Determine the relevancy score used to generate the Custodian Rank, one factor that contributes to the overall PDA score.

There are two forms of an Assessment question: (1) Yes/No question, with or without explanation; and (2) Narrative question.

Figure 54:
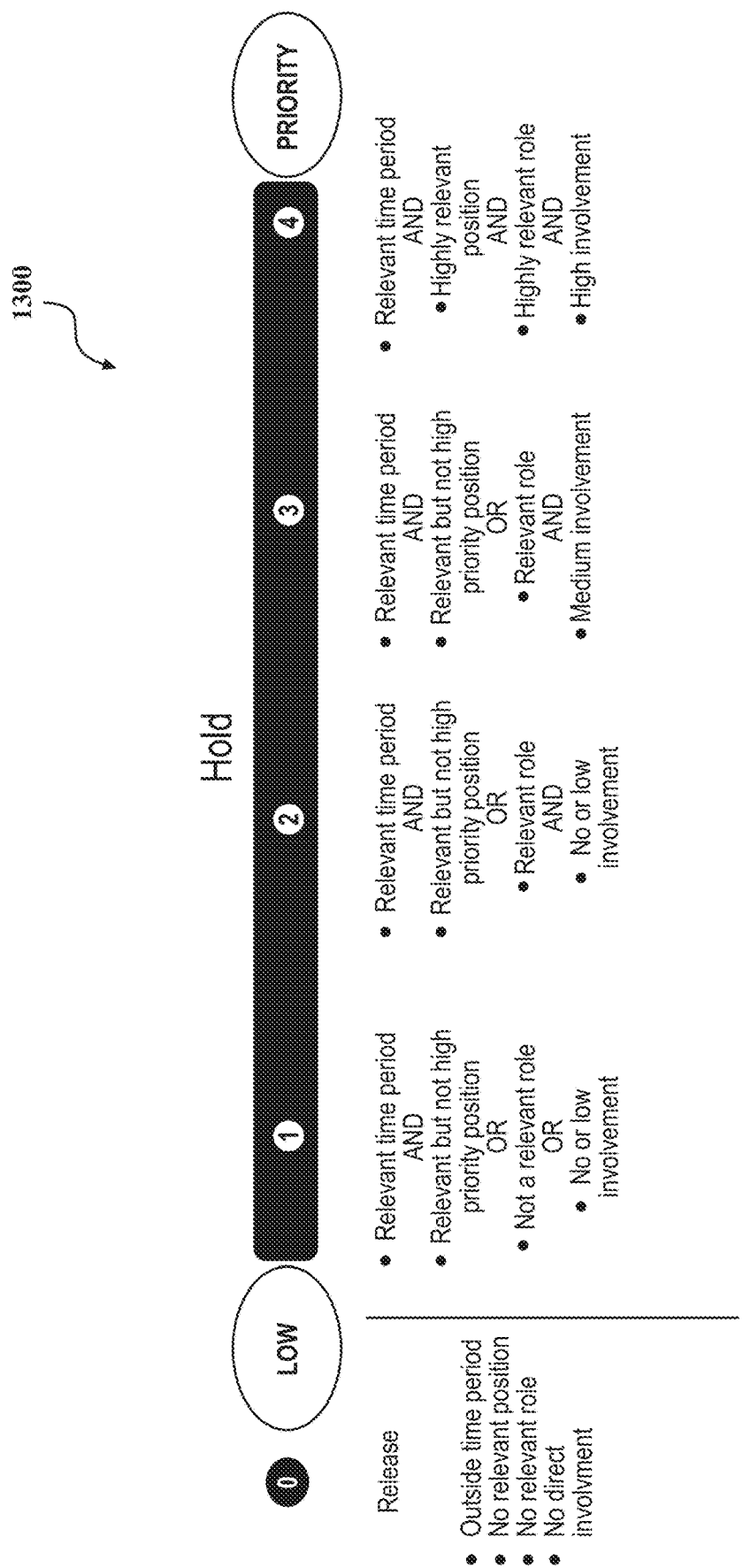
FIG. 54 illustrates a chart depicting possible examples of the considerations involved in question scoring according to one embodiment of the present invention.

The response to each type of question may be scored from 0 to 4. Referring now to FIG. 54, a chart 1300 depicts possible examples of the considerations involved in the scoring of each question.

Multiple configuration options in the computer system allow different aggregations of the individual question scores, using weighted averages or other methods in the final algorithm that generates the Custodian Rank. An individual question may also be designated as a "PDA Override" which automatically overrides scoring of the other questions and assigns a predetermined score based on that response alone.

When designing the questions to be used in the Assessment, the first objective is to address the factual and legal issues regarding the custodian's knowledge of, and involvement in the matter, and provide a defensible determination relative to a Hold/Release decision. The second objective, to create the unique Custodian Rank, requires proper structure and language for the question, and a logical scoring of the responses to obtain the desired results. To that end, the following exemplar rules provide a framework for the design of these questions.

It is suggested to use a limited number of questions (no more than six) to keep the focus and intention clear. However, more than six questions may be created as the requirements of the matter may dictate.

Core Question: An Assessment may include a Core Question. A Core Question is one designed to quickly capture a Priority custodian with a high level of knowledge and participation in the matter.

"YES" answers to a Core question are always scored as a 4 and may or may not also be a PDA Override question. A "YES" answer to a PDA Override question automatically designates the custodian as a Priority Custodian and assigns a Custodian Rank of 4 to them.

"NO" answers to a Core Question are scored as a 0.

A "YES" answer to a Core question is always designated as a HOLD.

A "NO" answer to a Core Question may be designated as a RELEASE.

Level Set Question: An Assessment may have 2-4 Level Set questions. These questions are designed to measure the degree of the custodian's knowledge, contribution, and frequency of involvement in the issues of the matter.

"YES" answers may be scored 1 to 4 depending on relevance and importance of the question. See Level Set examples listed below.

"NO" answers may be scored 0.

"YES" answers to Level Set questions will not automatically result in a HOLD, but can be configured to assign HOLD functionality or aggregate with other replies.

"NO" Answers to Level Set questions will not automatically result in RELEASE but can be configured to control HOLD functionality or aggregate with other replies.

Level Set Examples. These generic examples are intended to convey the basic functionality of the question; matter specific questions are generally more complex and detailed based on the Interviewer and complexities of the issues at hand.

Level Set 4: Question is designed to determine if custodian was an active participant in the project and has first-hand knowledge of the matter/issues involved.

"YES"=Score of 4 i.e., Were you a part of the Project XXX Marketing Team? Confirm you were directly responsible for oversight of product XX.

Level Set 3: Question is designed to determine if custodian has 1st or 2nd hand knowledge of the matter/issues involved and may have been part of a larger team but had no regular direct participation.

"YES"=Score of 3 i.e., Did you deal with non-marketing aspects of Project XXX? Did you interact with team members of Project XXX, attend meetings or hold discussions regarding Project XXX?

Level Set 2: Question is designed to determine if custodian has only peripheral knowledge of the matter/issues involved but no direct involvement. They may have some exposure to documents through email or shared reports.

"YES"=Score of 2 i.e., Were you aware of Project XXX and/or receive any email updates or see internal company documents related to Project XXX?

Level Set 1: Question is designed to determine if custodian has any knowledge whatsoever of the matter/issues involved.

"YES"=Score of 1

"NO"=Score of 0 i.e., Were you aware of Project XXX?

Narrative Question: An Assessment may have multiple narrative-type questions. These questions prompt a subjective reply that the Interviewer must score. Since these answers may uncover inconsistencies in prior responses, their scoring may also result in a PDA Override.

Scoring the narrative reply may be 0-4.

A Narrative response may result in a HOLD or a RELEASE.

The following rules are offered that leverage the scoring of the Assessment questions to determine a defensible Hold/Release decision. The rules establish a standard guideline to define the Hold/Release process based on the questions being asked. These following guidelines are presented as examples:

If Core Q is "YES"=HOLD
If Level 3 Q is "YES"=HOLD
If Score for Level Q's>6=HOLD
If Narrative Q>2=HOLD
If Score for Core+Level+Narrative is <3=RELEASE Assessment—Part II: Data Sources A second component of the proportionality assessment is a determination of the difficulty to fully process a custodian's data sources. This method allows each type of device to be assessed individually based on a variety of criteria, and then assigns a level of effort score based on that evaluation.

Fundamental to the methodology is the knowledge that all data sources do not require the same level of effort, and the costs to process an individual custodian's data sources may be considered disproportionate if it requires extraordinary effort and the custodian has minimal knowledge or involvement in the matter.

Figure 55:
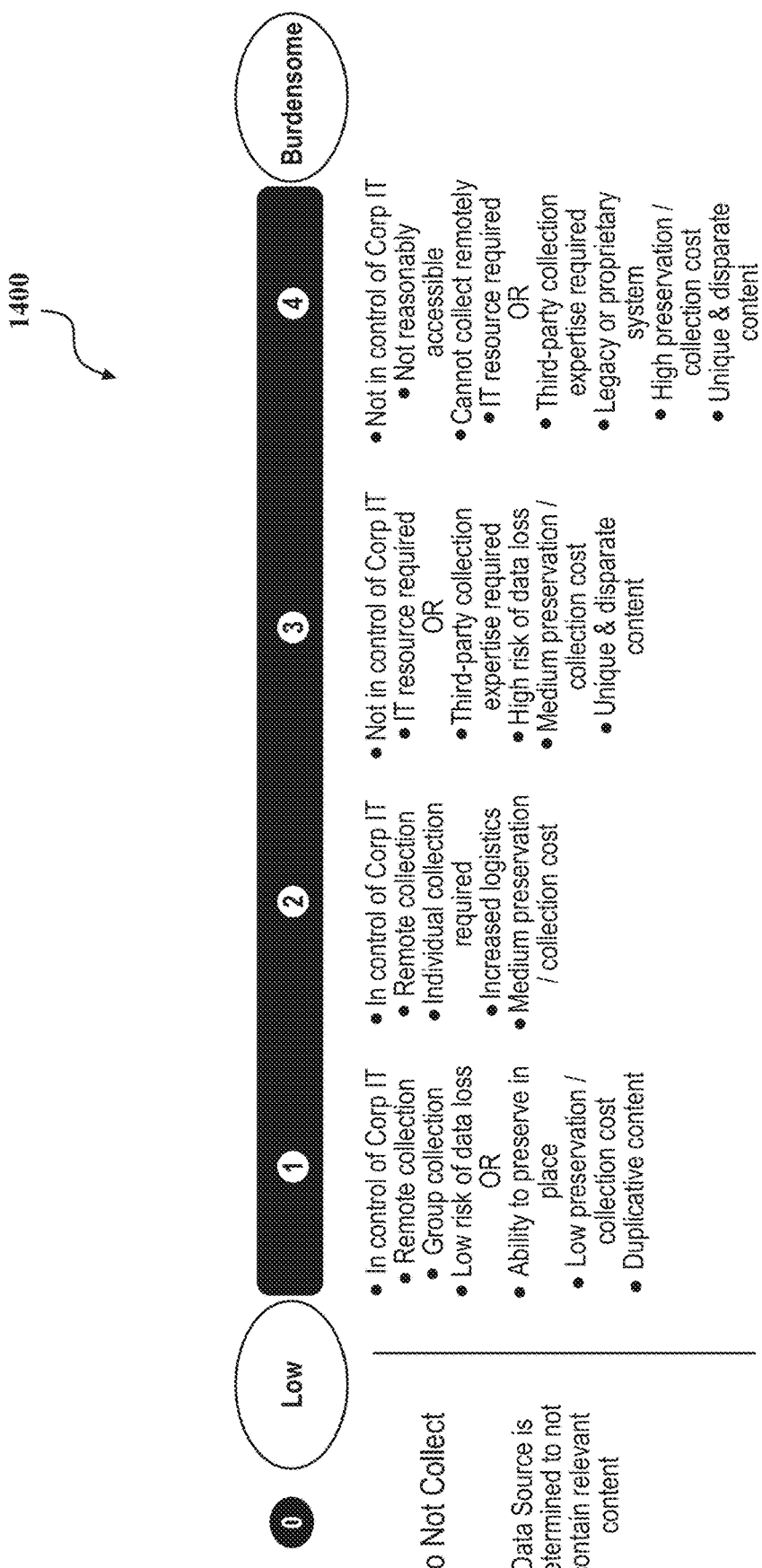
FIG. 55 illustrates a chart depicting possible examples of guidelines for determining the level of effort scores according to one embodiment of the present invention.

The level of effort score is divided into four groups: Low, Medium, High and Burdensome. Referring now to FIG. 55, a chart 1400 depicts possible examples of guidelines for determining the level of effort scores. For example, collecting email off a centralized MS Exchange server for 100 custodians is relatively low effort as compared to collecting mobile devices from the same group of custodians spread across three geographic locations. The email might be scored as a "1"=low level of effort and the mobile devices collection may be scored a "4"=high level of effort.

The costs associated with the processing and production of each type of data source are identified based on discussions with the appropriate parties involved, including the corporate IT department, e-discovery professionals and the attorneys. This information is entered into the system and used as an important criterion in the proportionality negotiations.

The costs may be estimated based on a variety of measures, such as the location of the data source, the type of device, or the stage of discovery. For example, a different set of costs may be configured based on location (i.e., HQ office vs. remote or international location), or ownership of device (i.e., corporate versus personal).

The system's proprietary algorithms combine the Custodian Rank value with the level of effort value to produce a single measurement for each data source, the PDA Score.

Referring back to FIG. 20, a dashboard 1500 is a graphic representation of the PDA Score. Each singular data source for each custodian is assigned to a quadrant of the Proportional Discovery Assessment® matrix based on its PDA Score. Attorneys may use the model to identify data sources held by custodians that would be most relevant and least burdensome, allowing them to prioritize their collection negotiations and efforts. Likewise, they may use the matrix to identify custodians with minimal knowledge or involvement and negotiate the release of those custodians or the deselection of their burdensome data sources in relation to the overall discovery strategy.

The PDA Score allows the parties to develop a sound discovery strategy, taking into account both the relevance of the custodians to the claims and defenses of the legal matter, as well as the level of effort required to move data sources through collection and review. The computer system allows for the development of scenarios and provides real-time cost estimations based on selections made by the parties. The results of the Assessment provide attorneys with quantitative information to prioritize and negotiate with opposing counsel, facilitating agreement of a discovery plan that is proportionate to the needs of the case. This achieves the goal of a just, speedy and reasonable resolution of legal matters.

Although specific features of various embodiments of the disclosure may be shown in some drawings and not in others, this is for convenience only. In accordance with the principles of the disclosure, any feature of a drawing or other embodiment may be referenced and/or claimed in combination with any feature of any other drawing or embodiment.

This written description uses examples to describe embodiments of the disclosure and also to enable any person skilled in the art to practice the embodiments, including making and using any articles or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a database stored on a server; and
a processing device of the server, wherein the processing device is in communication with a user device accessible to a user, the processing device including:
a hosting module configured to generate and display an interactive user interface on the user device,
a communications module configured to enable the user to access and interact with the interactive user interface on the user device, a matter administration module configured to:
(1) generate and maintain a matter data table in the database,
(2) allow the user to enter, using the interactive user interface, matter data associated with a plurality of matters,
(3) create a matter record for each of the plurality of matters in the matter data table in the database; and
(4) store the matter data in the record associated with each of the plurality of matters in the associated matter record in the matter data table,
a custodian administration module configured to:
(1) generate and maintain a custodian data table in the database,
(2) allow the user, using the interactive user interface, to enter custodian data associated with a plurality of custodians,
(3) allow the user, using the interactive user interface, to identify an associated matter for each of the plurality of custodians,
(4) create a custodian record for each of the plurality of custodians in the custodian data table in the database, and
(5) store the custodian data for each of the plurality of custodians in the associated custodian record, each custodian record including a reference to the associated matter, the custodian administration module being further configured to allow the user, using the interactive user interface, to select a proportionality scoring option from a set of available proportionality scoring options, each available proportionality scoring option having a respective algorithm,
an evidence administration module configured to:
(1) generate and maintain an evidence data table in the database, and
(2) allow the user, using the interactive user interface, to enter evidence data including an evidence type,
(3) create an evidence type record for each evidence type, and
(4) store the evidence data for each evidence type in the associated evidence type record, and
an interview building module configured to:
(1) generate and maintain a custodian assessment data table,
(2) prompt the user, using the interactive user interface, to prepare at least one custom interview based on the matter data,
(3) store the at least one custom interview in the custodian assessment data table, and
(4) receive, from the user device, at least one question about a custodian associated with the matter and a plurality of response options for inclusion in the at least one custom interview, each response option having a respective value, wherein the communications module is further configured to:
prompt the user to select, on the user device, a response from the plurality of response options to the at least one question;
receive the selected response from the user device; and
send the selected response to the custodian administration module, wherein the custodian administration module is further configured to:
receive the selected response to the at least one question and retrieve the respective value from the custodian assessment data table;
determine a relevancy ranking based on the respective value of the selected response and the respective algorithm associated with the selected proportionality scoring option; and
assign the relevancy ranking to the custodian.

2. The system of claim 1, wherein the relevancy ranking indicates that the custodian is not relevant to the matter.

3. The system of claim 2, wherein the custodian administration module is further configured to designate the custodian as released from the matter.

4. The system of claim 1, wherein the relevancy ranking indicates that the custodian is required to complete an additional interview.

5. The system of claim 4, wherein the custodian administration module is further configured to designate the custodian as on hold for the matter.

6. The system of claim 1, wherein the communications module is further configured to:
prompt the user to enter, from the user device, at least one evidence record associated with the custodian;
prompt the user to provide, from the user device, a response to at least one question about collection of data associated with the at least one evidence record;
receive the at least one evidence record and the response to the at least one question from the user device; and
send the at least one evidence record and the response to the at least one question to the evidence administration module.

7. The system of claim 6, wherein the evidence administration module is configured to:
receive the at least one evidence record and the response to the at least one question;
determine an evidence ranking based on at least one collection factor, wherein the at least one collection factor is based on the response to the at least one question; and
assign the evidence ranking to the at least one evidence record.

8. The system of claim 7, wherein the report building module is further configured to:
receive the relevancy ranking and the evidence ranking; and
combine the relevancy ranking and the evidence ranking to determine a proportionality ranking associated with the custodian and the evidence record.

9. A computer-implemented method comprising:
generating and displaying, by a hosting module, an interactive user interface on a user device accessible by a user;
enabling, by a communication module, the user to access and interact with the interactive user interface on the user device;
generating and maintaining, by a matter administration module, a matter data table in a database that is stored on a server;
allowing the user to enter, using the interactive user interface, matter data associated with a plurality of matters,
creating a matter record for each of the plurality of matters in the matter data table in the database;
storing the matter data in the record associated with each of the plurality of matters in the associated matter record in the matter data table;
generating and maintaining, by a custodian administration module, a custodian data table stored in the database;

allowing the user, using the interactive user interface, to enter custodian data associated with a plurality of custodians;

allowing the user, using the interactive user interface, to identify an associated matter for each of the plurality of custodians, creating a custodian record for each of the plurality of custodians in the custodian data table in the database;

storing the custodian data for each of the plurality of custodians in the associated custodian record, each custodian record including a reference to the associated matter, allowing the user, using the interactive user interface, to select a proportionality scoring option from a set of available proportionality scoring options, each available proportionality scoring option having a respective algorithm;

generating and maintaining, by an evidence administration module, an evidence data table stored in the database;

allowing the user, using the interactive user interface, to enter evidence data including an evidence type;

creating an evidence type record for each evidence type;

storing the evidence data for each evidence type in the associated evidence type record;

generating and maintaining a custodian assessment date table;

prompting, by an interview building module, the user to prepare at least one custom interview based on the plurality of matter data;

storing the at least one custom interview in the custodian assessment data table;

receiving, from the user device, at least one question about a custodian associated with the matter and a plurality of response options for inclusion in the at least one custom interview, each response option having a respective value;

prompting, by the communications module, the user to select, on the user device, a response from the plurality of response options to the at least one question;

receiving, by the communications module, the selected response from the user device;

sending, by the communications module, the selected response to the custodian administration module;

receiving, by the custodian administration module, the selected response to the at least one question and retrieve the respective value from the custodian assessment data table;

determining, by the custodian administration module, a relevancy ranking based on the respective value of the selected response and the respective algorithm associated with the selected proportionality scoring option; and assigning, by the custodian administration module, the relevancy ranking to the custodian.

10. The method of claim 9, wherein the relevancy ranking indicates that the custodian is not relevant to the matter.

11. The method of claim 10, further comprising designating, by the custodian administration module, the custodian as released from the matter.

12. The method of claim 9, wherein the relevancy ranking indicates that the custodian is required to complete an additional interview.

13. The method of claim 12, further comprising designating, by the custodian administration module, the custodian as on hold for the matter.

14. The method of claim 9, further comprising:

prompting, by the communications module, the user to enter, from the user device, at least one evidence record associated with the custodian;

prompting, by the communications module, the user to provide, from the user device, a response to at least one question about collection of data associated with the at least one evidence record;

receiving, by the communications module, the at least one evidence record and the response to the at least one question from the user device; and sending, by the communications module, the at least one evidence record and the response to the at least one question to the evidence administration module.

15. The method of claim 14, further comprising:

receiving, by the evidence administration module, the at least one evidence record and the response to the at least one question;

determining, by the evidence administration module, an evidence ranking based on at least one collection factor, wherein the at least one collection factor is based on the response to the at least one question; and assigning, by the evidence administration module, the evidence ranking to the at least one evidence record.

16. The method of claim 15, further comprising:

receiving, by the report building module, the relevancy ranking and the evidence ranking; and combining, by the report building module, the relevancy ranking and the evidence ranking to determine a proportionality ranking associated with the custodian and the evidence record.

17. A non-transitory information recording medium on which a computer readable program is recorded that causes a computer to function as a system comprising:

a database stored on a server; and a processing device of the server, wherein the processing device is in communication with a user device accessible to a user, the processing device including:

a hosting module configured to generate and display an interactive user interface on the user device, a communications module configured to enable the user to access and interact with the interactive user interface on the user device, a matter administration module configured to:

(1) generate and maintain a matter data table in the database, (2) allow the user to enter, using the interactive user interface, matter data associated with a plurality of matters, (3) create a matter record for each of the plurality of matters in the matter data table in the database; and (4) store the matter data in the record associated with each of the plurality of matters in the associated matter record in the matter data table, a custodian administration module configured to:

(1) generate and maintain a custodian data table in the database, (2) allow the user, using the interactive user interface, to enter custodian data associated with a plurality of custodians, (3) allow the user, using the interactive user interface, to identify an associated matter for each of the plurality of custodians, (4) create a custodian record for each of the plurality of custodians in the custodian data table in the database, and (5) store the custodian data for each of the plurality of custodians in the associated custodian record, each custodian record including a reference to the associated matter, the custodian administration module being further configured to allow the user, using the interactive user interface, to select a proportionality scoring option from a set of available proportionality scoring options, each available proportionality scoring option having a respective algorithm, an evidence administration module configured to:
(1) generate and maintain an evidence data table in the database, and
(2) allow the user, using the interactive user interface, to enter evidence data including an evidence type,
(3) create an evidence type record for each evidence type, and
(4) store the evidence data for each evidence type in the associated evidence type record, and an interview building module configured to:
(1) generate and maintain a custodian assessment data table,
(2) prompt the user, using the interactive user interface, to prepare at least one custom interview based on the plurality of matter data,
(3) store the at least one custom interview in the custodian assessment data table, and
(4) receive, from the user device, at least one question about a custodian associated with the matter and a plurality of response options for inclusion in the at least one custom interview, each response option having a respective value, wherein the communications module is further configured to:
prompt the user to select, on the user device, a response from the plurality of response options to the at least one question;
receive the selected response from the user device; and
send the selected response to the custodian administration module, wherein the custodian administration module is further configured to:
receive the selected response to the at least one question and retrieve the respective value from the custodian assessment data table;
determine a relevancy ranking based on the respective value of the selected response and the respective algorithm associated with the selected proportionality scoring option; and
assign the relevancy ranking to the custodian.

18. The non-transitory information recording medium of claim 17, wherein the relevancy ranking indicates that the custodian is not relevant to the matter.

19. The non-transitory information recording medium of claim 18, wherein the custodian administration module is further configured to designate the custodian as released from the matter.

20. The non-transitory information recording medium of claim 17, wherein the relevancy ranking indicates that the custodian is required to complete an additional interview.

21. The non-transitory information recording medium of claim 20, wherein the custodian administration module is further configured to designate the custodian as on hold for the matter.

22. The non-transitory information recording medium of claim 17, wherein the communications module is further configured to:
prompt the user to enter, from the user device, at least one evidence record associated with the custodian;
prompt the user to provide, from the user device, a response to at least one question about collection of data associated with the at least one evidence record;
receive the at least one evidence record and the response to the at least one question from the user device; and
send the at least one evidence record and the response to the at least one question to the evidence administration module.

23. The non-transitory information recording medium of claim 22, wherein the evidence administration module is configured to:
receive the at least one evidence record and the response to the at least one question;
determine an evidence ranking based on at least one collection factor, wherein the at least one collection factor is based on the response to the at least one question; and
assign the evidence ranking to the at least one evidence record.

24. The non-transitory information recording medium of claim 23, wherein the report building module is further configured to:
receive the relevancy ranking and the evidence ranking; and
combine the relevancy ranking and the evidence ranking to determine a proportionality ranking associated with the custodian and the evidence record.

\* \* \* \* \*